US012776176B2

(12) United States Patent
Hoossainy et al.

(10) Patent No.: US 12,776,176 B2
(45) Date of Patent: Oct. 27, 2026

(54) POWER TOOL WITH COMPARTMENT FOR RECEIVING ANOTHER DEVICE

(71) Applicant: MILWAUKEE ELECTRIC TOOL CORPORATION, Brookfield, WI (US)

(72) Inventors: Tauhira Hoossainy, Milwaukee, WI (US); Christian P. Coulis, Sussex, WI (US); Stephen Matson, Milwaukee, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

(21) Appl. No.: 19/211,736

(22) Filed: May 19, 2025

(65) Prior Publication Data

US 2026/0024388 A1 Jan. 22, 2026

Related U.S. Application Data

(63) Continuation of application No. 18/406,717, filed on Jan. 8, 2024, now Pat. No. 12,307,839, which is a (Continued)

(51) Int. Cl.
*G07C 9/00* (2020.01)
*E05B 17/22* (2006.01)
(Continued)

(52) U.S. Cl.
CPC .......... *G07C 9/00309* (2013.01); *E05B 17/22* (2013.01); *G07C 9/00896* (2013.01); (Continued)

(58) Field of Classification Search
CPC .............................. B25F 5/00; G07C 9/00309
See application file for complete search history.

(56) References Cited

U.S. PATENT DOCUMENTS 1,990,035 A 2/1935 Franz et al.
3,616,864 A 11/1971 Sorenson et al.
(Continued)

FOREIGN PATENT DOCUMENTS

CN 1324125 A 11/2001
CN 102666024 A 9/2012
(Continued)

OTHER PUBLICATIONS

Pixie 2.0 User Guide, 6 pages, accessed Jan. 31, 2019.
Pixie, <https://getpixie.com> webpage accessed Jan. 31, 2019.

*Primary Examiner* — Nabil H Syed
(74) *Attorney, Agent, or Firm* — Michael Best & Friedrich LLP

(57) ABSTRACT

One power tool includes a housing including a compartment for receiving another device. The power tool further includes a wireless communication device including a wireless communication controller including a transceiver. The wireless communication device is configured to be received in the compartment. The power tool further includes a motor within the housing, and the motor is configured to drive an output drive device. The power tool further includes a controller within the housing and having an electronic processor, a memory, and a data connection. The data connection is configured to couple the electronic processor to the wireless communication device when the wireless communication device is inserted into the compartment. The controller is configured to control operation of the motor, and communicate with an external device via the data connection and the wireless communication controller.

20 Claims, 32 Drawing Sheets

Related U.S. Application Data continuation of application No. 17/188,327, filed on Mar. 1, 2021, now Pat. No. 11,869,288, which is a continuation of application No. 16/684,455, filed on Nov. 14, 2019, now Pat. No. 10,950,074, which is a continuation of application No. 16/056,710, filed on Aug. 7, 2018, now Pat. No. 10,510,199.

(60) Provisional application No. 62/590,819, filed on Nov. 27, 2017, provisional application No. 62/541,860, filed on Aug. 7, 2017.

(51) Int. Cl.
*G07C 9/20* (2020.01)
*G07C 9/30* (2020.01)
*G07C 9/38* (2020.01)

(52) U.S. Cl.
CPC ................ *G07C 9/20* (2020.01); *G07C 9/30* (2020.01); *G07C 9/38* (2020.01); *G07C 2009/00507* (2013.01); *G07C 2009/00642* (2013.01); *G07C 2009/00769* (2013.01)

(56) References Cited

U.S. PATENT DOCUMENTS

| | | | |
|---|---|---|---|
| 5,809,432 | A | 9/1998 | Yamashita |
| 6,536,536 | B1 | 3/2003 | Gass et al. |
| 6,607,041 | B2 | 8/2003 | Suzuki et al. |
| 6,834,730 | B2 | 12/2004 | Gass et al. |
| 6,872,121 | B2 | 3/2005 | Wiesner et al. |
| 6,913,087 | B1 | 7/2005 | Brotto et al. |
| 6,975,834 | B1 | 12/2005 | Forster |
| 7,022,924 | B2 | 4/2006 | Patton |
| 7,036,605 | B2 | 5/2006 | Suzuki et al. |
| 7,093,668 | B2 | 8/2006 | Gass et al. |
| 7,121,358 | B2 | 10/2006 | Gass et al. |
| 7,146,667 | B2 | 12/2006 | Elsener |
| 7,237,990 | B2 | 7/2007 | Deng |
| 7,253,736 | B2 | 8/2007 | Tethrake et al. |
| 7,256,699 | B2 | 8/2007 | Tethrake et al. |
| 7,298,240 | B2 | 11/2007 | Lamar |
| 7,311,025 | B1 | 12/2007 | Wilson, Jr. |
| 7,328,752 | B2 | 2/2008 | Gass et al. |
| 7,373,681 | B2 | 5/2008 | Elsener |
| 7,513,179 | B2 | 4/2009 | Wilson, Jr. |
| 7,540,334 | B2 | 6/2009 | Gass et al. |
| 7,608,790 | B2 | 10/2009 | Patton |
| RE41,160 | E | 3/2010 | Gilmore et al. |
| RE41,185 | E | 3/2010 | Gilmore et al. |
| 7,784,104 | B2 | 8/2010 | Innami et al. |
| 7,827,718 | B2 | 11/2010 | Luebkert et al. |
| 7,837,694 | B2 | 11/2010 | Tethrake et al. |
| 7,850,071 | B2 | 12/2010 | Sakamoto et al. |
| 7,887,559 | B2 | 2/2011 | Deng et al. |
| 7,896,098 | B2 | 3/2011 | Suzuki et al. |
| 7,942,084 | B2 | 5/2011 | Wilson, Jr. et al. |
| 7,969,116 | B2 | 6/2011 | Aradachi et al. |
| 8,035,487 | B2 | 10/2011 | Malackowski |
| 8,062,060 | B2 | 11/2011 | Rejman |
| 8,066,533 | B2 | 11/2011 | Tomita et al. |
| 8,113,066 | B2 | 2/2012 | Eckstein et al. |
| 8,115,621 | B2 | 2/2012 | Rajala et al. |
| 8,157,826 | B2 | 4/2012 | Deng et al. |
| 8,169,298 | B2 | 5/2012 | Wiesner et al. |
| 8,189,043 | B2 | 5/2012 | Schneider et al. |
| 8,200,354 | B2 | 6/2012 | Freeman et al. |
| 8,210,275 | B2 | 7/2012 | Suzuki et al. |
| 8,251,157 | B2 | 8/2012 | Gray et al. |
| 8,253,559 | B2 | 8/2012 | Howard et al. |
| 8,253,560 | B2 | 8/2012 | Howard et al. |
| 8,254,878 | B2 | 8/2012 | Howard et al. |
| 8,264,374 | B2 | 9/2012 | Obutake et al. |
| 8,274,273 | B2 | 9/2012 | Nguyen et al. |
| 8,285,248 | B2 | 10/2012 | Howard et al. |
| 8,406,697 | B2 | 3/2013 | Arimura et al. |
| 8,412,179 | B2 | 4/2013 | Gerold et al. |
| 8,418,778 | B2 | 4/2013 | Eshleman et al. |
| 8,454,613 | B2 | 6/2013 | Tethrake et al. |
| 8,500,769 | B2 | 8/2013 | Deng |
| 8,535,342 | B2 | 9/2013 | Malackowski et al. |
| 8,555,755 | B2 | 10/2013 | Cattaneo |
| 8,588,806 | B2 | 11/2013 | Howard et al. |
| 8,624,721 | B2 | 1/2014 | Barker, Jr. et al. |
| 8,630,729 | B2 | 1/2014 | Freeman et al. |
| 8,659,652 | B2 | 2/2014 | Schneider et al. |
| 8,666,936 | B2 | 3/2014 | Wallace |
| 8,686,831 | B2 | 4/2014 | Green et al. |
| 8,764,466 | B2 | 7/2014 | Million |
| 8,766,798 | B2 | 7/2014 | Howard et al. |
| 8,768,381 | B2 | 7/2014 | Howard et al. |
| 8,776,644 | B2 | 7/2014 | Harper et al. |
| 8,792,598 | B1 | 7/2014 | Cendrillon et al. |
| 8,847,754 | B2 | 9/2014 | Buchheim et al. |
| 8,847,755 | B2 | 9/2014 | Howard et al. |
| 8,851,200 | B2 | 10/2014 | Gray et al. |
| 8,870,078 | B2 | 10/2014 | Webb et al. |
| 8,878,671 | B2 | 11/2014 | Buchheim et al. |
| 8,884,756 | B2 | 11/2014 | Howard et al. |
| 8,884,871 | B2 | 11/2014 | Howard et al. |
| 8,890,686 | B2 | 11/2014 | Howard et al. |
| 8,896,457 | B2 | 11/2014 | Howard et al. |
| 8,928,463 | B2 | 1/2015 | Landau et al. |
| 8,938,315 | B2 | 1/2015 | Freeman et al. |
| 8,981,952 | B2 | 3/2015 | Howard et al. |
| 8,988,522 | B2 | 3/2015 | Schneider et al. |
| 9,041,528 | B2 | 5/2015 | Howard et al. |
| 9,049,641 | B2 | 6/2015 | Wible et al. |
| 9,078,481 | B2 | 7/2015 | Howard et al. |
| 9,082,277 | B2 | 7/2015 | Howard et al. |
| 9,089,952 | B2 | 7/2015 | Gatling et al. |
| 9,129,499 | B2 | 9/2015 | Howard et al. |
| 9,189,663 | B2 | 11/2015 | Goren et al. |
| 9,196,881 | B2 | 11/2015 | Gray et al. |
| 9,232,357 | B2 | 1/2016 | Buchheim et al. |
| 9,256,988 | B2 | 2/2016 | Wenger et al. |
| 9,295,024 | B2 | 3/2016 | Howard et al. |
| 9,367,062 | B2 | 6/2016 | Volpert |
| 9,392,404 | B2 | 7/2016 | Daoura et al. |
| 9,430,928 | B2 | 8/2016 | Ikeda et al. |
| 9,449,268 | B2 | 9/2016 | Goren et al. |
| 9,466,198 | B2 | 10/2016 | Burch et al. |
| 9,467,862 | B2 | 10/2016 | Zeiler et al. |
| 9,491,578 | B1 | 11/2016 | Saucedo |
| 9,495,847 | B2 | 11/2016 | Howard et al. |
| 9,501,883 | B2 | 11/2016 | Handville et al. |
| 9,537,335 | B2 | 1/2017 | Furui et al. |
| 9,547,965 | B2 | 1/2017 | Goren et al. |
| 9,564,774 | B2 | 2/2017 | Daoura et al. |
| 9,576,235 | B2 | 2/2017 | Kim et al. |
| 9,577,450 | B2 | 2/2017 | Yoshikawa et al. |
| 9,595,839 | B2 | 3/2017 | Furui et al. |
| 9,626,851 | B2 | 4/2017 | Xi et al. |
| 9,639,722 | B2 | 5/2017 | Landau et al. |
| 9,664,808 | B2 | 5/2017 | Nguyen et al. |
| 9,672,708 | B2 | 6/2017 | Goren et al. |
| 9,693,024 | B2 | 6/2017 | Schneider et al. |
| 9,707,026 | B2 | 7/2017 | Malackowski et al. |
| 9,711,017 | B2 | 7/2017 | Howard et al. |
| 9,713,116 | B2 | 7/2017 | Wible et al. |
| 9,715,807 | B2 | 7/2017 | Howard |
| 9,756,402 | B2 | 9/2017 | Stampfl et al. |
| 9,759,402 | B2 | 9/2017 | Stampfl et al. |
| 9,779,601 | B2 | 10/2017 | Goren et al. |
| 9,780,583 | B2 | 10/2017 | Furui et al. |
| 9,819,132 | B2 | 11/2017 | Peloquin et al. |
| 9,833,890 | B2 | 12/2017 | Ito et al. |
| 9,875,629 | B2 | 1/2018 | Goren et al. |
| 9,888,300 | B2 | 2/2018 | Stampfl et al. |
| 9,892,626 | B2 | 2/2018 | Daoura et al. |
| 9,908,182 | B2 | 3/2018 | Phillips et al. |
| 9,916,739 | B2 | 3/2018 | Suzuki |
| 9,942,700 | B2 | 4/2018 | Howard et al. |

(56) References Cited

U.S. PATENT DOCUMENTS

| | | | |
|---|---|---|---|
| 9,943,746 | B2 | 4/2018 | Kennard et al. |
| 9,955,993 | B2 | 5/2018 | Deng |
| 9,967,713 | B2 | 5/2018 | Buchheim et al. |
| 9,973,831 | B2 | 5/2018 | Mejegard et al. |
| 9,979,149 | B2 | 5/2018 | Peloquin et al. |
| 9,986,212 | B2 | 5/2018 | Schneider et al. |
| 10,022,853 | B1 | 7/2018 | Mollica |
| 10,049,549 | B2 | 8/2018 | Howard |
| 10,051,910 | B2 | 8/2018 | Howard et al. |
| 10,074,049 | B2 | 9/2018 | Daoura et al. |
| 10,090,692 | B2 | 10/2018 | Yoshikawa et al. |
| 10,123,161 | B2 | 11/2018 | Howard et al. |
| 10,124,455 | B2 | 11/2018 | Ito et al. |
| 10,131,042 | B2 | 11/2018 | Mergener et al. |
| 10,131,043 | B2 | 11/2018 | Mergener et al. |
| 10,136,198 | B2 | 11/2018 | Stampfl et al. |
| 10,213,908 | B2 | 2/2019 | Mergener et al. |
| 10,277,964 | B2 | 4/2019 | Stampfl et al. |
| 10,295,990 | B2 | 5/2019 | Dey, IV et al. |
| 10,322,522 | B2 | 6/2019 | DeCicco et al. |
| 10,354,181 | B2 | 7/2019 | Freienstein et al. |
| 10,368,186 | B2 | 7/2019 | Stampfl et al. |
| 10,380,883 | B2 | 8/2019 | Matson et al. |
| 10,391,622 | B2 | 8/2019 | Tanaka et al. |
| 10,396,573 | B2 | 8/2019 | Furui et al. |
| 10,398,032 | B1 | 8/2019 | Bailey et al. |
| 10,424,189 | B2 | 9/2019 | Daoura et al. |
| 10,431,064 | B2 | 10/2019 | Howard |
| 10,440,501 | B2 | 10/2019 | Howard et al. |
| D867,909 | S | 11/2019 | Kachar |
| 10,510,199 | B2 | 12/2019 | Hoossainy et al. |
| 10,516,920 | B2 | 12/2019 | Stampfl et al. |
| 10,518,343 | B2 | 12/2019 | Ogino et al. |
| 10,569,398 | B2 | 2/2020 | Mergener et al. |
| 11,085,582 | B2 | 8/2021 | Mergener et al. |
| 11,212,909 | B2 | 12/2021 | Smith et al. |
| 11,375,610 | B2 | 6/2022 | Lienau et al. |
| 2002/0110431 | A1 | 8/2002 | Dils et al. |
| 2003/0090239 | A1 | 5/2003 | Sakakibara |
| 2003/0093103 | A1 | 5/2003 | Malackowski et al. |
| 2004/0108120 | A1 | 6/2004 | Wiesner et al. |
| 2004/0135692 | A1 | 7/2004 | Below et al. |
| 2004/0198382 | A1 | 10/2004 | Hammond |
| 2005/0075149 | A1 | 4/2005 | Gerber et al. |
| 2005/0173142 | A1 | 8/2005 | Cutler et al. |
| 2005/0197093 | A1 | 9/2005 | Wiklof et al. |
| 2005/0267988 | A1 | 12/2005 | Ferguson et al. |
| 2006/0179473 | A1 | 8/2006 | Innami et al. |
| 2008/0125040 | A1 | 5/2008 | Kalayjian |
| 2008/0135272 | A1 | 6/2008 | Wallgren |
| 2008/0177267 | A1 | 7/2008 | Sands et al. |
| 2008/0196910 | A1 | 8/2008 | Radle et al. |
| 2008/0238609 | A1 | 10/2008 | Wiesner et al. |
| 2008/0252446 | A1 | 10/2008 | Dammertz |
| 2008/0269031 | A1 | 10/2008 | Lee et al. |
| 2009/0145187 | A1 | 6/2009 | Deppner et al. |
| 2009/0251330 | A1 | 10/2009 | Gerold et al. |
| 2010/0096151 | A1 | 4/2010 | Ostling |
| 2010/0186976 | A1 | 7/2010 | Tsubakimoto et al. |
| 2010/0265097 | A1 | 10/2010 | Obatake et al. |
| 2010/0295747 | A1 | 11/2010 | Zeltser et al. |
| 2011/0003504 | A1 | 1/2011 | Rejman |
| 2011/0073343 | A1 | 3/2011 | Sawano et al. |
| 2011/0253402 | A1 | 10/2011 | Aradachi et al. |
| 2012/0169485 | A1 | 7/2012 | Eckert |
| 2012/0292070 | A1 | 11/2012 | Ito et al. |
| 2012/0304367 | A1 | 12/2012 | Howard et al. |
| 2013/0109375 | A1 | 5/2013 | Zeiler et al. |
| 2013/0256349 | A1 | 10/2013 | Styth et al. |
| 2013/0267247 | A1 | 10/2013 | Wible et al. |
| 2013/0295426 | A1 | 11/2013 | Halavart et al. |
| 2013/0296910 | A1 | 11/2013 | Deng |
| 2013/0313925 | A1 | 11/2013 | Mergener et al. |
| 2013/0344885 | A1 | 12/2013 | Parisi et al. |
| 2014/0031831 | A1 | 1/2014 | Malackowski et al. |
| 2014/0070924 | A1 | 3/2014 | Wenger et al. |
| 2014/0132411 | A1 | 5/2014 | Buchheim et al. |
| 2014/0151079 | A1* | 6/2014 | Furui ........................ B25F 5/02 173/171 |
| 2014/0158389 | A1 | 6/2014 | Ito et al. |
| 2014/0159662 | A1 | 6/2014 | Furui et al. |
| 2014/0180464 | A1 | 6/2014 | Koerber |
| 2014/0184397 | A1 | 7/2014 | Volpert |
| 2014/0240125 | A1* | 8/2014 | Burch ................... H04W 4/021 340/539.13 |
| 2014/0262391 | A1 | 9/2014 | Eardley |
| 2014/0326477 | A1 | 11/2014 | Thorson et al. |
| 2014/0367134 | A1 | 12/2014 | Phillips et al. |
| 2015/0054627 | A1 | 2/2015 | Landau et al. |
| 2015/0133170 | A1 | 5/2015 | Buchheim et al. |
| 2015/0195807 | A1 | 7/2015 | Wible et al. |
| 2015/0197093 | A1 | 7/2015 | Berry et al. |
| 2015/0219257 | A1 | 8/2015 | Harper et al. |
| 2015/0286209 | A1 | 10/2015 | Kreuzer et al. |
| 2015/0296477 | A1 | 10/2015 | Pan et al. |
| 2015/0316913 | A1 | 11/2015 | Rickey et al. |
| 2015/0340921 | A1 | 11/2015 | Suda et al. |
| 2015/0356861 | A1 | 12/2015 | Daoura et al. |
| 2016/0019512 | A1 | 1/2016 | Buchheim et al. |
| 2016/0048122 | A1 | 2/2016 | Lukosz et al. |
| 2016/0171788 | A1 | 6/2016 | Wenger et al. |
| 2016/0226132 | A1 | 8/2016 | Kim et al. |
| 2016/0249168 | A1* | 8/2016 | Evans ..................... H04W 4/21 |
| 2016/0311094 | A1 | 10/2016 | Mergener et al. |
| 2016/0325391 | A1 | 11/2016 | Stampfl et al. |
| 2016/0342151 | A1 | 11/2016 | Dey, IV et al. |
| 2017/0008159 | A1 | 1/2017 | Boeck et al. |
| 2017/0083014 | A1 | 3/2017 | Conrad et al. |
| 2017/0191827 | A1 | 7/2017 | Zhou et al. |
| 2017/0201295 | A1 | 7/2017 | Kusakawa |
| 2017/0201853 | A1 | 7/2017 | Chen et al. |
| 2017/0216986 | A1 | 8/2017 | Dey, IV et al. |
| 2017/0228566 | A1* | 8/2017 | Sengstaken, Jr. .. G06K 19/0717 |
| 2017/0259422 | A1 | 9/2017 | Takeyama et al. |
| 2017/0303984 | A1 | 10/2017 | Malackowski |
| 2017/0343966 | A1 | 11/2017 | Schadow et al. |
| 2018/0071907 | A1 | 3/2018 | Myhill |
| 2018/0076639 | A1 | 3/2018 | Furui et al. |
| 2018/0104802 | A1 | 4/2018 | Mergener et al. |
| 2018/0114423 | A1 | 4/2018 | Goren et al. |
| 2018/0126537 | A1 | 5/2018 | Tanaka et al. |
| 2018/0133872 | A1 | 5/2018 | Tsai |
| 2018/0133873 | A1 | 5/2018 | Mergener et al. |
| 2018/0154456 | A1 | 6/2018 | Phillips et al. |
| 2018/0166768 | A1 | 6/2018 | Van Cleave |
| 2018/0199955 | A1 | 7/2018 | Deng |
| 2018/0212377 | A1 | 7/2018 | Zimmermann et al. |
| 2018/0302753 | A1 | 10/2018 | Langton |
| 2018/0319003 | A1 | 11/2018 | Freienstein et al. |
| 2018/0322376 | A1 | 11/2018 | Henry et al. |
| 2018/0345474 | A1 | 12/2018 | Brennenstuhl et al. |
| 2018/0354118 | A1 | 12/2018 | Brennenstuhl et al. |
| 2018/0357523 | A1 | 12/2018 | Freienstein et al. |
| 2019/0011892 | A1 | 1/2019 | Post et al. |
| 2019/0026619 | A1 | 1/2019 | Cecchin et al. |
| 2019/0027002 | A1 | 1/2019 | Esenwein et al. |
| 2019/0043292 | A1 | 2/2019 | Hoossainy et al. |
| 2019/0103012 | A1 | 4/2019 | Daoura et al. |
| 2019/0160646 | A1 | 5/2019 | Hoossainy et al. |
| 2019/0173349 | A1 | 6/2019 | Smith et al. |
| 2019/0215584 | A1 | 7/2019 | Stampfl et al. |
| 2019/0219990 | A1 | 7/2019 | Dey, IV et al. |
| 2019/0298122 | A1 | 10/2019 | Tahara et al. |
| 2019/0299386 | A1 | 10/2019 | Tanaka et al. |
| 2019/0334357 | A1 | 10/2019 | Furui et al. |
| 2020/0094393 | A1 | 3/2020 | Schadow et al. |
| 2021/0117749 | A1 | 4/2021 | Vetter |

FOREIGN PATENT DOCUMENTS

| | | | |
|---|---|---|---|
| CN | 102983399 | A | 3/2013 |
| CN | 103579741 | A | 2/2014 |
| CN | 203956880 | U | 11/2014 |
| CN | 107877457 | A | 4/2018 |

(56) References Cited

FOREIGN PATENT DOCUMENTS

| | | | |
|---|---|---|---|
| DE | 8102453 | U1 | 9/1982 |
| DE | 10238710 | A1 | 3/2003 |
| DE | 202004020457 | U1 | 6/2005 |
| DE | 202005010622 | U1 | 11/2006 |
| DE | 102005053821 | A1 | 5/2007 |
| DE | 102006046801 | A1 | 4/2008 |
| DE | 202008012687 | U1 | 12/2008 |
| DE | 102010041278 | A1 | 3/2012 |
| DE | 102011050393 | A1 | 11/2012 |
| DE | 102011089499 | A1 | 6/2013 |
| DE | 102012105483 | A1 | 12/2013 |
| DE | 202014006084 | U1 | 8/2014 |
| DE | 102015226734 | A1 | 6/2017 |
| DE | 102016211937 | A1 | 1/2018 |
| DE | 102011122212 | B4 | 4/2022 |
| EP | 1270150 | A2 | 1/2003 |
| EP | 1291999 | A1 | 3/2003 |
| EP | 1690648 | A2 | 8/2006 |
| EP | 1781074 | A2 | 5/2007 |
| EP | 2072192 | A1 | 6/2009 |
| EP | 2581168 | A1 | 4/2013 |
| EP | 2628427 | A2 | 8/2013 |
| EP | 3200313 | A1 | 6/2017 |
| EP | 3272467 | A1 | 1/2018 |
| JP | 2010194662 | A | 9/2010 |
| JP | 2019171523 | A | 10/2019 |
| KR | 1020180108895 | A | 10/2018 |
| WO | WO2007058596 | A1 | 5/2007 |
| WO | 2009030043 | A1 | 3/2009 |
| WO | WO2012035815 | A1 | 3/2012 |
| WO | WO2012035854 | A1 | 3/2012 |
| WO | WO2013014914 | A2 | 1/2013 |
| WO | WO2013112469 | A1 | 8/2013 |
| WO | WO2013116303 | A1 | 8/2013 |
| WO | WO2013136917 | A1 | 9/2013 |
| WO | WO2015061370 | A1 | 4/2015 |
| WO | WO2016206859 | A1 | 12/2016 |
| WO | WO2016206860 | A1 | 12/2016 |
| WO | WO2017089100 | A1 | 6/2017 |
| WO | WO2017089452 | A1 | 6/2017 |
| WO | WO2017093160 | A1 | 6/2017 |
| WO | WO2017151954 | A1 | 9/2017 |
| WO | WO2018024637 | A1 | 2/2018 |
| WO | WO2018162233 | A1 | 9/2018 |
| WO | WO2018177669 | A1 | 10/2018 |
| WO | WO2018177671 | A1 | 10/2018 |
| WO | WO2019115434 | A1 | 6/2019 |

* cited by examiner

POWER TOOL WITH COMPARTMENT FOR RECEIVING ANOTHER DEVICE

CROSS-REFERENCE TO RELATED APPLICATIONS

This application is a continuation of U.S. patent application Ser. No. 18/406,717, filed Jan. 8, 2024, now U.S. Pat. No. 12,307,839, which is a continuation of U.S. patent application Ser. No. 17/188,327, filed Mar. 1, 2021, now U.S. Pat. No. 11,869,288, which is a continuation of U.S. patent application Ser. No. 16/684,455, filed Nov. 14, 2019, now U.S. Pat. No. 10,950,074, which is a continuation of U.S. patent application Ser. No. 16/056,710, filed Aug. 7, 2018, now U.S. Pat. No. 10,510,199, which claims priority to U.S. Provisional Patent Application No. 62/590,819, filed on Nov. 27, 2017, and to U.S. Provisional Patent Application No. 62/541,860, filed on Aug. 7, 2017, the entire contents of all of which are hereby incorporated by reference.

FIELD OF THE INVENTION

The present invention relates to power tools with a compartment for receiving another device.

SUMMARY

In one embodiment, the invention provides a power tool including a housing, a motor, an output device driven by the motor, a controller, and a compartment defined by the housing. The compartment includes an irreversible lock and is configured to receive a wireless communication device and, with the irreversible lock, to irreversibly lock the wireless communication device within the compartment. The power tool also includes a data connection between the controller and the compartment such that when the wireless communication device is positioned inside the compartment, the controller exchanges power tool data with the wireless communication device. The wireless communication device also including a transceiver configured to communicate with an external device, and to exchange the power tool information with the external device.

Another embodiment provides a power tool including a housing including a compartment with an irreversible lock. The power tool further includes a wireless communication device including a wireless communication controller with a transceiver. The wireless communication device is configured to be received in the compartment and to engage with the irreversible lock. The power tool further includes a motor within the housing and having a rotor and a stator. The motor is configured to drive an output drive device. The power tool further includes a controller within the housing and having an electronic processor, a memory, and a data connection. The data connection is configured to couple the electronic processor to the wireless communication device when the wireless communication device is inserted into the compartment. The controller is configured to control operation of the motor, and communicate with an external device via the data connection and the wireless communication controller.

Another embodiment provides a method of deterring removal of a wireless communication device inserted into a compartment of a housing of a power tool. The method includes receiving, by the compartment of the housing, the wireless communication device. The compartment includes an irreversible lock configured to engage with the wireless communication device. The wireless communication device includes a wireless communication controller with a transceiver. The method further includes controlling, with a controller located within the housing, operation of a motor of the power tool to drive an output drive device. The controller includes an electronic processor, a memory, and a data connection. The data connection is configured to couple the electronic processor to the wireless communication device when the wireless communication device is inserted into the compartment. The method further includes communicating, by the controller, with an external device via the data connection and the wireless communication controller.

For example, the controller may transmit data to the wireless communication controller by way of the data connection, and the wireless communication controller wirelessly transmits the data via the transceiver to the external device. Further, the wireless communication controller may wirelessly receive data from the external device via the transceiver, and provide the data to the controller by way of the data connection.

Yet another embodiment provides a power tool device including a housing including a compartment with an irreversible lock and including a power tool battery pack interface configured to receive a power tool battery pack. The power tool device further includes a wireless communication device including a wireless communication controller with a transceiver. The wireless communication device is configured to be received in the compartment and to engage with the irreversible lock. The power tool device further includes a powered element configured to be selectively coupled to power provided by the power tool battery pack. The power tool device further includes a controller within the housing and having an electronic processor, a memory, and a data connection. The data connection is configured to couple the electronic processor to the wireless communication device when the wireless communication device is inserted into the compartment. The controller is configured to control the powered element, and communicate with an external device via the data connection and the wireless communication controller.

One embodiment provides a power tool including a housing including a compartment. The compartment is configured to receive a wireless communication device that includes a wireless communication controller including a transceiver. The power tool further includes a motor within the housing and having a rotor and a stator. The motor is configured to drive an output drive device. The power tool further includes a controller within the housing and having an electronic processor, a memory, and a data connection. The data connection is configured to couple the electronic processor to the wireless communication device when the wireless communication device is inserted into the compartment. The controller is configured to: communicate with the wireless communication device to implement an electronic lock mechanism to inhibit at least one selected from the group of operation of the motor of the power tool and communication between the controller and the wireless communication controller.

Another embodiment provides a method of deterring removal of a wireless communication device inserted into a compartment of a housing of a power tool. The method includes receiving, by the compartment of the housing, the wireless communication device. The power tool includes a motor within the housing and having a rotor and a stator. The motor is configured to drive an output drive device. The method further includes controlling, with a controller located within the housing, operation of the motor. The controller includes a data connection configured to couple to the wireless communication device when the wireless communication device is inserted into the compartment. The method further includes enabling the controller to communicate with an external device via the data connection and a wireless communication controller included in the wireless communication device. The method further includes implementing, via communication between the controller and the wireless communication controller, an electronic lock mechanism to inhibit at least one selected from the group of operation of the motor of the power tool and communication between the controller and the wireless communication controller.

Other aspects of the invention will become apparent by consideration of the detailed description and accompanying drawings.

DETAILED DESCRIPTION

Figure 1:
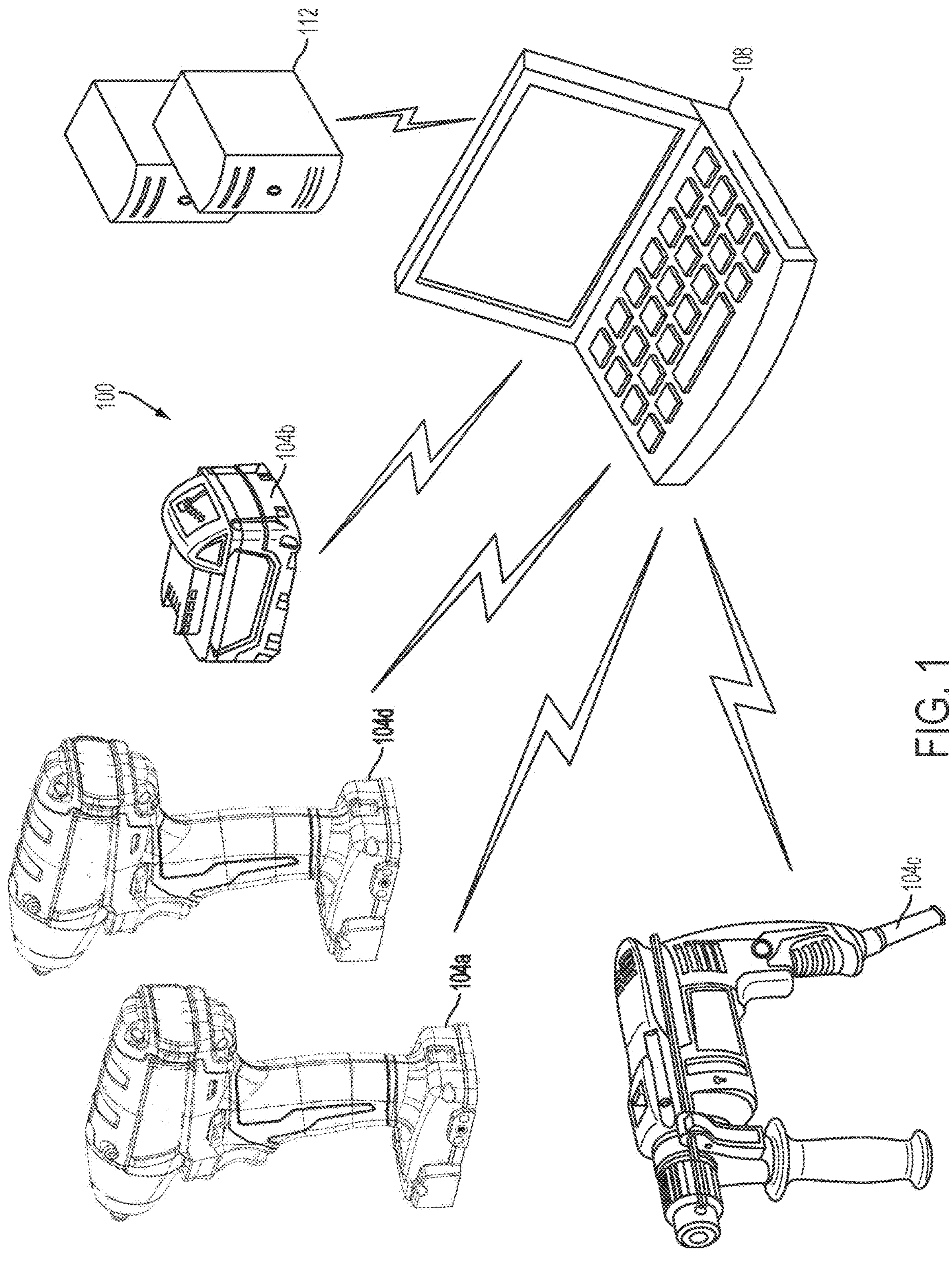
FIG. 1 illustrates a communication system according to one embodiment.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limited. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical connections or couplings, whether direct or indirect.

It should be noted that a plurality of hardware and software based devices, as well as a plurality of different structural components may be utilized to implement the invention. Furthermore, and as described in subsequent paragraphs, the specific configurations illustrated in the drawings are intended to exemplify embodiments of the invention and that other alternative configurations are possible. The terms "processor" "central processing unit" and "CPU" are interchangeable unless otherwise stated. Where the terms "processor" or "central processing unit" or "CPU" are used as identifying a unit performing specific functions, it should be understood that, unless otherwise stated, those functions can be carried out by a single processor, or multiple processors arranged in any form, including parallel processors, serial processors, tandem processors or cloud processing/cloud computing configurations.

FIG. 1 illustrates a communication system 100. The communication system 100 includes power tool devices 104*a*, 104*b*, 104*c*, and 104*d*, each generically referred to as the power tool 104, and an external device 108. The power tool devices 104*a*, 104*b*, 104*c*, 104*d* each include a wireless communication controller to enable wireless communication between the power tool 104 and the external device 108 while they are within a communication range of each other. Some of the power tool devices 104*d* include the wireless communication device integrated into the power tool device 104 such that insertion or removal of the wireless communication device is prevented. Other power tool devices 104*a*, 104*b*, 104*c*, however, include a compartment configured to receive the wireless communication device. The compartment allows the wireless communication device to be optionally added to the power tool 104, but prevents removal by including an irreversible lock that, once engaged with the wireless communication device, cannot be unlocked.

When the power tool devices 104*a*, 104*b*, 104*c* include the wireless communication device in the compartment, the power tool devices 104*a*, 140*b*, 104*c* can operate similar to the power tool device 104*d* as if the wireless communication device was integrally formed within the power tool 104. The power tool 104 may communicate power tool status, power tool operation statistics, power tool identification, stored power tool usage information, power tool maintenance data, and the like. Therefore, using the external device 108, a user can access stored power tool usage or power tool maintenance data. With this tool data, a user can determine how the power tool 104 has been used, whether maintenance is recommended or has been performed in the past, and identify malfunctioning components or other reasons for certain performance issues. The external device 108 can also transmit data to the power tool 104 for power tool configuration, firmware updates, or to send commands (e.g., turn on a work light, lock the power tool 104, and the like). The external device 108 also allows a user to set operational parameters, safety parameters, select tool modes, and the like for the power tool 104. The external device 108 may also communicate with a remote server 112 and may receive configuration and/or settings for the power tool 104, or may transmit operational data or other power tool status information to the remote server 112.

The external device 108 may be, for example, a laptop computer, a tablet computer, a smartphone, a cellphone, or another electronic device capable of communicating wirelessly with the power tool 104 and providing a user interface. The external device 108 provides the user interface and allows a user to access and interact with tool information. The external device 108 can receive user inputs to determine operational parameters, enable or disable features, and the like. The user interface of the external device 108 provides an easy-to-use interface for the user to control and customize operation of the power tool 104.

Figure 2:
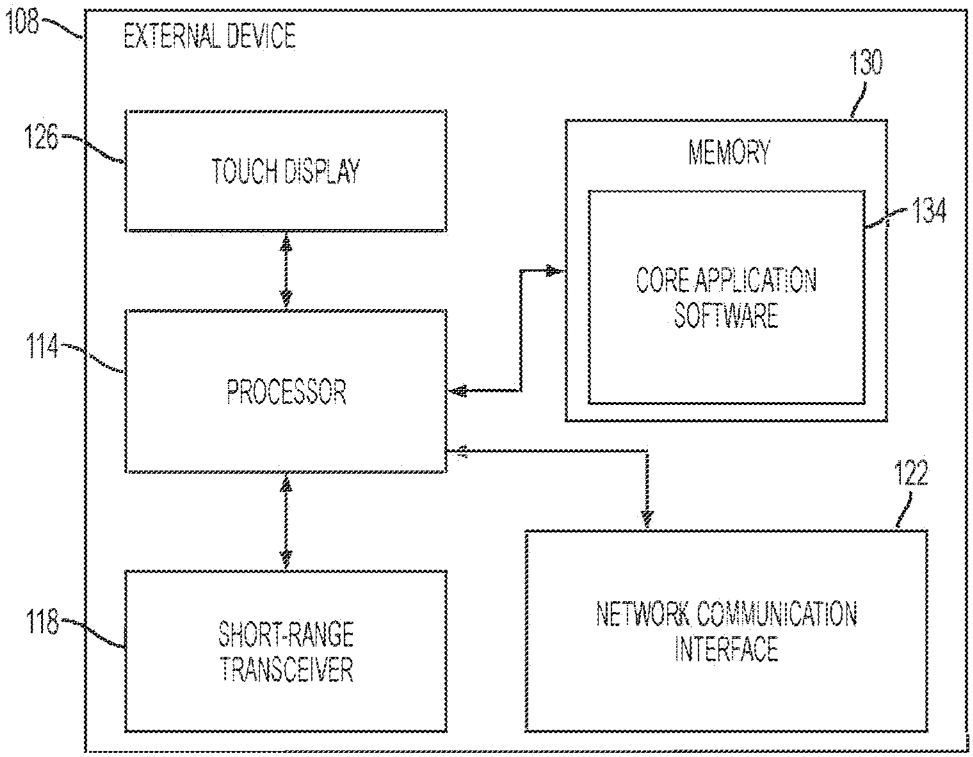
FIG. 2 illustrates a block diagram of an external device of the communication system.

As shown in FIG. 2, the external device 108 includes an external device processor 114, a short-range transceiver 118, a network communication interface 122, a touch display 126, and a memory 130. The external device processor 114 is coupled to the short-range transceiver 118, the network communication interface 122, the touch display 126, and the memory 130. The short-range transceiver 118, which may include or is coupled to an antenna (not shown), is configured to communicate with a compatible transceiver within the power tool 104. The short-range transceiver 118 can also communicate with other electronic devices. The network communication interface 122 communicates with a network to enable communication with the remote server 112. The network communication interface 122 may include circuitry that enables the external device 108 to communicate with the network. In some embodiments, the network may be an Internet network, a cellular network, another network, or a combination thereof.

The memory 130 of the external device 108 also stores core application software 134. The external device processor 114 accesses and executes the core application software 134 in memory 130 to launch a control application that receives inputs from the user for the configuration and operation of the power tool 104. The short-range transceiver 118 of the external device 108 is compatible with a transceiver of the power tool 104 (described in further detail below). The short-range transceiver may include, for example, a Bluetooth® communication controller. The short-range transceiver allows the external device 108 to communicate with the power tool 104.

The remote server 112 may store data obtained by the external device 108 from, for example, the power tool 104. The remote server 112 may also provide additional functionality and services to the user. In one embodiment, storing the information on the remote server 112 allows a user to access the information from a plurality of different devices and locations (e.g., a remotely located desktop computer). In another embodiment, the remote server 112 may collect information from various users regarding their power tool devices and provide statistics or statistical measures to the user based on information obtained from the different power tools. For example, the remote server 112 may provide statistics regarding the experienced efficiency of the power tool 104, typical usage of the power tool 104, and other relevant characteristics and/or measures of the power tool 104. In some embodiments, the power tool 104 may be configured to communicate directly with the server 112 through an additional wireless interface or with the same wireless interface that the power tool 104 uses to communicate with the external device 108.

The power tool 104 is configured to perform one or more specific tasks (e.g., drilling, cutting, fastening, pressing, lubricant application, sanding, heating, grinding, bending, forming, impacting, polishing, lighting, etc.). For example, an impact wrench is associated with the task of generating a rotational output (e.g., to drive a bit), while a reciprocating saw is associated with the task of generating a reciprocating output motion (e.g., for pushing and pulling a saw blade). The task(s) associated with a particular tool may also be referred to as the primary function(s) of the tool.

Figure 3:
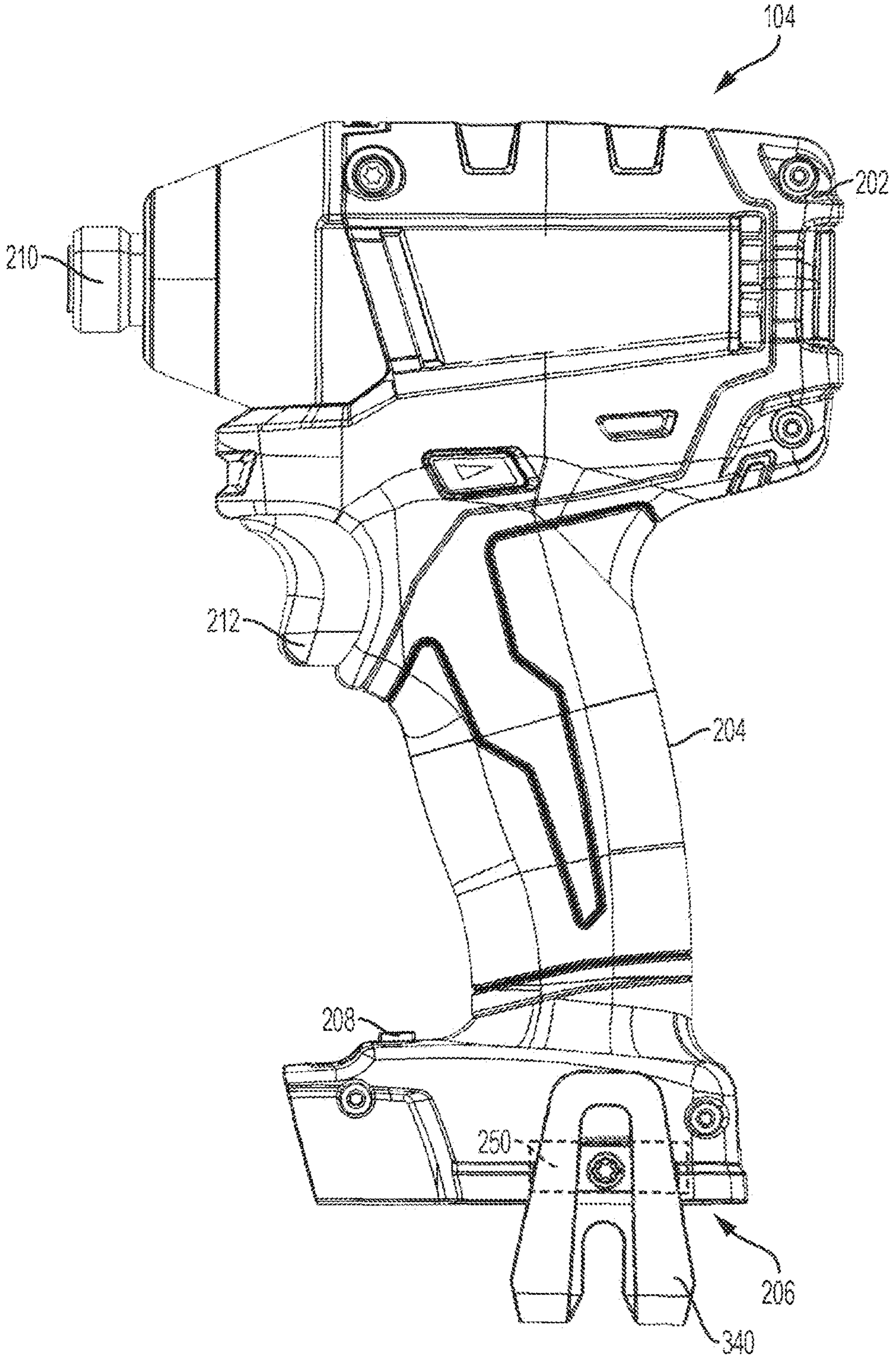
FIG. 3 illustrates a power tool of the communication system.

Although the power tool 104 illustrated and described herein is an impact wrench, embodiments of the invention similarly apply to and can be used in conjunction with a variety of power tools (e.g., a power drill, a hammer drill, a pipe cutter, a sander, a nailer, a grease gun, etc.). As shown in FIG. 3, the power tool 104 includes a main body 202, a handle 204, a battery pack receiving portion 206, selection switch 208, an output drive device or mechanism 210, and a trigger 212 (or other actuator). The power tool 104 further includes a motor 214 (see FIG. 14) within the housing and having a rotor and a stator. The rotor is coupled to a motor shaft arranged to produce an output outside of the housing via the output drive device or mechanism 210. The housing of the power tool 104 (e.g., the main body 202 and the handle 204) are composed of a durable and light-weight plastic material. The drive device 210 is composed of a metal (e.g., steel). The drive device 210 on the power tool 104 is a socket. However, each power tool 104 may have a different drive device 210 specifically designed for the task associated with the power tool 104. For example, the drive device 210 for a power drill may include a bit driver, while the drive device 210 for a pipe cutter may include a blade. The selection switch 208 is configured to select an operation mode for the power tool 104. Different operation modes may have different speed or torque levels, or may control the power tool 104 based on different sets of parameters.

Figure 4:
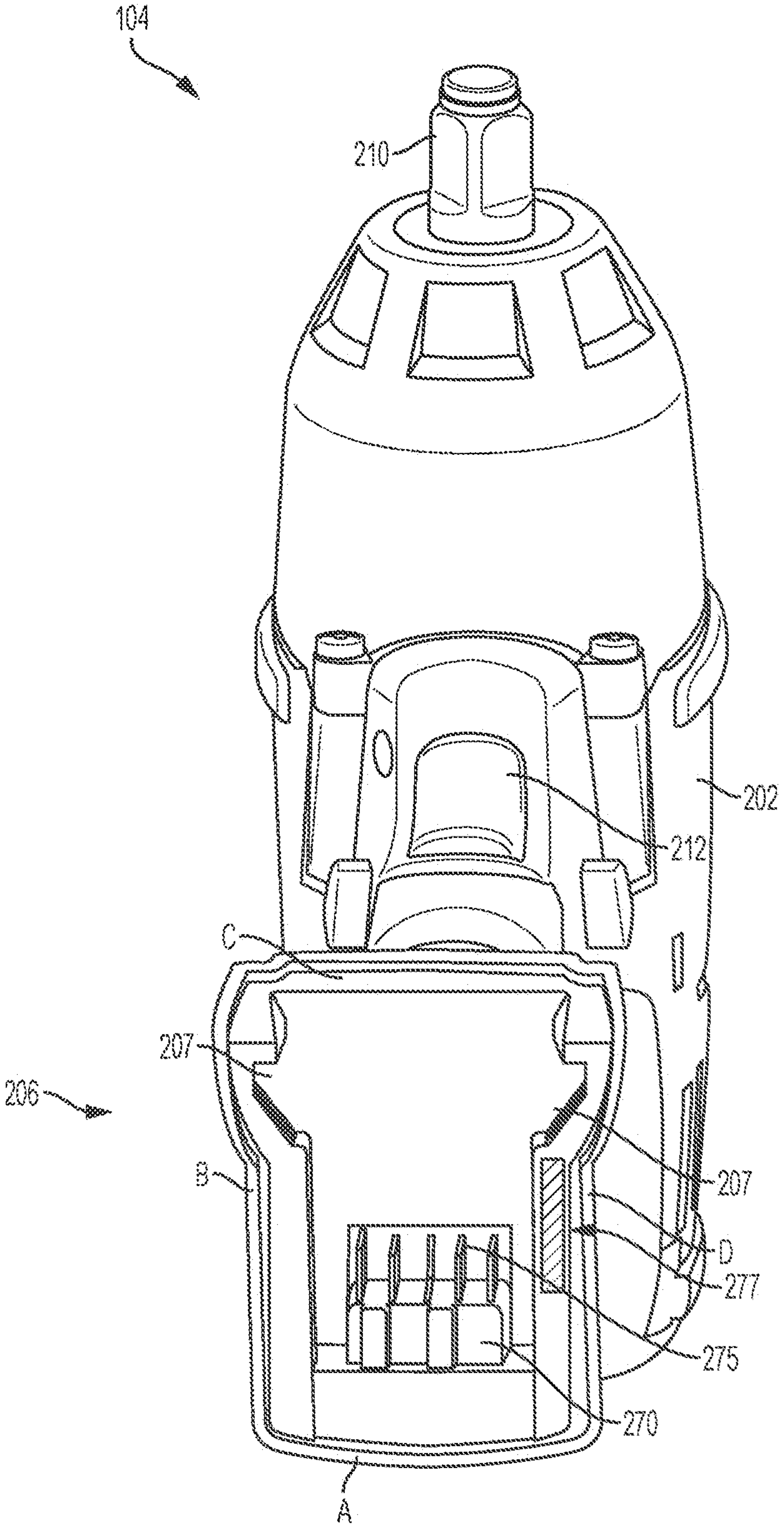
FIG. 4 illustrates a battery pack receiving portion including a compartment.

FIG. 4 illustrates the battery pack receiving portion 206. The battery pack receiving portion 206 is configured to receive and couple to a battery pack, for example, power tool device 104*b* illustrated in FIG. 1. The battery pack provides power to the power tool 104. The battery pack may also be referred to as a main power source. The battery pack receiving portion 206 includes a connecting structure to engage a mechanism that secures the battery pack and a terminal block 270 to electrically connect the battery pack to the power tool 104. In the illustrated embodiment, the connecting structure includes guides 207 and notches 209 (see FIGS. 12B and 12C) to secure the battery pack to the power tool 104. The terminal block 270 includes terminals 275 that make contact with terminals of the battery pack when the battery pack is coupled to the battery pack receiving portion 206. Such contact allows for the power tool 104 to be electrically connected to the battery pack.

In the illustrated embodiment, the battery pack receiving portion 206 also includes a compartment 277, also referred to as an irreversibly locking compartment 277. The compartment 277 is positioned adjacent the connecting structure that receives the battery pack and is a separate compartment of the tool housing. In particular, the compartment 277 is positioned under the selection switch 208 in a recess spanning a dividing line of the power tool's clam shell housing. The foot of the power tool 104 (i.e., the battery pack receiving portion 206) defines a footprint perimeter of the power tool 104. The perimeter is defined by the edges A, B, C, D of the battery pack receiving portion 206. As shown in FIG. 4, the compartment 277 is positioned on a lateral side (i.e., side B or D) of the battery pack receiving portion 206.

Figure 5:
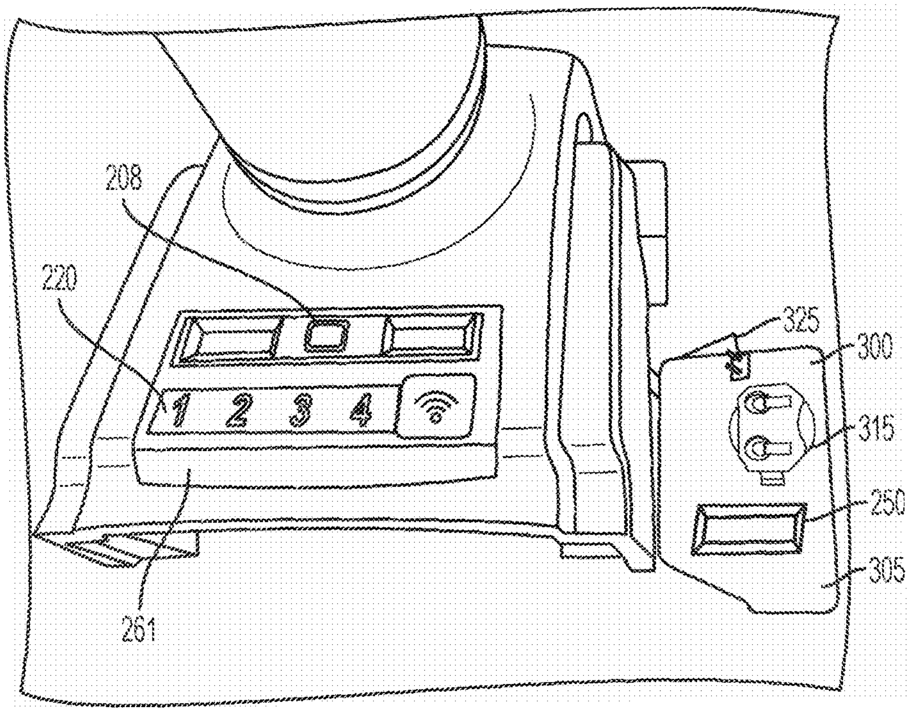
FIG. 5 illustrates a top view of a foot of the power tool.
Figure 6:
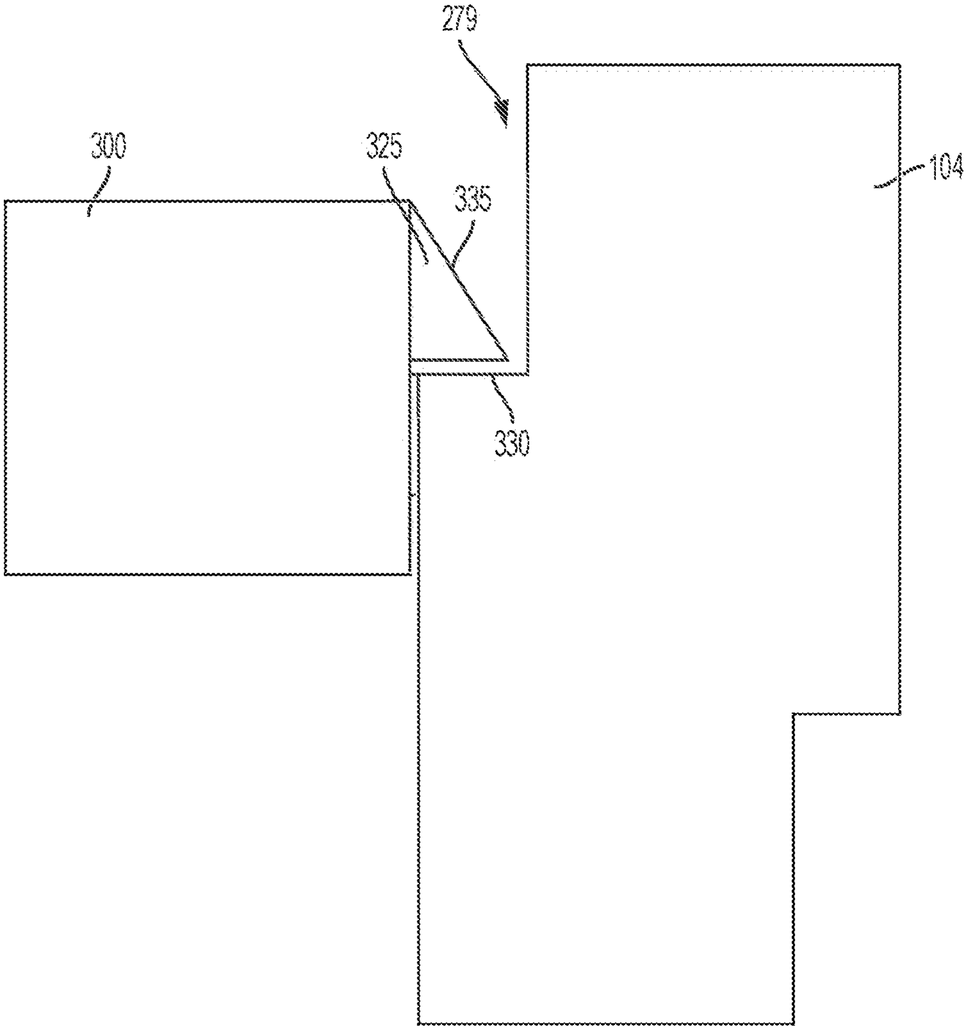
FIG. 6 illustrates a schematic diagram of an irreversible lock of the compartment.

The compartment 277 includes an irreversible lock 279 (FIG. 6). The irreversible lock 279 refers to a lock that is permanently locked once and cannot be unlocked, for example, without damaging the lock or defeating lock security. In contrast, a reversible lock is designed to enable locking and unlocking by a user. In particular, the irreversible lock 279 engages with an inserted secondary device such that once the secondary device is inserted into the compartment 277, the secondary device becomes non-removable from the power tool 104. For example, in the illustrated embodiment, the compartment 277 receives a wireless communication device 300 as the secondary device. FIG. 5 illustrates a top view of the foot of the power tool 104 with the insertable wireless communication device 300 removed from the compartment 277. The wireless communication device 300 includes an independent assembly within the power tool 104 that includes its own independent printed circuit board (PCB) 305. Inserting the wireless communication device 300 enables the power tool 104 to communicate with the external device 108, as described above. In the illustrated embodiment and as described in further detail below, the wireless communication device 300 includes a wireless communication controller 250 (FIG. 15), a backup power source 252 (FIG. 15), an indicator light 320 (FIG. 15), and a lock mating tooth 325 (FIG. 5).

The lock mating tooth 325 engages with the lock 279, as shown in FIG. 6. In the illustrated embodiment, the lock mating tooth 325 engages with a mating tab 330 of the irreversible lock 279 when the wireless communication device 300 is fully inserted into the compartment 277. Because of the ramp 335 of the lock mating tooth 325, the wireless communication device 300 can be inserted into the compartment 277. Once the lock mating tooth 325, however, passes the mating tab 330, the edge of the lock mating tooth 325 engages with the mating tab 330, and the wireless communication device 300 becomes non-removable from the compartment 277. When the wireless communication device 300 is inserted into the compartment 277, the lock 279 engages with the mating tooth 325 of the wireless communication device 300 and prevents the insertable wireless communication device 300 from being removed from the compartment 277. In other words, once the insertable wireless communication device 300 is inserted into the compartment 277, the insertable wireless communication device 300 is permanently secured to the power tool 104 and becomes non-removable from the power tool 104.

In the illustrated embodiment, the lock 279 includes a single mating tab 330 that engages with the mating tooth 325 of the wireless communication device 300. In other embodiments, however, the lock 279 may include multiple mating tabs to more securely retain the wireless communication device 300. For example, the lock 279 may include two mating tabs, one at each side, such that when the wireless communication device 300 is inserted, two mating teeth can engage with the lock 279. In some embodiments, the irreversible lock includes a lock mating tooth that engages with a mating tab of the wireless communication device 300. In such embodiments, the wireless communication device 300 is inserted into the compartment until the mating tab passes the mating tooth of the lock. When the mating tab has passed the mating tooth of the lock, the wireless communication device 300 becomes permanently secured to the power tool 104. In other embodiments, a different type of irreversible locking mechanism is used. For example, the wireless communication device 300 may be rotated to engage the irreversible lock 279.

Figure 7A:
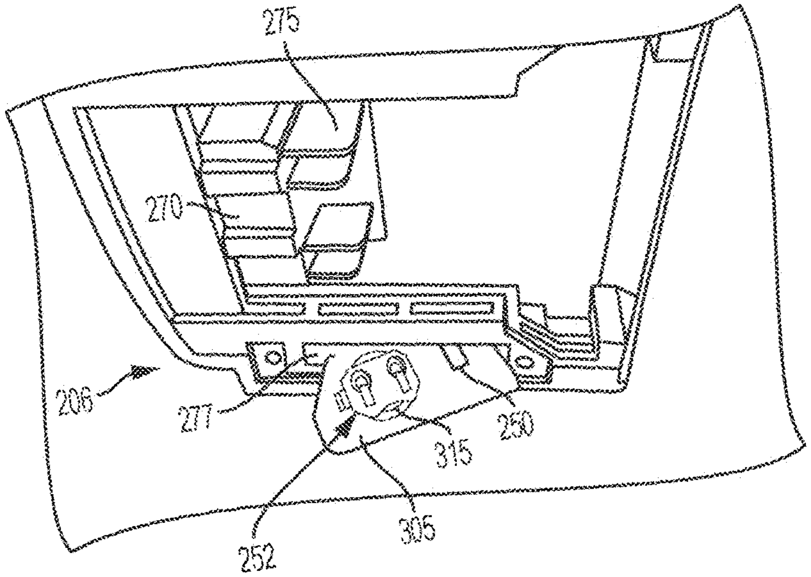
FIG. 7A illustrates a first view of the battery pack receiving portion of the power tool as a wireless communication device is inserted into the compartment.
Figure 7B:
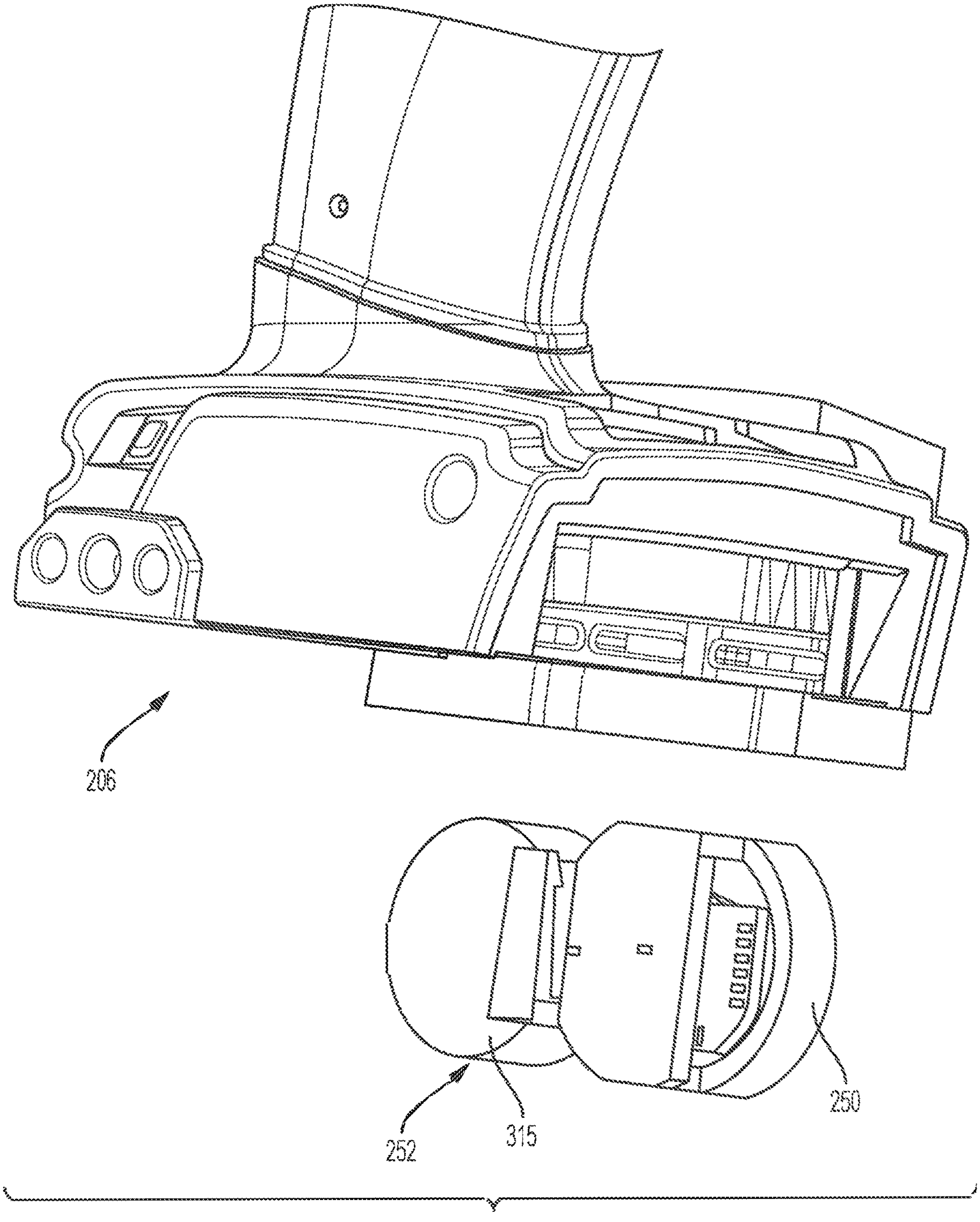
FIG. 7B illustrates a second view of the battery pack receiving portion of the power tool as a wireless communication device is inserted into the compartment.
Figure 8:
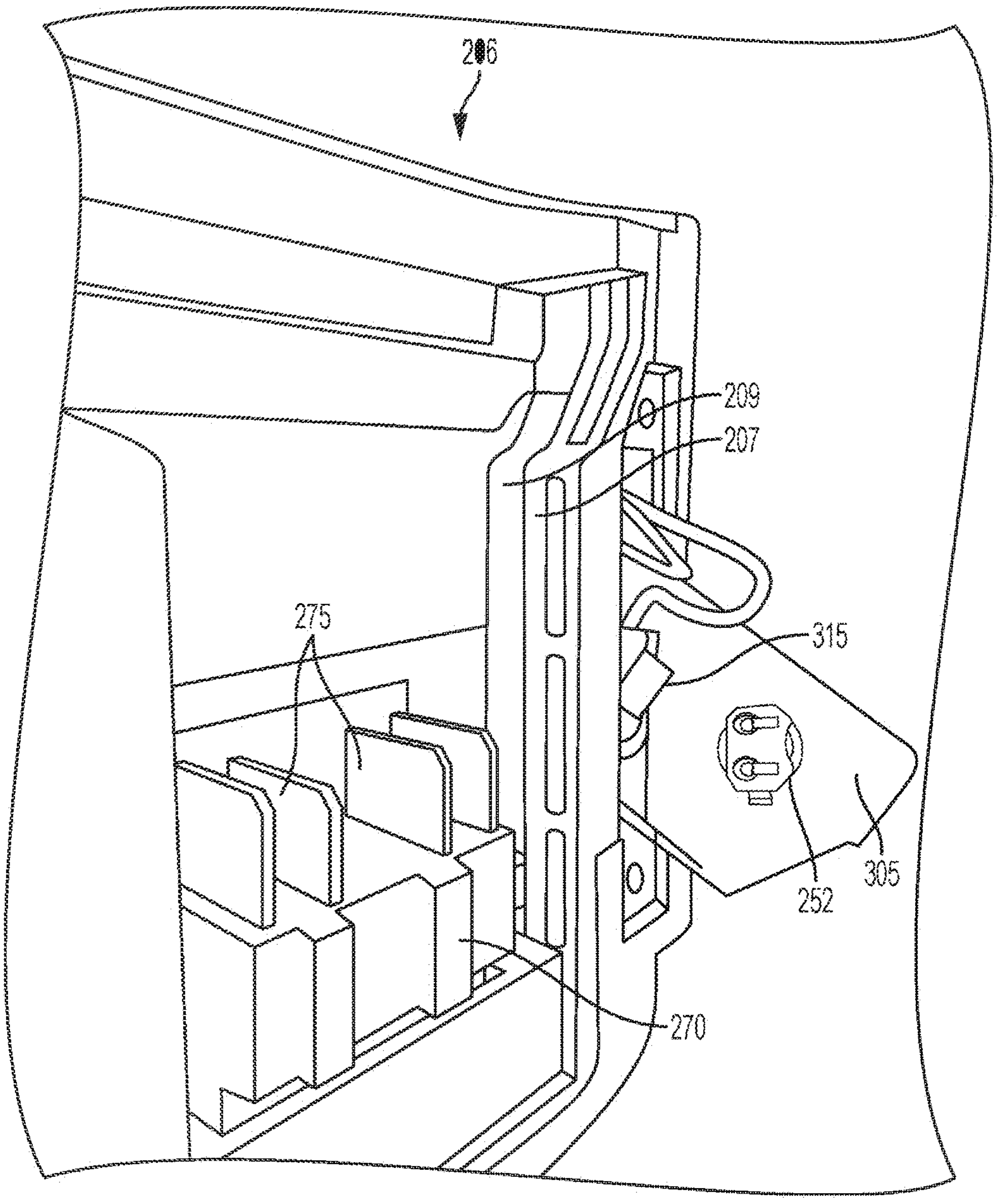
FIG. 8 illustrates a third view of the battery pack receiving portion of the power tool as the wireless communication device is inserted into the compartment.
Figure 9:
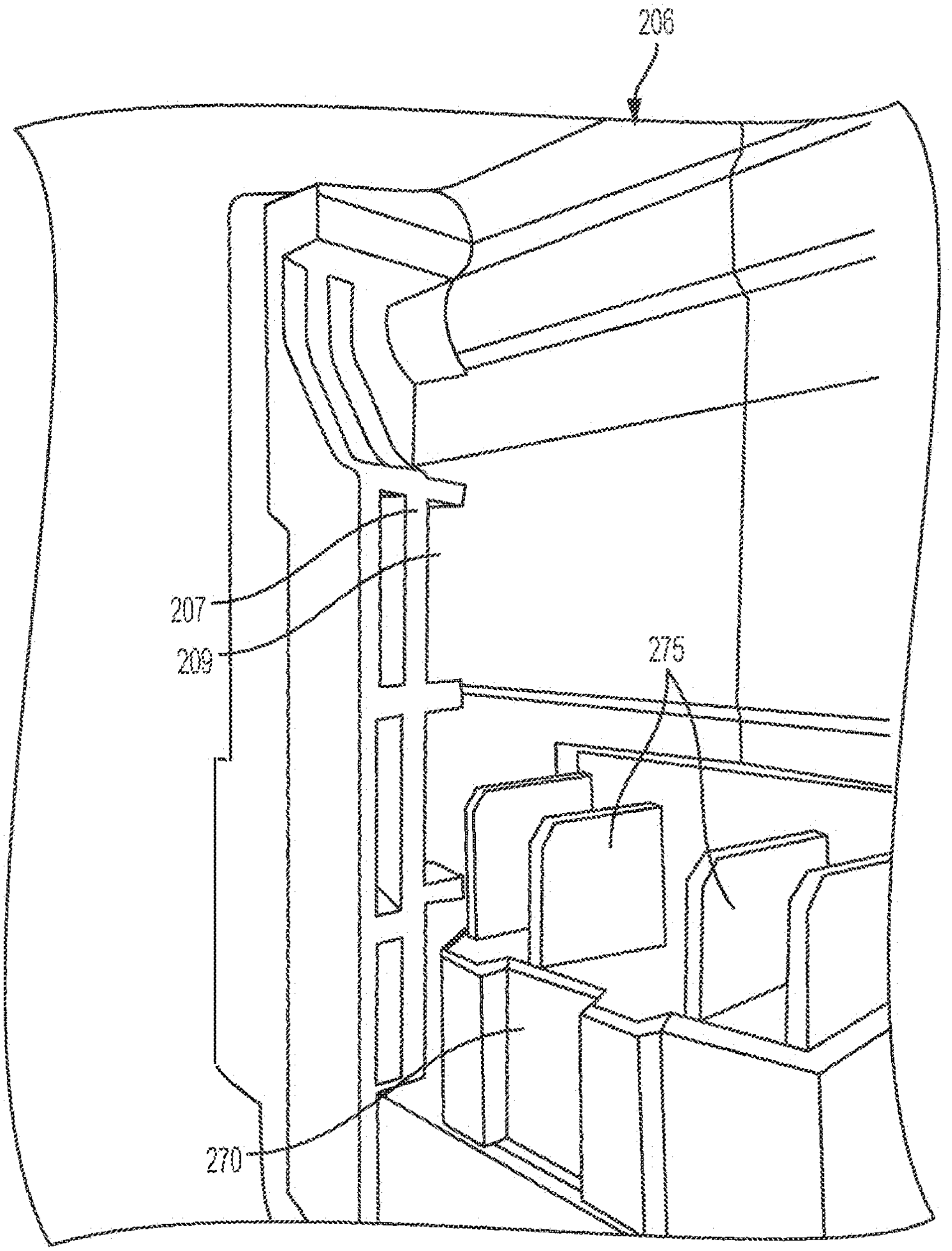
FIG. 9 illustrates a second edge of the battery pack receiving portion.

FIGS. 7A, 7B, and 8 illustrate the battery pack receiving portion 206 as the wireless communication device 300 is inserted into the compartment 277. FIG. 9 illustrates the other edge of the battery pack receiving portion 206 and shows that, while a first side of the battery pack receiving portion 206 includes the compartment 277, the opposite side of the battery pack receiving portion 206 does not include the compartment. Positioning the compartment 277 in the battery pack receiving portion 206 avoids having the compartment 277 straddle the interface of the power tool's right and left clam shell housing portion, which could weaken the structural integrity of the housing. Furthermore, by positioning the compartment 277 in the battery pack receiving portion 206, the manufacturing of the housing remains mostly the same. In other words, since the position of the compartment 277 is within an already existing portion of the housing, most of the portions manufactured to make the housing can remain the same and a limited number of changes to the housing design have to be made. For example, as shown more clearly in FIGS. 7-9, both sides of the housing have the same profile. By placing the compartment 277 in the battery pack receiving portion 206, the wireless communication device 300 utilizes space not previously utilized, keeping the power tool 104 compact and efficient.

Figure 10:
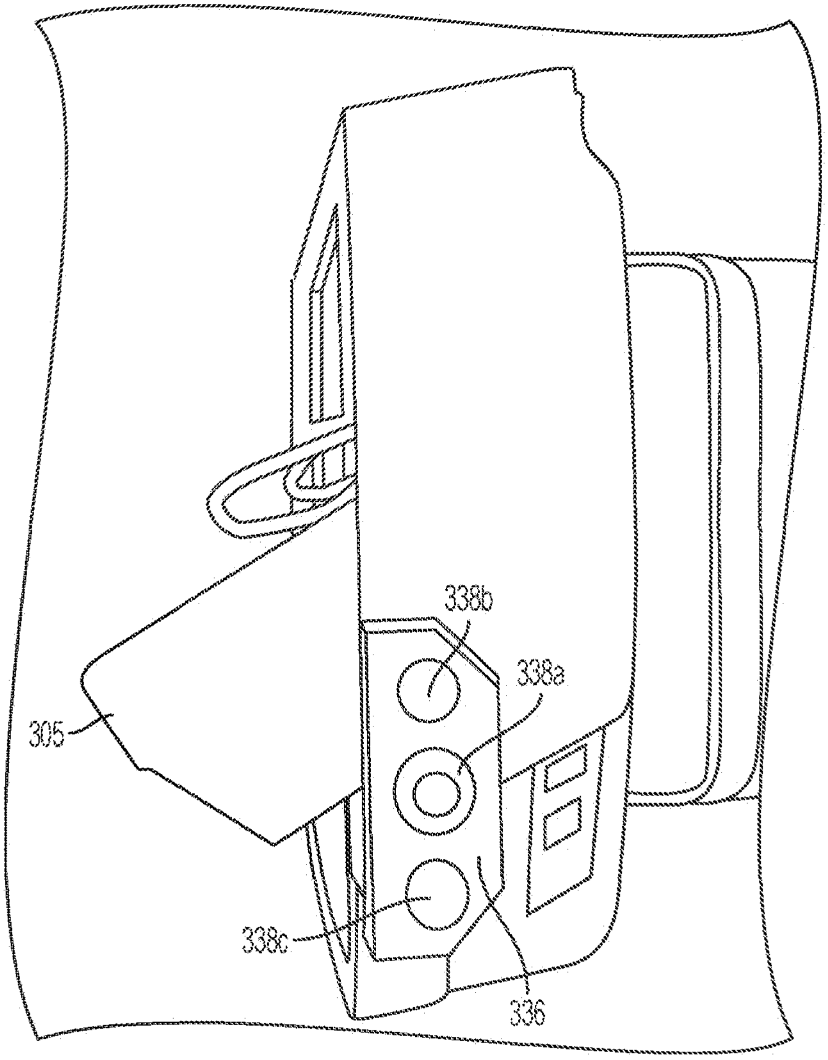
FIG. 10 illustrates a side view of a foot of the power tool as the wireless communication device is inserted into the compartment.

The position of the compartment 277, even when the wireless communication device 300 is inserted, also does not interfere with any of the foot accessories of the power tool 104. For example, on the same side of the foot that houses the compartment 277, a belt hook mount 336 is provided having three recesses 338*a*, 338*b*, and 338*c* (FIG. 10) for attachment of a belt hook 340 (FIG. 3). Additionally, a lanyard is attachable to the belt hook mount 336. In the illustrated embodiment, the power tool 104 includes the belt hook mount 336 on both lateral sides, including the lateral side having the compartment 277, yet the compartment 277 does not interfere with the attachment of the belt hook 340. Each of the belt hook mounts 336 is a protrusion from one of the lateral sides of the power tool 104. The belt hook 340 includes an attachment end with a through hole 341 and two bosses not shown. The throughole 341 aligns with the (threaded) recess 338*a*, which includes a threaded insert, and the each of the bosses aligns with one of the (alignment) recesses 338*b* and 338*c*. To secure the belt hook 340 to the belt hook mount 336, a screw is inserted through the through hole 341 and into the threaded recess 338*a* where the screw is rotated to fasten the belt hook 340. The recesses 338*a*, 338*b*, and 338*c* of the belt hook mount 336 stop short of, and do not extend into the, the compartment 277.

Figure 11:
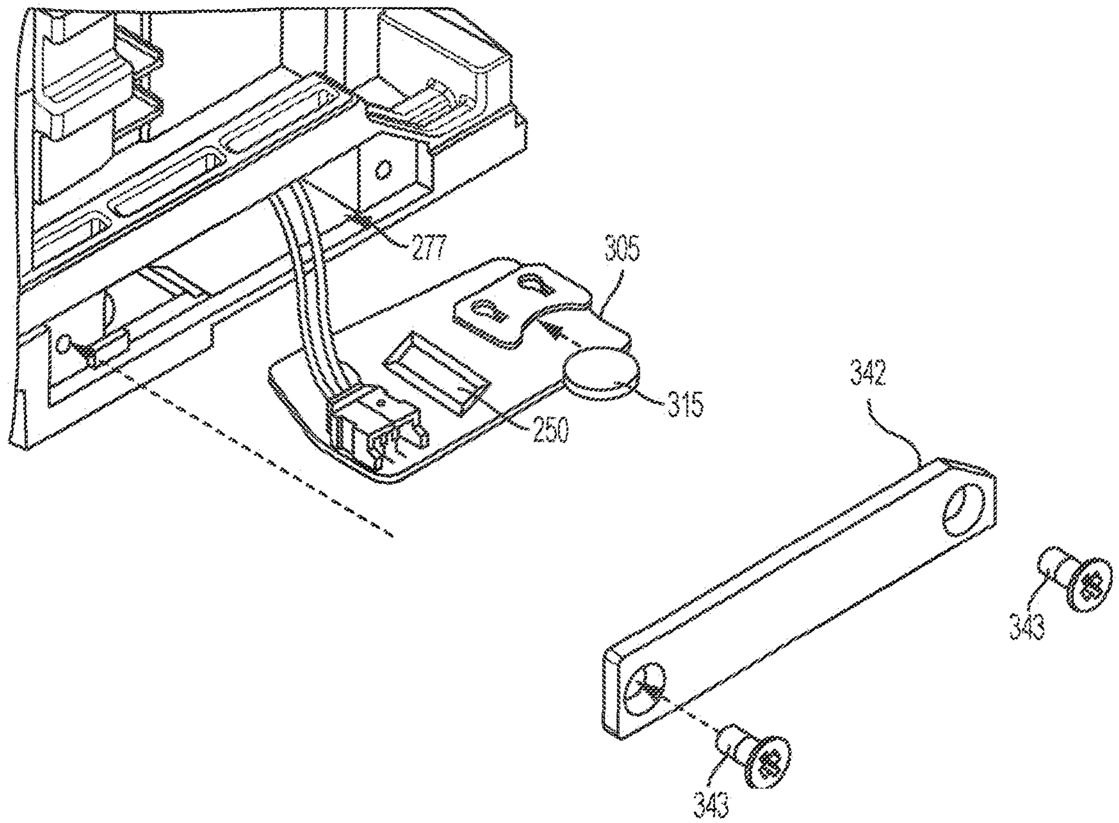
FIG. 11 illustrates a first embodiment of the compartment including a plastic cover.
Figure 12:
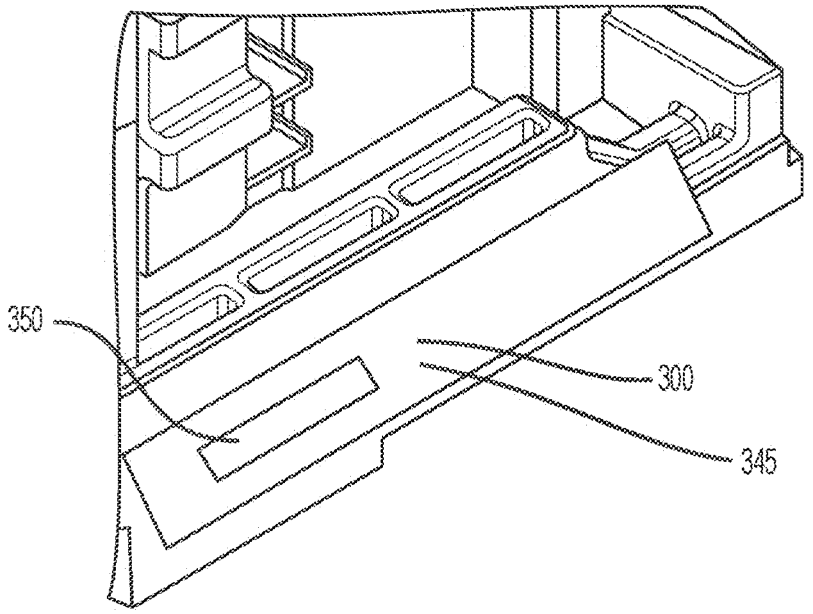
FIG. 12 illustrates a second embodiment of the compartment.

In one embodiment, the compartment 277 includes a plastic cover 342, as shown in FIG. 11. In the illustrated embodiment, the removable plastic cover 342 is attached to the power tool housing by two screws 343. The screws 343 can be removed to insert the wireless communication device 300. In some embodiments, the plastic cover 342 includes an elastomer material along its perimeter. When the plastic cover 342 is secured to the power tool housing, the elastomer material abuts the opening of the compartment 277 and seals the compartment 277 from ingress of one or more of dust, water, and other contaminants. The cover 342 and the screws 343 can then be replaced after inserting the wireless communication module. In some embodiments, the compartment 277 is accessible via a sliding or hinged door. In some embodiments, the sliding door may be biased to a closed position by a spring. In other embodiments, however, the wireless communication device 300 includes a side that remains exposed after insertion into the lockable compartment 277. For example, as shown in FIG. 12, the plastic cover 342 is removed from the power tool 104 to insert the wireless communication device 300. When inserted, a side 345 of the wireless communication device 300 remains exposed and replaces the plastic cover 342. In other words, once the wireless communication device 300 is inserted, the plastic cover 342 may be discarded as it will not be placed back on the power tool 104. In the illustrated embodiment, the side 345 includes a lens 350 to show the indicator light 320 of the wireless communication device 300. The lens 350 is a flat lens such that the lens 350 and the side 345 are flush with the surface along the bottom of the battery pack receiving portion 206. Maintaining the bottom of the battery pack receiving portion 206 flat allows the power tool 104 to be balanced when in an upright position (e.g., when the power tool 104 is supported by the battery pack receiving portion 206).

Figure 13:
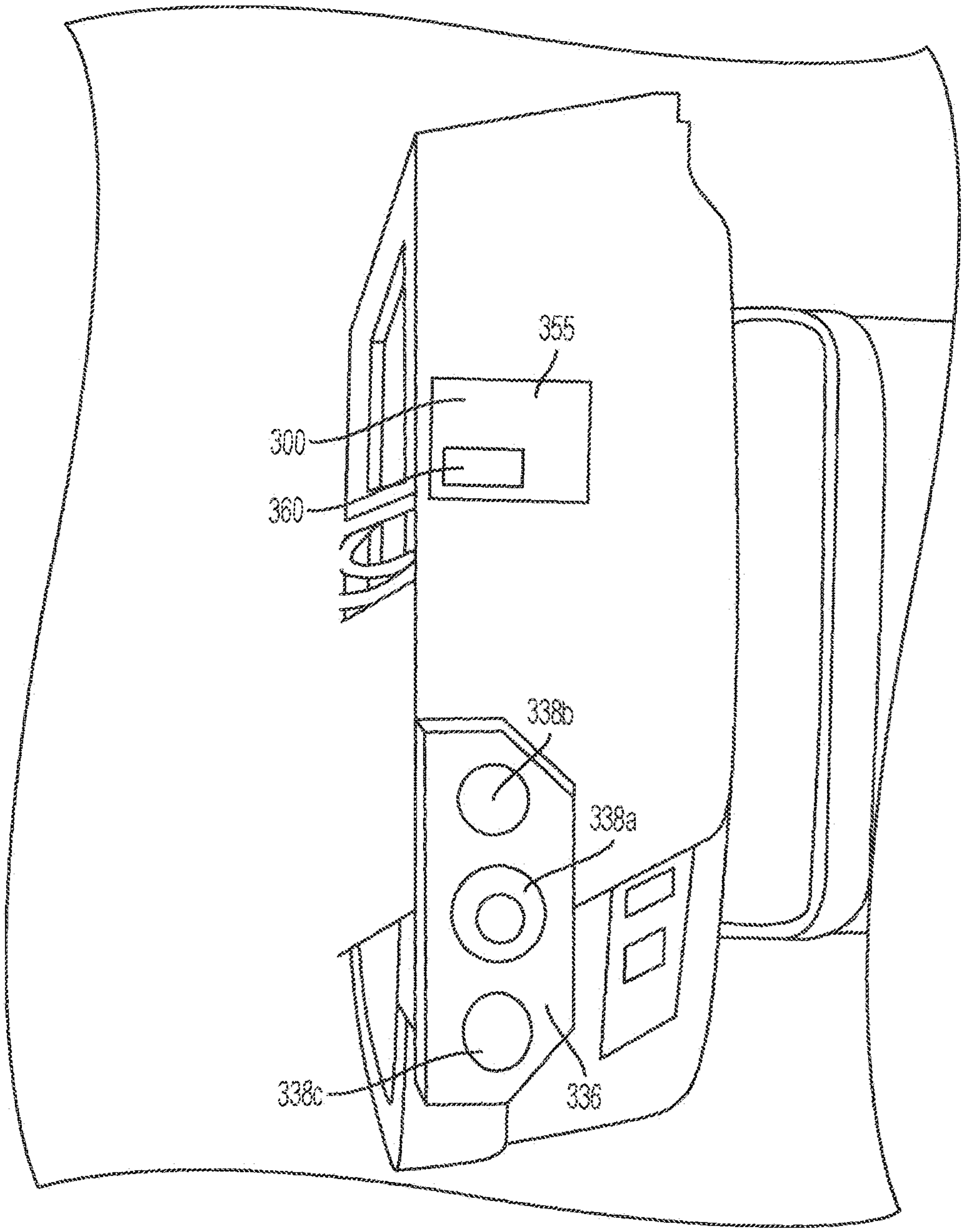
FIG. 13 illustrates a third embodiment of the compartment.

FIG. 13 illustrates another embodiment in which the side exposed by the wireless communication device 300 is positioned along the length of the power tool 104. In such embodiments, the cover 342 may optionally be replaced on the power tool 104, but a second side 355 of the wireless communication device 300 is exposed on the side of the power tool 104. As shown in FIG. 13, the second side 355 of the wireless communication device 300 includes a lens 360 to display the indicator light 320 of the wireless communication device 300. Since the lens 360 is positioned on the side of the power tool 104, the lens 360 may not be a flat lens and may instead include a curved lens. In some embodiments, the wireless communication device 300 may also include an elastomeric material around the perimeter of the side 345 of the wireless communication device 300. In other words, the elastomeric material wraps around the exposed side of the wireless communication device 300. When the wireless communication device 300 is inserted into the compartment 277, the elastomeric material abuts the opening of the compartment 277 and seals the compartment 277 from ingress of one or more of dust, water, and other contaminants. The elastomeric material protects the electronic leads and connections of the compartment 277 and the wireless communication device 300 from such contaminants. The wireless communication device 300 may include the elastomeric material regardless of whether a side of the wireless communication device 300 is exposed. In other words, the wireless communication device 300 may include the elastomeric material when none of its sides are exposed and the plastic cover 342 is replaced on the power tool 104 after inserting the wireless communication device. In some embodiments, the cover 342 described above includes elastomeric material around its perimeter to seal and prevent ingress of contaminants into the compartment 277 in addition to or instead of the elastomeric material of the wireless communication device 300.

Figure 14:
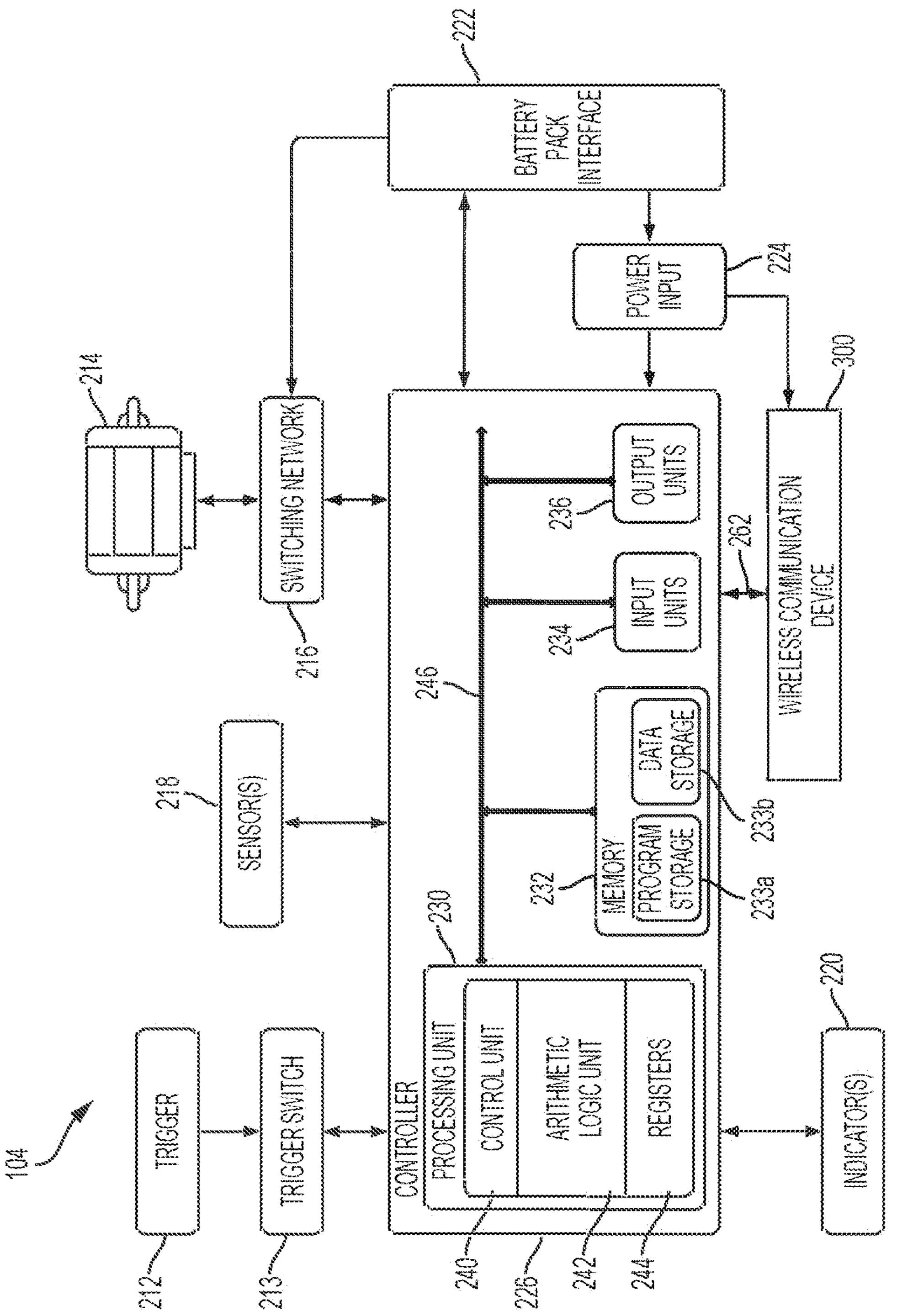
FIG. 14 illustrates a block diagram of the power tool.

FIG. 14 illustrates a block diagram of some embodiments of the power tool 104, such as those with motors (e.g., the impact driver 104*a* of FIG. 1). As shown in FIG. 14, the power tool 104 also includes a motor 214. The motor 214 actuates the drive device 210 and allows the drive device 210 to perform the particular task. The primary power source (e.g., the battery pack 104*b*) 215 couples to the power tool 104 and provides electrical power to energize the motor 214. The trigger 212 is coupled with a trigger switch 213. The trigger 212 moves in a first direction towards the handle 204 when the trigger 212 is depressed by the user. The trigger 212 is biased (e.g., with a spring) such that it moves in a second direction away from the handle 204, when the trigger 212 is released by the user. When the trigger 212 is depressed by the user, the trigger switch 213 becomes activated, which causes the motor 214 to be energized. When the trigger 212 is released by the user, the trigger switch 213 becomes deactivated, and the motor 214 is de-energized.

As shown in FIG. 14, the power tool 104 also includes a switching network 216, sensors 218, indicators 220, a battery pack interface 222, a power input unit 224, and a controller 226. The battery pack interface 222 includes a combination of mechanical (e.g., the battery pack receiving portion 206) and electrical components configured to and operable for interfacing (e.g., mechanically, electrically, and communicatively connecting) the power tool 104 with a battery pack 104*b*. The battery pack interface 222 transmits the power received from the battery pack 104*b* to the power input unit 224. The power input unit 224 includes combinations of active and passive components (e.g., voltage step-down controllers, voltage converters, rectifiers, filters, etc.) to regulate or control the power received through the battery pack interface 222 and provided to the wireless communication controller 250 and controller 226.

The switching network 216 enables the controller 226 to control the operation of the motor 214. Generally, when the trigger 212 is depressed (i.e., the trigger switch 213 is closed), electrical current is supplied from the battery pack interface 222 to the motor 214, via the switching network 216. When the trigger 212 is not depressed, electrical current is not supplied from the battery pack interface 222 to the motor 214. In some embodiments, the trigger switch 213 may include sensors to detect the amount of trigger pull (e.g., released, 20% pull, 50% pull, 75% pull, or fully depressed). In some embodiments, the amount of trigger pull detected by the trigger switch 213 is related to or corresponds to a desired speed of rotation of the motor 214. In other embodiments, the amount of trigger pull detected by the trigger switch 213 is related to or corresponds to a desired torque, or other parameter. In response to the controller 226 receiving the activation signal from the trigger switch 213, the controller 226 activates the switching network 216 to provide power to the motor 214. The switching network 216 controls the amount of current available to the motor 214 and thereby controls the speed and torque output of the motor 214. The switching network 216 may include numerous field effect transistors (FETs), bipolar transistors, or other types of electrical switches.

The sensors 218 are coupled to the controller 226 and communicate to the controller 226 various signals indicative of different parameters of the power tool 104 or the motor 214. The sensors 218 include, for example, one or more current sensors, one or more voltage sensors, one or more temperature sensors, one or more speed sensors, one or more Hall Effect sensors, etc. For example, the speed of the motor 214 can be determined using a plurality of Hall Effect sensors to sense the rotational position of the motor 214. In some embodiments, the controller 226 controls the switching network 216 in response to signals received from the sensors 218. For example, if the controller 226 determines that the speed of the motor 214 is increasing too rapidly based on information received from the sensors 218, the controller 226 may adapt or modify the active switches or switching sequence within the switching network 216 to reduce the speed of the motor 214. Data obtained via the sensors 218 may be saved in the controller 226 as tool usage data.

The indicators 220 are also coupled to the controller 226 and receive control signals from the controller 226 to turn on and off or otherwise convey information based on different states of the power tool 104. The indicators 220 include, for example, one or more light-emitting diodes ("LED"), or a display screen. The indicators 220 can be configured to display conditions of, or information associated with, the power tool 104. For example, the indicators 220 are configured to indicate measured electrical characteristics of the power tool 104, the status of the power tool 104, etc. The indicators 220 may also include elements to convey information to a user through audible or tactile outputs.

As described above, the controller 226 is electrically and/or communicatively connected to a variety of modules or components of the power tool 104. In some embodiments, the controller 226 includes a plurality of electrical and electronic components that provide power, operational control, and protection to the components and modules within the controller 226 and/or power tool 104. For example, the controller 226 includes, among other things, a processing unit 230 (e.g., a microprocessor, a microcontroller, or another suitable programmable device), a memory 232, input units 234, and output units 236. The processing unit 230 includes, among other things, a control unit 240, an arithmetic logic unit ("ALU") 242, and a plurality of registers 244 (shown as a group of registers in FIG. 14). In some embodiments, the controller 226 is implemented partially or entirely on a semiconductor (e.g., a field-programmable gate array ["FPGA"] semiconductor) chip, such as a chip developed through a register transfer level ("RTL") design process.

The memory 232 includes, for example, a program storage area 233*a* and a data storage area 233*b*. The program storage area 233*a* and the data storage area 233*b* can include combinations of different types of memory, such as read-only memory ("ROM"), random access memory ("RAM") (e.g., dynamic RAM ["DRAM"], synchronous DRAM ["SDRAM"], etc.), electrically erasable programmable read-only memory ("EEPROM"), flash memory, a hard disk, an SD card, or other suitable magnetic, optical, physical, or electronic memory devices. The processing unit 230 is connected to the memory 232 and executes software instructions that are capable of being stored in a RAM of the memory 232 (e.g., during execution), a ROM of the memory 232 (e.g., on a generally permanent basis), or another non-transitory computer readable medium such as another memory or a disc. Software included in the implementation of the power tool 104 can be stored in the memory 232 of the controller 226. The software includes, for example, firmware, one or more applications, program data, filters, rules, one or more program modules, and other executable instructions. The controller 226 is configured to retrieve from memory and execute, among other things, instructions related to the control processes and methods described herein. The controller 226 is also configured to store power tool information on the memory 232. The power tool information stored on the memory 232 may include power tool identification information (e.g., including a unique identifier of the power tool 104) and also power tool operational information including information regarding the usage of the power tool 104, information regarding the maintenance of the power tool 104, power tool trigger event information, parameter information to operate the power tool 104 in a particular mode, and other information relevant to operating or maintaining the power tool 104, such information is generally referred to as power tool information. In other constructions, the controller 226 includes additional, fewer, or different components.

The controller 226 also includes a data connection (e.g., a communication channel) 262 to optionally couple to the insertable wireless communication device 300. In some embodiments, the data connection 262 includes a ribbon cable that is connected from the controller 226 to a set of leads in the compartment 277. When the wireless communication device 300 is inserted into the compartment 277, a set of leads on the wireless communication device 300 connect with the leads inside the compartment 277 and communication between the controller 226 and the wireless communication device 300 is thereby enabled (for example, see FIGS. 21C and 21D).

Figure 15:
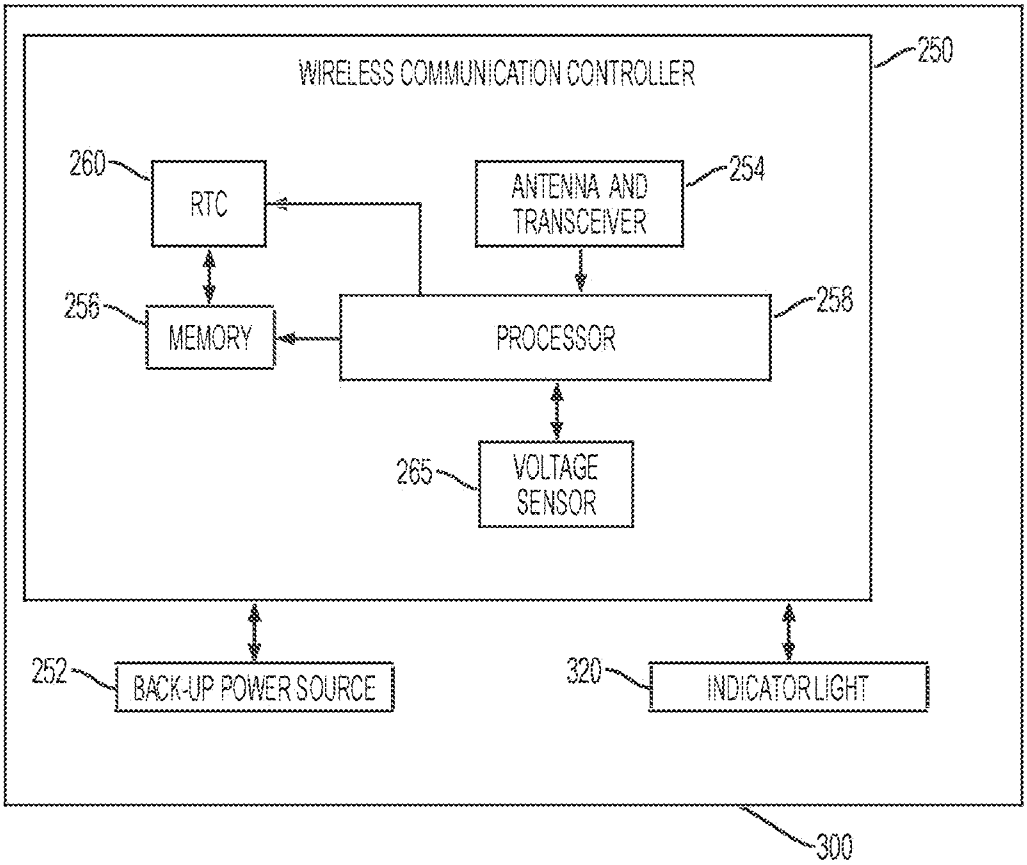
FIG. 15 illustrates a block diagram of the wireless communication device.

FIG. 15 illustrates a block diagram of the wireless communication device 300. The wireless communication device 300 enables the controller 226 of the power tool 104 to communicate with the external device 108 to transmit power tool data (e.g., power tool usage data, configuration data, maintenance data, and the like) and to receive power tool configuration data (e.g., settings for operating the power tool 104 in a particular mode and the like). As shown in FIG. 15, the wireless communication device 300 includes a wireless communication controller 250, a backup power source 252, and a real-time clock (RTC) 260. In some embodiments, the RTC 260 is part of the wireless communication controller 250 as shown in FIG. 15. In other embodiments, however, the RTC 260 is part of the power tool 104 and is permanently connected to the controller 226.

The wireless communication controller 250 includes an antenna and radio transceiver 254, a memory 256, a processor 258, and the real-time clock (RTC) 260. The antenna and radio transceiver 254 operate together to send and receive wireless messages to and from an external device 108 and the processor 258. The memory 256 can store instructions to be implemented by the processor 258 and/or may store data related to communications between the power tool 104 and the external communication device 108 or the like. The processor 258 for the wireless communication controller 250 controls wireless communications between the power tool 104 and the external device 108. For example, the processor 258 associated with the wireless communication controller 250 buffers incoming and/or outgoing data, communicates with the controller 226, and determines the communication protocol and/or settings to use in wireless communications. In other words, the wireless communication controller 250 is configured to receive data from the power tool controller 226 and relay the information to the external device 108 via the antenna and transceiver 254. In a similar manner, the wireless communication controller 250 is configured to receive information (e.g., configuration and programming information) from the external device 108 via the antenna and transceiver 254 and relay the information to the power tool controller 226.

In the illustrated embodiment, the wireless communication controller 250 is a Bluetooth® controller. The Bluetooth® controller communicates with the external device 108 employing the Bluetooth® protocol. Therefore, in the illustrated embodiment, the external device 108 and the power tool 104 are within a communication range (i.e., in proximity) of each other while they exchange data. In other embodiments, the wireless communication controller 250 communicates using other protocols (e.g., Wi-Fi, cellular protocols, etc.) over a different type of wireless network. For example, the wireless communication controller 250 may be configured to communicate via Wi-Fi through a wide area network such as the Internet or a local area network, or to communicate through a piconet (e.g., using infrared or NFC communications). The communication via the wireless communication controller 250 may be encrypted to protect the data exchanged between the power tool 104 and the external device 108 (or network) from third parties.

When the wireless communication device 300 is first inserted into the compartment 277, the controller 226 initializes the wireless communication device 300. In one example, one of the leads in the compartment 277 includes a sensing lead coupled to the controller 226. When the signal on the sensing lead changes (e.g., from a high signal to a low signal), the controller 226 detects the insertion of the wireless communication device 300. The controller 226 then transmits identification information for the power tool 104 and for the controller 226 to the wireless communication device 300. The wireless communication device 300, and in particular, the wireless communication controller 250 stores the identification information of the power tool 104 and the controller 226. In the illustrated embodiment, the wireless communication controller 250 is configured to periodically broadcast the identification signal for the power tool 104, also referred to as identification information or identification data. The identification signal includes identification information for the power tool 104, such as a unique identifier. The external device 108 identifies the power tool 104 via the identification signal. Additionally or alternatively, the wireless communication controller 250 may be configured to respond to a ping signal from the external device 108. In other words, the wireless communication controller 250 may not periodically broadcast the identification signal, but rather the wireless communication controller 250 may wait for a ping signal from the external device 108 to send the identification signal. In some embodiments, the external device 108 generates a graphical user interface that identifies the wireless communication device 300 and allows the user to associate the wireless communication device 300 with the power tool 104. In some embodiments, such an association prompts the communication between the wireless communication device 300 and the controller 226.

The identification signal for the power tool 104 can then be used, via the wireless communication controller 250, to track the power tool 104. For example, the wireless communication controller 250 switches between operating in a connectable (e.g., full power) state and operating in an advertisement state. The wireless communication controller 250 operates in the connectable state when the battery pack 104*b* is attached to the power tool 104 and contains sufficient charge to power the wireless communication controller 250 and the controller 226, and to support substantive electronic data communication between the power tool 104 and the external device 108. When the power tool 104 is not connected to the battery pack 104*b*, the wireless communication controller 250 is powered by the backup power source 252 and operates in the advertisement state. While in the advertisement state, the wireless communication controller 250 receives power from the backup power source 252 (e.g., a coin cell battery, another type of battery cell, a capacitor, or another energy storage device). The backup power source 252 provides sufficient power for the wireless communication controller 250 to periodically broadcast an advertisement message, but may not provide sufficient power to allow the wireless communication controller 250 to engage in further data exchange with the external device 108, or, such further data exchange would deplete the backup power source 252 more rapidly than desired. In both the connectable state and the advertisement state, the wireless communication controller 250 periodically outputs the identification code corresponding to the power tool 104. In other words, the wireless communication controller periodically advertises the identity of the power tool 104. The external devices 108 that are within the communication range of the wireless communication controller 250 can receive the identification code from the wireless communication controller 250. The identification codes may include, for example, a global unique identification (GUID) that includes the power tool's specific make, model, and serial number.

The RTC 260 increments and keeps time independently of the other power tool components. In the illustrated embodiment, the RTC 260 is powered through the wireless communication controller 250 when the wireless communication controller 250 is powered. In some embodiments, however, the RTC 260 is a separate component from the wireless communication controller 250 and may be integrated into the power tool 104. In such embodiments, the RTC 260 receives power from the battery pack 104*b* (e.g., a main or primary power source) when the battery pack 215 is connected to the power tool 104. The RTC 260 receives power from the backup power source 252 (e.g., a coin cell battery, another type of battery cell, a capacitor, or another energy storage device) when the battery pack 104*b* is not connected to the power tool 104. Therefore, the RTC 260 keeps track of time regardless of whether the power tool 104 is in operation, and regardless of whether the battery pack 104*b* is connected to the power tool 104. When no power source is present (i.e., the battery pack 104*b* is detached from the power tool 104 and the backup power source 252 is removed or depleted), the RTC 260 stores the last valid time. When a power source is replaced (i.e., the battery pack 104*b* is attached to the power tool 104 and/or the backup power source 252 is replaced), the RTC 260 uses the stored time as a starting point to resume keeping time.

The starting time for the RTC 260 is set to current Greenwich Mean Time (GMT) time at the factory at time of manufacture. The time is updated or synchronized whenever the wireless communication controller 250 communicates with the external device 108. Because GMT time is independent of calendar, seasons, or time schemas, using GMT time allows the power tool 104 or the external device 108 to convert from time indicated by the RTC 260 to localized time for display to the user.

The backup power source 252 also provides power to the RTC 260 to enable continuous tracking of time. The backup power source 252 does not provide power to energize the motor 214, drive the drive device 210, or power the controller 226, and generally only powers the wireless communication controller 250, the indicator light 320, and the RTC 260 (e.g., in embodiments in which the RTC 260 is separate from the wireless communication controller 250) when the battery pack 104*b* is not attached to the power tool 104. In other embodiments, the backup power source 252 also provides power to low-power elements such as, for example, LEDs, and the like. In some embodiments, the wireless communication controller 250 includes a voltage sensor 265 (see FIG. 15) coupled to the backup power source 252. The wireless communication controller 250 uses the voltage sensor 265 to determine the state of charge of the backup power source 252. The wireless communication controller 250 may include the state of charge of the backup power source 252 in the advertisement message to the external device 108. The user can then be alerted when the state of charge of the backup power source 252 is low.

In the illustrated embodiment, the backup power source 252 includes a coin cell battery 315 located on the PCB 305. The coin cell battery 315 is merely exemplary. In some embodiments, the backup power source 252 may be another type of battery cell, a capacitor, or another energy storage device. The coin cell battery 315 provides sufficient power to allow the wireless communication controller 250 to operate in the advertisement state and broadcast minimal identification information. In the illustrated embodiment, the coin cell battery 315 can run for several years by allowing the power tool 104 to only "broadcast" or "advertise" once every few seconds when operating the advertisement state.

In the illustrated embodiment, the coin cell battery 315 is a primary (i.e., non-rechargeable) backup battery. In other embodiments, the backup power source 252 includes a secondary (rechargeable) backup battery cell or a capacitor. In such embodiments, the battery pack 104*b* provides charging power to recharge the secondary backup battery cell or the capacitor. For example, the power input unit 224 may include charging circuitry to charge the backup power source 252. The rechargeable cell and capacitor may be sized to provide power for several days or weeks before needing to recharge.

The indicator light 320 of the wireless communication device 300 is configured to indicate the state of the wireless communication device 300. For example, the indicator light 320 may, in a first indication state, light in a first color (or blink in a first predetermined pattern) to indicate that the wireless communication device 300 is currently communicating with an external device 108. The indicator light 320 may, in a second indication state, light in a second color (or blink in a second predetermined pattern) to indicate that the power tool 104 is locked (e.g., the motor 214 is inoperable because a security feature has been enabled) as described in more detail below in FIG. 16. Finally, the indicator light 320 may also light to indicate a level of charge of the backup power source 252. In one example, the indicator light 320 may, in a third indication state, light in a third color (or blink in another predetermined pattern) when the state of charge of the backup power source 252 drops below a predetermined threshold. In some embodiments, the wireless communication controller 250 may control the indicator light 320 based on the signals received from the voltage sensor 265.

Figure 16:
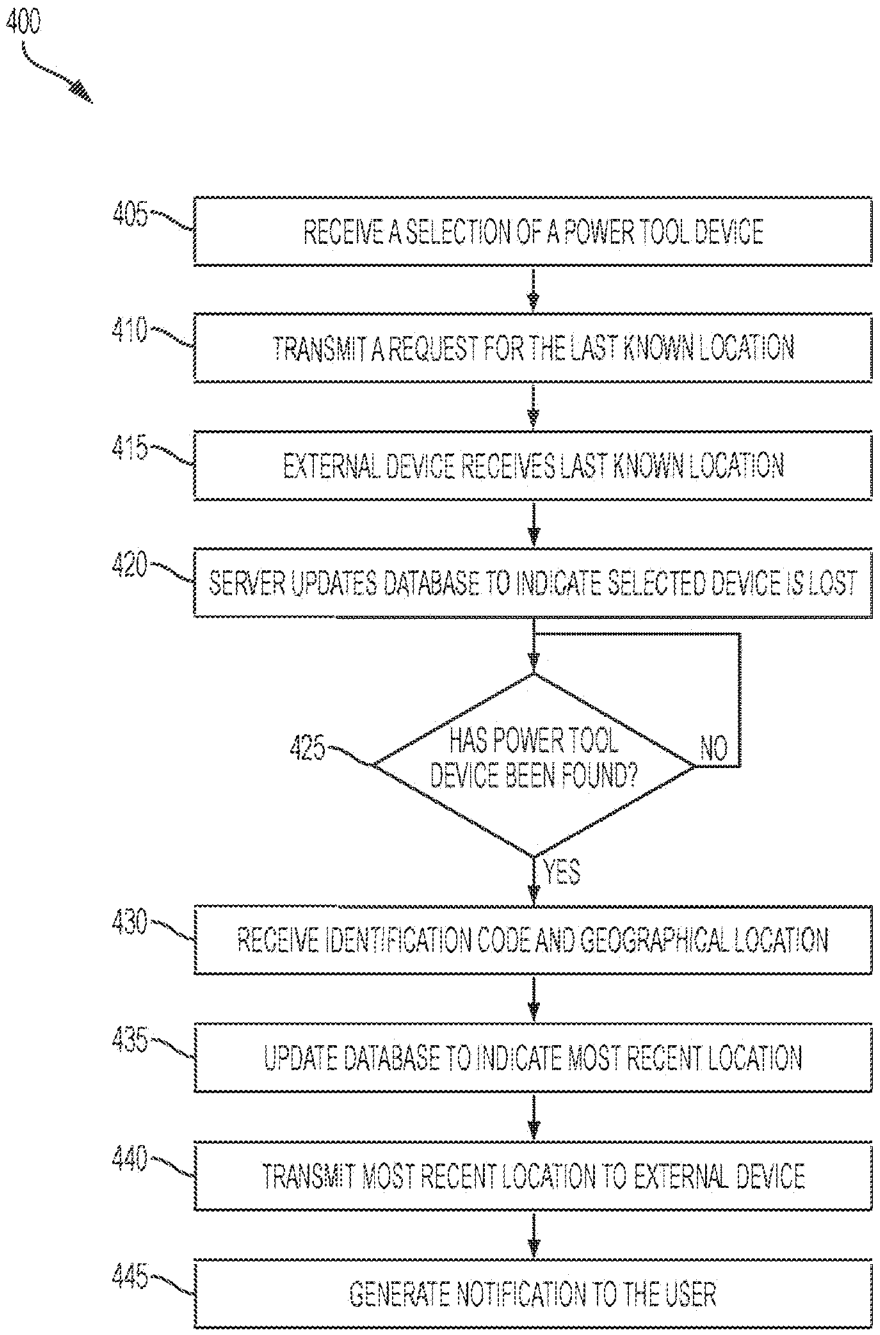
FIG. 16 is a flowchart illustrating a method of tracking power tool devices.

FIG. 16 is a flowchart illustrating a method 400 of tracking power tool devices based on the identification code emitted by the wireless communication controller 250. As shown in FIG. 16, the external device 108 receives a selection of a power tool device (e.g., the power tool 104) to be located (block 405). The external device 108 then transmits a request to the remote server 112 for the last known location of the selected power tool device (block 410). The external device 108 receives the last known location of the selected power tool device (block 415) and the server 112 updates the database to indicate that the selected power tool device is lost (block 420). The server 112 monitors the database and determines whether the selected power tool device has been found (block 425). For example, while the power tool 104 is lost, the wireless communication controller 250 continues to transmit the identification code periodically. When a second external device (or, in some cases, the same external device 108) receives the identification code from the wireless communication controller 250, the second external device transmits the identification code and geographical coordinates to the server 112. When the server 112 determines that the selected power tool device has been found, the server 112 receives the identification code and the geographical coordinates from the second external device that received the identification code from the wireless communication controller 250 (block 430), and updates the database to indicate the most recent location for the selected power tool device (block 435). The server 112 then transmits the most recent location of the selected power tool device to the external device 108 (block 440). The external device 108 may then generate a notification to the user that an updated location for the power tool device has been received (block 445).

Figure 17:
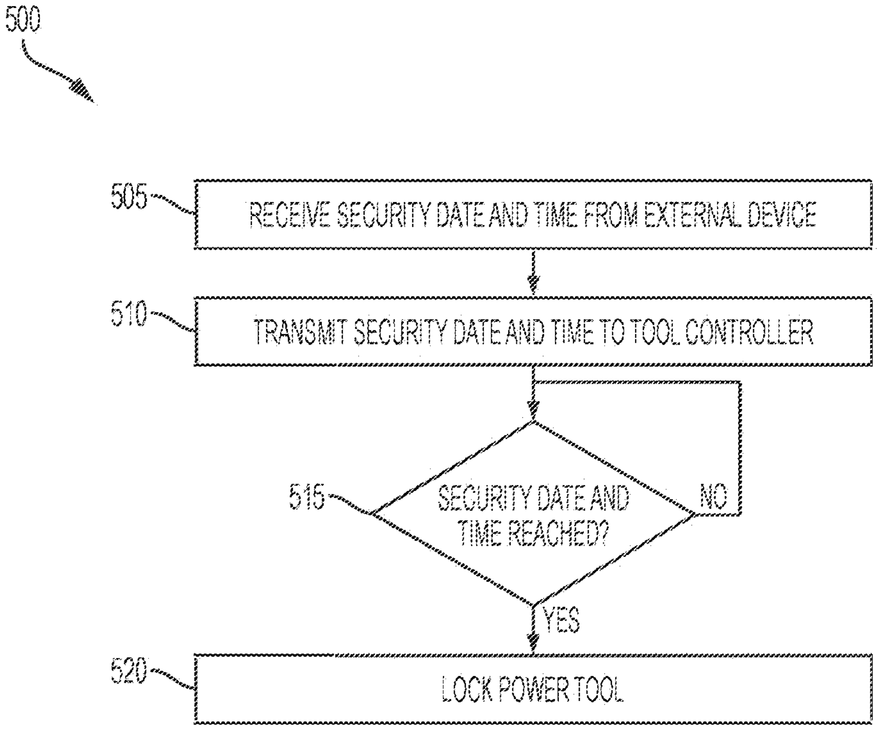
FIG. 17 is a flowchart illustrating a method of enabling a security feature on a power tool device.

The wireless communication controller 250 and the RTC 260 enable the power tool 104 to implement a lock-out feature. For example, FIG. 17 is a flowchart illustrating a method 500 of implementing a security feature on the power tool 104. As shown in FIG. 17, the wireless communication controller 250 receives a security date and time (or a timer amount) from the external device 108 (block 505). The external device 108 generates a graphical user interface that receives inputs from a user. The user, for example, selects the security date and time using the graphical user interface. The external device 108 then transmits the security date and time to the wireless communication controller 250. The wireless communication controller 250 then transmits the security date and time (or timer amount) to the controller 226 (block 510). The controller 226 monitors the time received from the RTC 260 and compares the current time from the RTC 260 to the user-specified lock-out time stored in the memory 232 or 256. In particular, the controller 226 determines whether the security date and time has been reached (block 515). In embodiments in which a timer amount is transmitted, the controller 226 determines whether the timer amount has elapsed. When the current time from the RTC 260 indicates that the security date and time has been reached (e.g., the time from the RTC exceeds the user-specified lock-out time), the controller 226 locks the power tool 104 (e.g., the power tool 104 is disabled such that driving the motor 214 is prevented) at block 420. The power tool 104, therefore, becomes inoperable. Since the RTC 260 keeps time independent of other components in the power tool 104 and independent of the operation of the power tool 104, the controller 226 can more accurately track when a specified time for a security feature is approaching regardless of whether the power tool 104 is connected to the battery pack 104*b*.

In other embodiments, the power tool 104 is locked or unlocked based on other security conditions different than a lock out time or timer amount. In such embodiments, the wireless communication controller 250 receives the security settings (e.g., whether the power tool 104 is locked or unlocked and the specific security parameters for when the power tool 104 is to change security states). The wireless communication controller 250 transmits the security parameters to the controller 226. The controller 226 may then monitor the security parameters and determine when the security parameters or security conditions are met. The controller 226 may then change the security state of the power tool 104 based on the security parameters (e.g., unlock the power tool 104 when a security condition is met).

Because the RTC 260 is able to maintain accurate time whether or not the battery pack 104*b* is attached to the power tool 104, the RTC 260 is configured to time-stamp (i.e., associate a specific time with) the operational data of the power tool 104. For example, the controller 226 can store the operational data when, for example, the power tool 104 is fastening a group of fasteners. The controller 226 then receives an indication of time (e.g., a GMT time) from the RTC 260 or from the processor 258 associated with the wireless communication controller 250. The controller 226 proceeds to store the operational data (e.g., the torque output by the power tool 104, the speed of the motor 214, the number of trigger pulls, etc.) with a time-stamp provided based on the received time from the RTC 260. The RTC 260 can continuously or periodically provide an indication of time to the controller 226. In other embodiments, the controller 226 requests a time signal from the processor 258 of the wireless communication controller 250 and waits for the time signal from the RTC 260.

When the wireless communication controller 250 operates in the connectable state, wireless communication between the power tool 104 and the external device 108 is enabled. In the connectable state, the wireless communication controller 250 obtains and exports tool operational data including tool usage data, maintenance data, mode information, drive device information, and the like from the power tool 104. The exported operational data is received by the external device 108 and can be used by tool users or owners to log operational data related to a particular power tool 104 or to specific job activities. The exported and logged operational data can indicate when work was accomplished and that work was accomplished to specification. The logged operational data can also provide a chronological record of work that was performed, track duration of tool usage, and the like. In the connectable state, the wireless communication controller 250 also imports (i.e., receives) configuration data from the external device 108 into the power tool 104 such as, for example, operation thresholds, maintenance thresholds, mode configurations, programming for the power tool 104, feature information, and the like. The configuration data is provided by the wireless communication controller 250 to the controller 226 over the data connection 262, and the processing unit 230 stores the configuration data in the memory 232. The processing unit 230 further accesses the configuration data stored in the memory 232 and controls driving of the motor 214 in accordance with the configuration data. For example, the processing unit 230 may drive the motor 214 at a particular speed or until a particular torque is reached (e.g., as detected by the sensors 218), where the particular speed or torque is provided as part of the configuration data.

Figure 18:
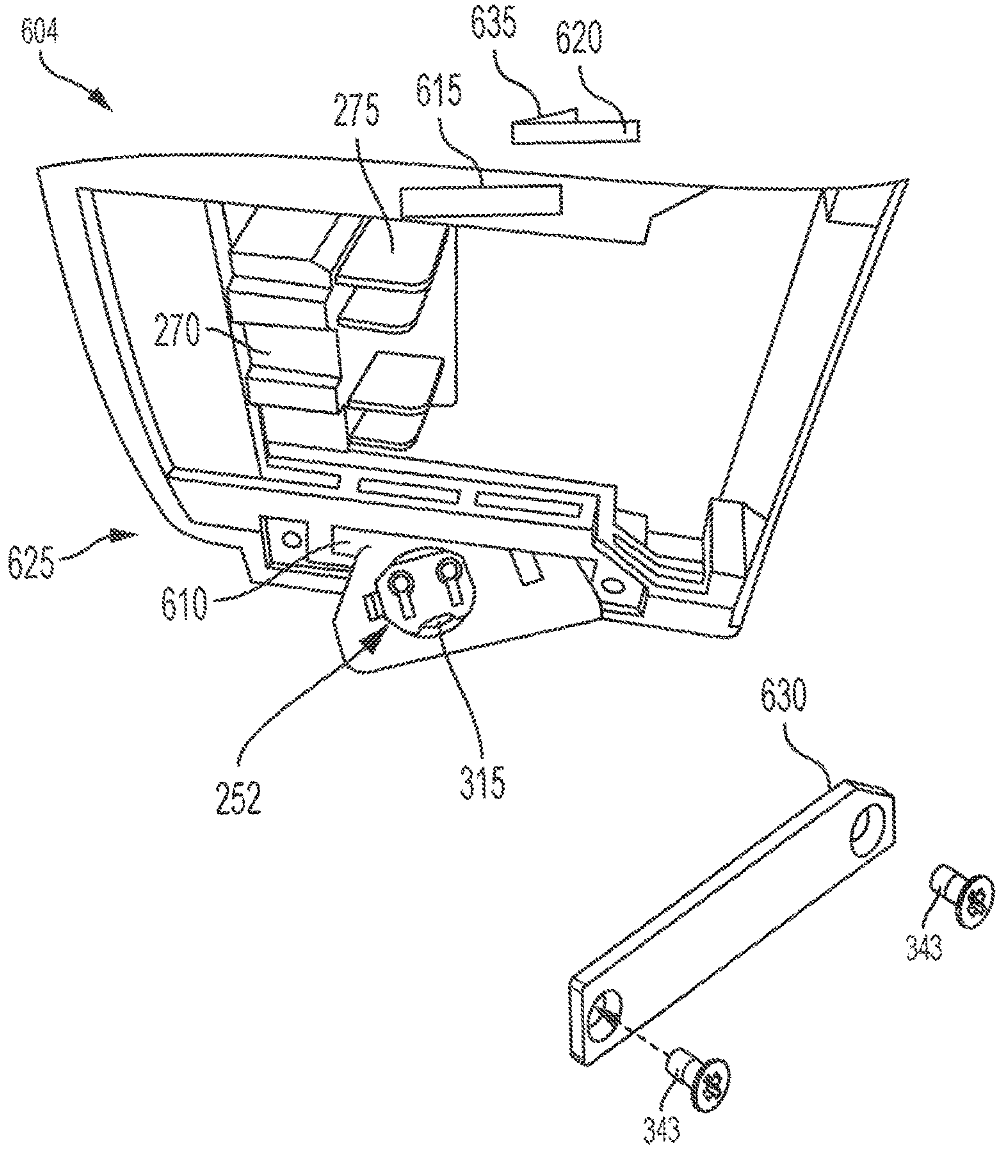
FIG. 18 illustrates a second embodiment of a power tool in which the power tool includes two compartments.

The wireless communication device 300 has been described as including both the wireless communication controller 250 and the backup power source 252. In some embodiments, however, the wireless communication controller 250 is separate from the backup power source 252. FIG. 18 illustrates another embodiment of the power tool 604 in which the backup power source 252 is not part of the wireless communication device 300. As shown in FIG. 18, the power tool 604 includes a first compartment 610 that receives the backup power source 252, and a second compartment 615 that receives a wireless communication device 620. The second compartment 615 may also be referred to as a second compartment 615. The wireless communication device 620 is similar to the wireless communication device 300 described above, except that it does not include the backup power source 252. In the illustrated embodiment, the power tool 604 includes the first compartment 610 and the second compartment 615 on opposite sides of the battery pack receiving portion 625. The first compartment 610 is positioned adjacent the connecting structure that receives the battery pack 104*b* and is a separate compartment of the tool housing. In particular, the first compartment 610 is positioned on a lateral side (e.g., side B or D) of the battery pack receiving portion 625. In the illustrated embodiment, the backup power source 252 is secured in place by a removable plastic cover 630. The removable plastic cover 630 is similar to the removable plastic cover 342 described above, but it also serves to secure the backup power source 252 after the backup power source 252 has been inserted.

On the other hand, the second compartment 615 is similar to the compartment 277 described above. As shown in FIG. 18, the wireless communication device 620 includes a mating tooth 635 to engage a lock of the second compartment 615 that is similar to the lock 279 of the compartment 277 described above. Separating the backup power source 252 from the wireless communication device 620 allows removal and replacement of the backup power source 252 when the state of charge is depleted, while at the same time maintaining the compartment 615 for the wireless communication device 620. Similar to the embodiment described above with respect to FIG. 12, the wireless communication device 620 may include an exposed side such that the indicator light 320 is visible to the user.

Figure 19:
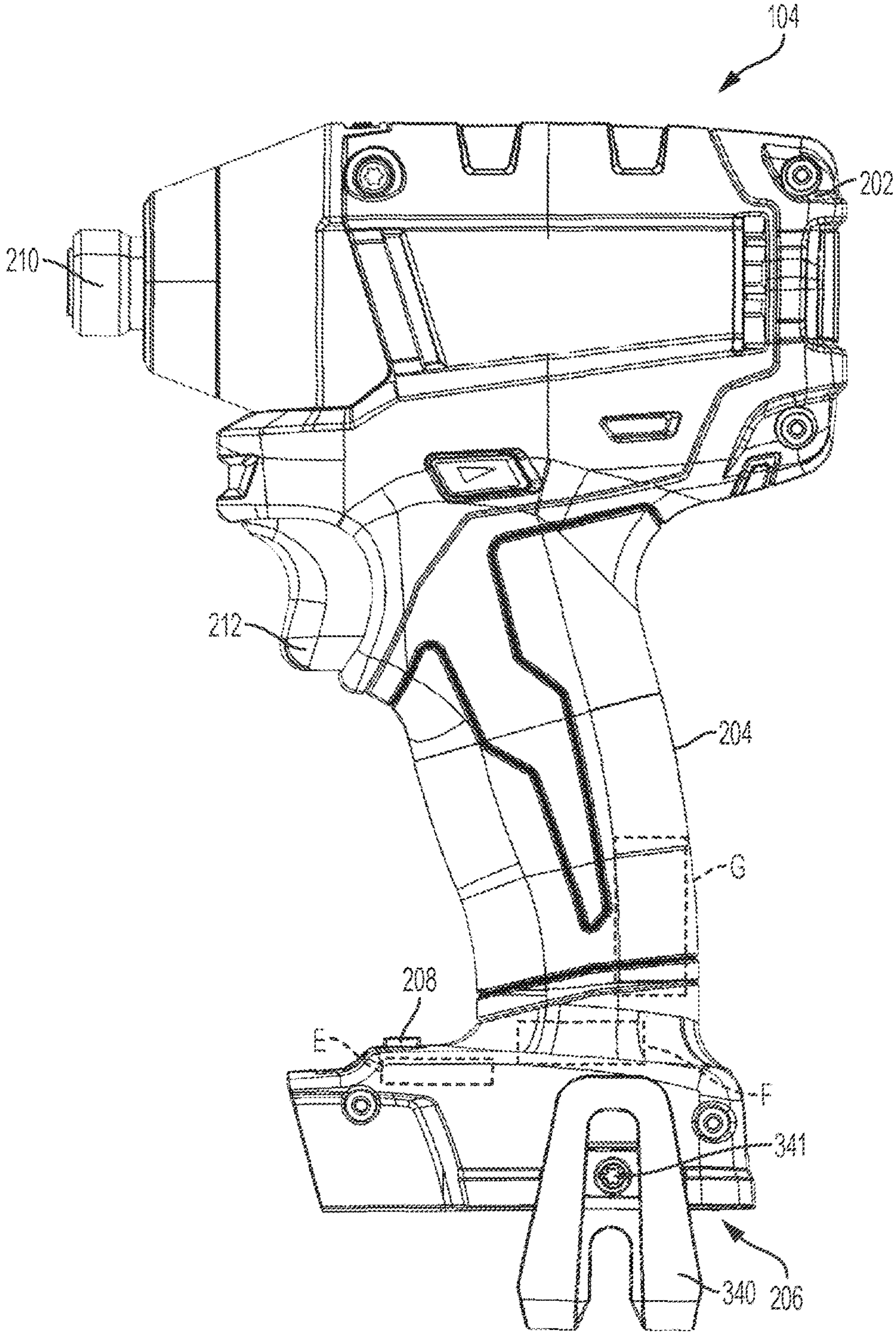
FIG. 19 illustrates a schematic diagram of alternative locations for a backup power source and the wireless communication device.

While in the illustrated embodiment, the first compartment 610 and the second compartment 615 are both positioned in a battery pack receiving portion 625 of the power tool 600, in other embodiments, one or both of the first compartment 610 and the second compartment 615 may be located elsewhere on the power tool 600. For example, FIG. 19 schematically illustrates various other positions E, F, G for each of the first compartment 610, the second compartment 615, or the compartment 277 of FIG. 12. For example, position E shows one of the compartments 277, 610, 615 being positioned below the selection switch 208 at the foot of the power tool 104, 600. Position F shows one of the compartments 277, 610, 615 being positioned near a location where the handle 204 and the foot of the power tool 104, 600 meet. Position G shows one of the compartments 277, 610, 615 being positioned in a bottom portion of the housing of the handle 204. Accordingly, various combinations are possible for the placement of the first compartment 610 and the second compartment 615. The operation of the power tool 600 is otherwise similar to the operation of the power tool 104 described above. In particular, the flowcharts shown in FIGS. 16 and 17 also apply to power tool 600.

Figure 20A:
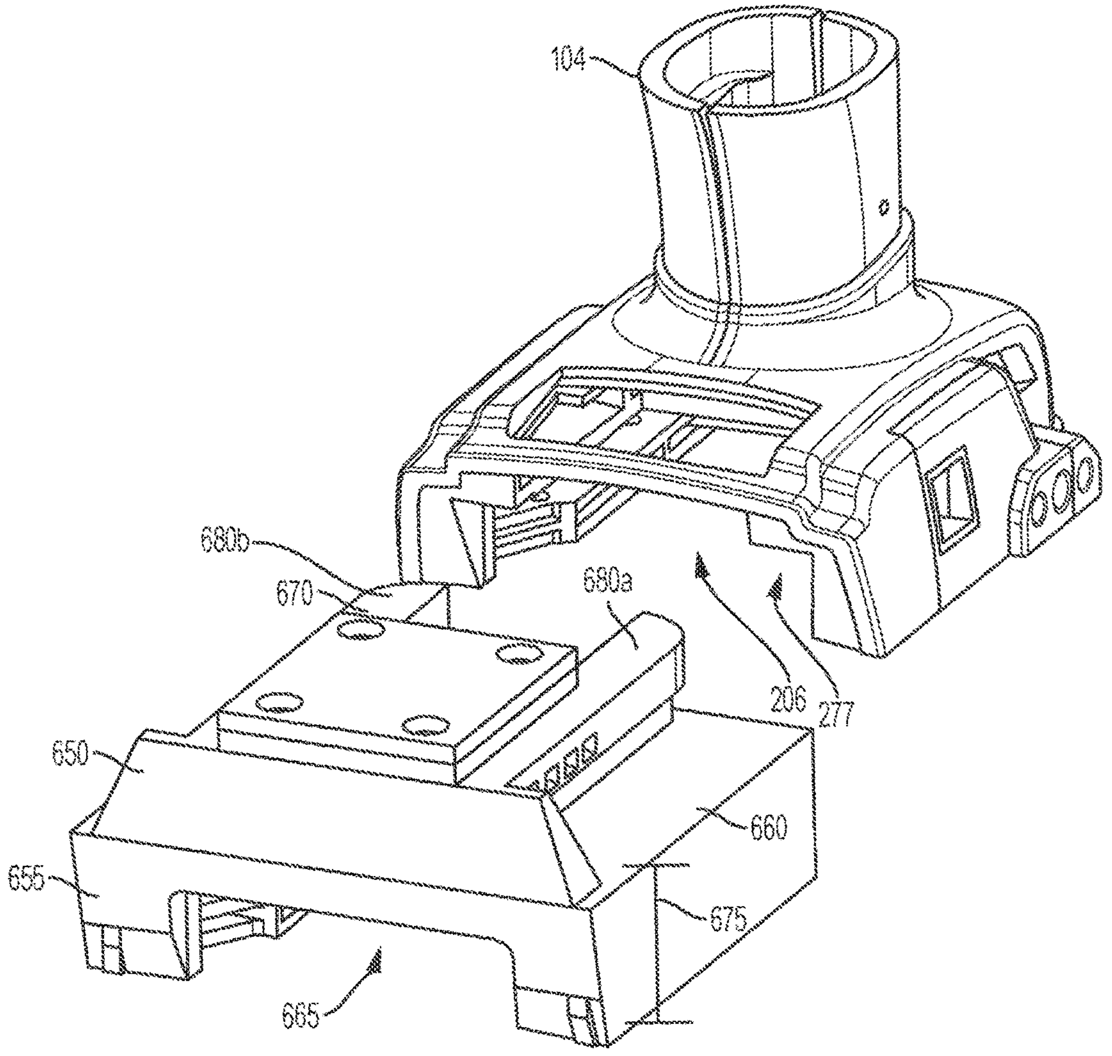
FIGS. 20A-B illustrate a fourth embodiment of the compartment and a secondary device.
Figure 20B:
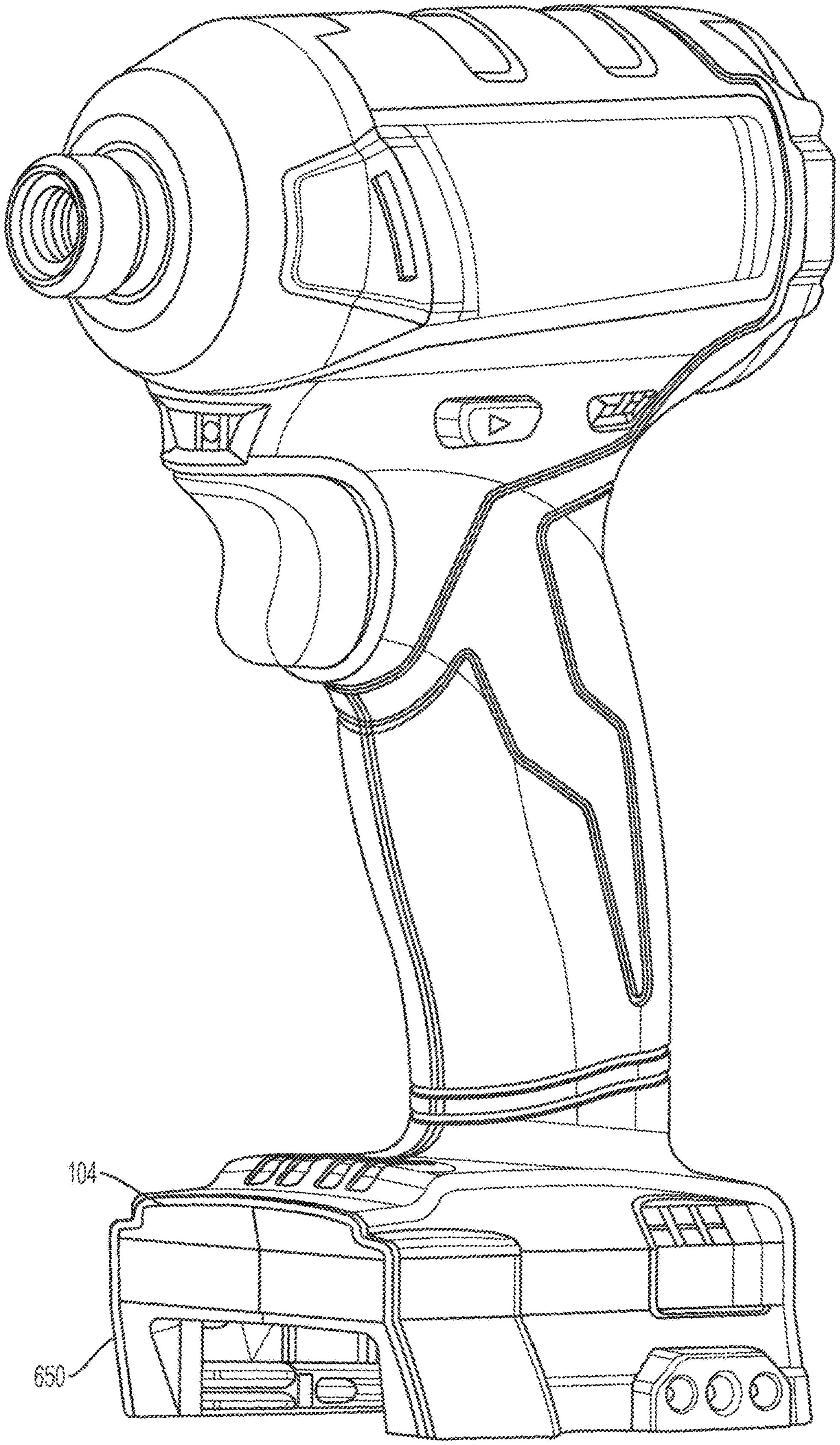

FIGS. 20A-B illustrates a fourth embodiment of the compartment 277. As shown in FIG. 20, the compartment 277 is included in the battery receiving portion 206 of the power tool 104. As described above, the compartment 277 is configured to receive a secondary device 650 such as, for example, the wireless communication device 300, the back-up power source 252, a different device, or a combination thereof. As shown in FIG. 20, the secondary device 650 includes a housing 655. The housing 655 includes a top portion 660 and a lower portion 665. The top portion 660 includes a mating structure 670 that is compatible with the battery receiving portion 206 of the power tool 104. In other words, the mating structure 670 imitates a mating structure of a battery pack (e.g., the battery pack 104*b*) configured to attach to the battery receiving portion 206 to power the power tool 104. The lower portion 665 replicates the mating structure of the battery receiving portion 206 of the power tool 104 such that the lower portion 665 can receive a battery pack (e.g., the battery pack 104*b*) for powering the power tool 104.

Because the top portion 660 of the housing 655 replicates the mating structure of a battery pack and the lower portion 665 of the housing 655 replicates the mating structure of the battery receiving portion 206, the secondary device 650 is interchangeable with a battery pack that is compatible with the power tool 104. In other words, the battery pack may be coupled to the power tool 104, via the secondary device 650, when the secondary device 650 is coupled to the power tool 104 and may be coupled directed to the power tool 104 when the secondary device 650 is decoupled from the power tool 104.

FIG. 20B illustrates the secondary device 650 coupled to the power tool 104. As shown in FIGS. 20A-B, the housing 655 has a height 675 that allows the lower portion 665 to replicate the mating structure and dimensions of the battery receiving portion 206. The height of the power tool 104 increases by the height 675 of the secondary device 650 when the secondary device 650 is coupled to the power tool 104. The footprint of the power tool 104, however remains the same size even when the secondary device 650 is coupled to the power tool 104. The footprint of the power tool 104 provides sufficient support when resting on a support surface (e.g., a table or floor) to inhibit the power tool 104 from tipping over even when the secondary device 650 is coupled to the power tool 104.

In some embodiments, the battery receiving portion 206 of the power tool 104 incorporates the increase of height of the secondary device 650. That is, in some embodiments, the battery receiving portion 206 increases in size to accommodate both the secondary device 650 and the battery pack. For example, in some embodiments, FIG. 20B illustrates the power tool 104 without the secondary device 650. In such embodiments, the secondary device may have a width that is smaller than the width of the foot of the power tool 104 and fits within the battery receiving portion 206. In such embodiments, when the secondary device 650 is coupled to the power tool 104, but the battery pack is not coupled to the power tool 104, the power tool 104 is supported only by the perimeter of the battery receiving portion 206, and a space is created between a support surface (e.g., a table or floor) and the secondary device 650. When both the battery pack and the secondary device 650 are coupled to the power tool 104, the base of the batter pack supports the power tool 104.

In the illustrated embodiment, the power tool 104 receives a slide-on style battery pack including guides rails that secure the battery pack to the power tool 104. Accordingly, the top portion 660 also includes two guide rails 680*a*, 680*b* to mate with the corresponding structure in the battery receiving portion 206. The secondary device 650 also includes pass-through connections (not shown) that allow the battery terminals to be accessible through the lower portion 665. For example, the pass-through connections may include a set of terminal ports on the top portion 660 of the secondary device 650 and a set of terminal connections on the lower portion 665 of the secondary device 650. The terminal ports receive the battery terminals on the battery receiving portion 206 of the power tool 104, while the set of terminal connections are received by an attached battery pack. Similar to the compartment 277 described above, the secondary device 650 includes an irreversible locking mechanism. That is, once the secondary device 650 is coupled to the power tool 104 and the locking mechanism is engaged, the secondary device 650 becomes permanently attached to the power tool 104. As discussed above with respect to FIG. 18, in some embodiments, the power tool 104 includes more than one compartment. The power tool 104 shown in FIG. 20 may include an additional compartment (e.g., similar in construction to other compartments described herein) to receive a different secondary device.

Figure 21A:
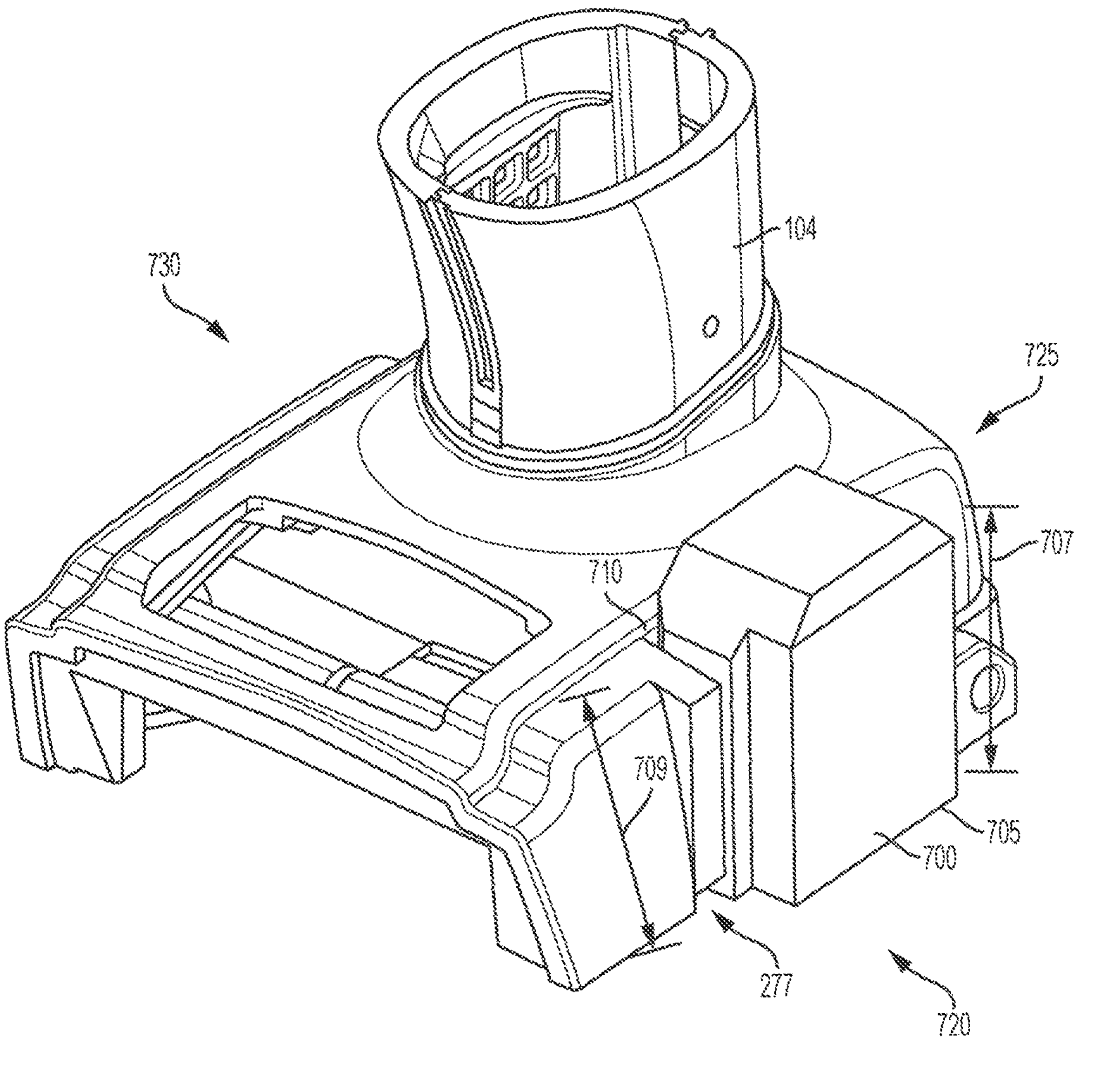
FIGS. 21A-D illustrate a fifth embodiment of the compartment and a secondary device.

FIGS. 21A-D illustrates a fifth embodiment of the compartment 277. As shown in FIG. 21A, the compartment 277 is external to the body of the power tool 104 (i.e., located on an external surface of the housing of the power tool 104) and engages with a secondary device 700. The secondary device 700 includes a housing 705 forming an engagement structure 710. In the illustrated embodiment, the secondary device 700 has a generally rectangular shape. A height 707 of the secondary device 700 approximates a height 709 of the battery receiving portion 206 of the power tool 104. The rectangular shape may provide some simplicity and durability to the secondary device 700.

Figure 21D:
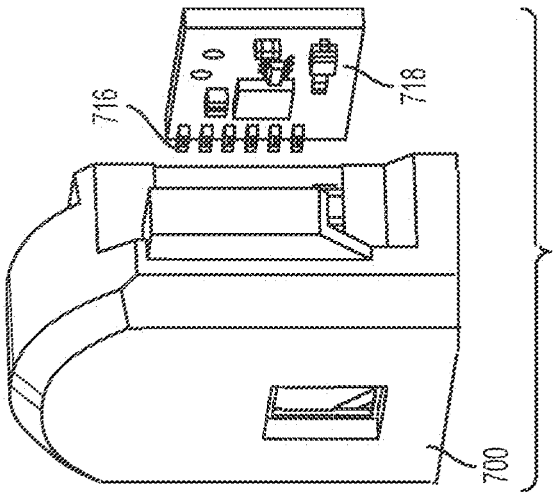
Figure 21C:
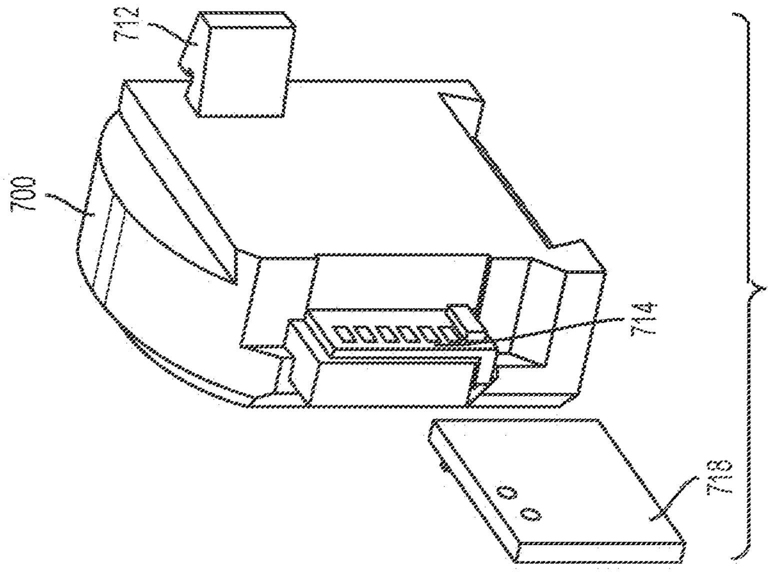
Figure 21B:
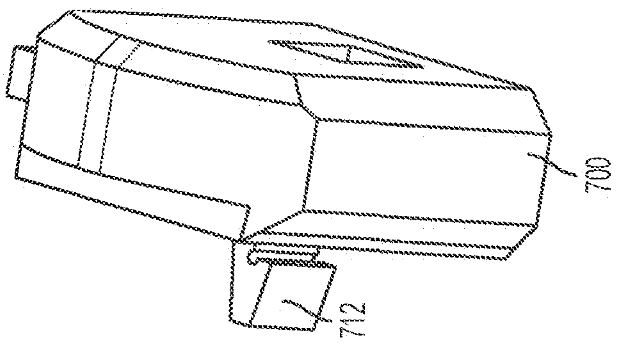

As shown in FIG. 21B-C, the engagement structure 710 include a hook 712, also referred to as a lock mating tooth, that is inserted into a shaft to engage with a mating tab on the power tool housing (see, e.g., the lock mating tooth 325 engaging the mating tab 330 in FIG. 6). Similar to the design described with respect to FIG. 6, the hook 712 engages with the mating tab of the power tool to provide an irreversible locking mechanism. In the illustrated embodiment, the secondary device 700 is brought into contact with the power tool 104 in a horizontal direction (e.g., in the direction of arrow 720 and perpendicular to the handle of the power tool 104). The secondary device 700 is then rotated toward the power tool 104 to engage the locking mechanism. In the illustrated embodiment, the secondary device 700 is positioned on one side of the foot of the power tool 104, does not extend below the foot of the power tool, and extends in a generally vertical manner (e.g., parallel to the handle of the power tool 104).

The secondary device 700 further includes conductive data and power terminals 714 (FIG. 21C) that engage conductive data and power terminals 716 of an interface printed circuit board 718 of the power tool 104 (FIG. 21D). The interface printed circuit board 718 is fixed in the housing with the conductive data and power terminals 716 exposed to the compartment 277. When the secondary device 700 is secured to the power tool 104, the conductive data and power terminals 714 engage the conductive data and power terminals 716. The engaged terminals enable data communication between the wireless communication device 300 of the secondary devices 700 and the power tool 104 and to enable the wireless communication device 300 of the secondary device 700 to receive power from a battery pack coupled to the power tool 104. In some embodiments, the wireless communication device 300 of the secondary device 700 receives power from a battery pack coupled to the lower portion 665. The secondary device 700 may receive power from a battery pack when it is coupled to the power tool 104, and may use power from the backup battery source 252 when a battery pack is not coupled to the power tool 104.

Because the secondary device 700 is coupled to the exterior of the housing of the power tool 104, the size and specific design of the secondary device 700 may not be as restricted as compared to when, for example, the secondary device 700 fits inside the housing of the power tool 104. Accordingly, the secondary device 700 may include additional features than those described with respect to the wireless communication device 300 and the back-up power source 252. When the secondary device 700 includes the wireless communication device 300, the external position of the secondary device 700 may increase the power and range of the wireless communication device 300 as compared to when the secondary device is enclosed within the housing of the power tool 104. For example, the secondary device 700 may include a larger back-up power source 252 and be less susceptible to electromagnetic interface from the power tool 104 with the additional spacing provided from battery terminals and electronics of the tool. Additionally, with an external mounting, the secondary device 700 may serve as a theft deterrent due to its visibility on the power tool 104. While the secondary device 700 is illustrated in FIG. 21A as being coupled to a first side 725 of the power tool 104, in some embodiments, the secondary device 700 may be coupled to a second side 730 of the power tool 104. In yet other embodiments, the power tool 104 may be coupled to more than one secondary device 700. Each secondary device 700 may include, for example, the wireless communication device 300, the back-up power source 252, a different device, or a combination thereof. The compartment receiving each secondary device may have a similar or different structure than that described for coupling with the secondary device 700.

Figure 32B:
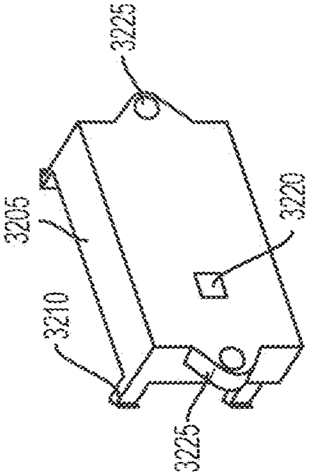
FIGS. 32A-C illustrate an alternative version of the compartment and a secondary device of the fifth embodiment of FIGS. 21A-D.
Figure 32C:
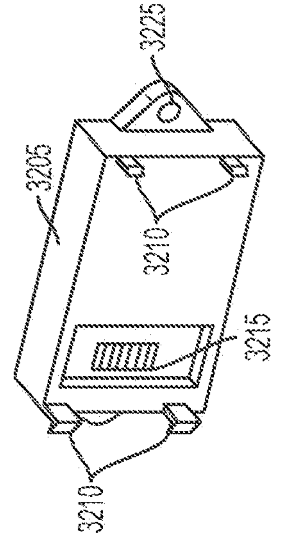
Figure 32A:
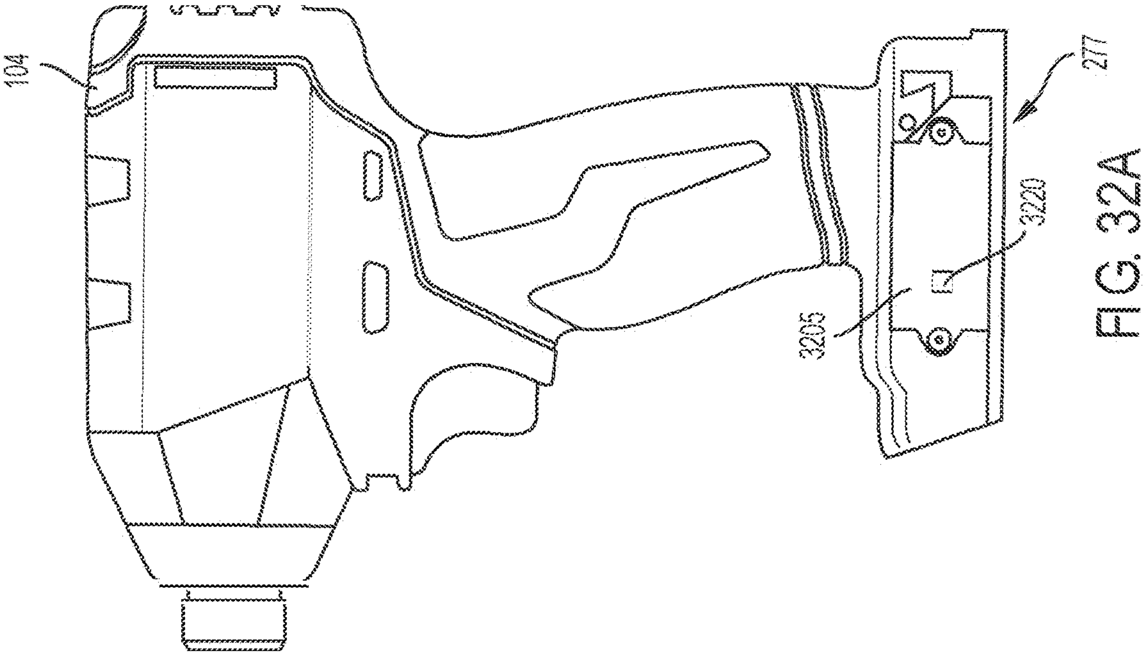

FIGS. 32A-C illustrate an alternative version of the fifth embodiment explained above and shown in FIGS. 21A-D. As shown in FIG. 32A, the compartment 277 is external to the body of the power tool 104 (i.e., located on an external surface of the housing of the power tool 104) and engages with a secondary device 3205. The secondary device 3205 includes similar components with similar functionality as described above with respect to the secondary device 700 of FIGS. 21A-D. For example, the engagement structure of the secondary device 3205 includes four hooks 3210, also referred to as lock mating teeth, that are inserted into a shaft to engage with a mating tab on the power tool housing (sec, e.g., the lock mating tooth 325 engaging the mating tab 330 in FIG. 6). Similar to the design described with respect to FIG. 6, the hooks 3210 engage with respective mating tabs of the power tool 104 to provide an irreversible locking mechanism. The secondary device 3205 further includes conductive data and power terminals 3215 (FIG. 32C) that engage the conductive data and power terminals 716 of the interface printed circuit board 718 of the power tool 104 (see FIG. 21D). The secondary device 3205 also includes an LED display window 3220 that may be similar to the lens 350 or 360 described above (e.g., to display an indicator light of the secondary device 3205). In some embodiments, the secondary device 3205 also includes one or more fastener attachments 3225 that receive fasteners (e.g., screws) to further secure the secondary device 3205 in the compartment 277.

Figure 22A:
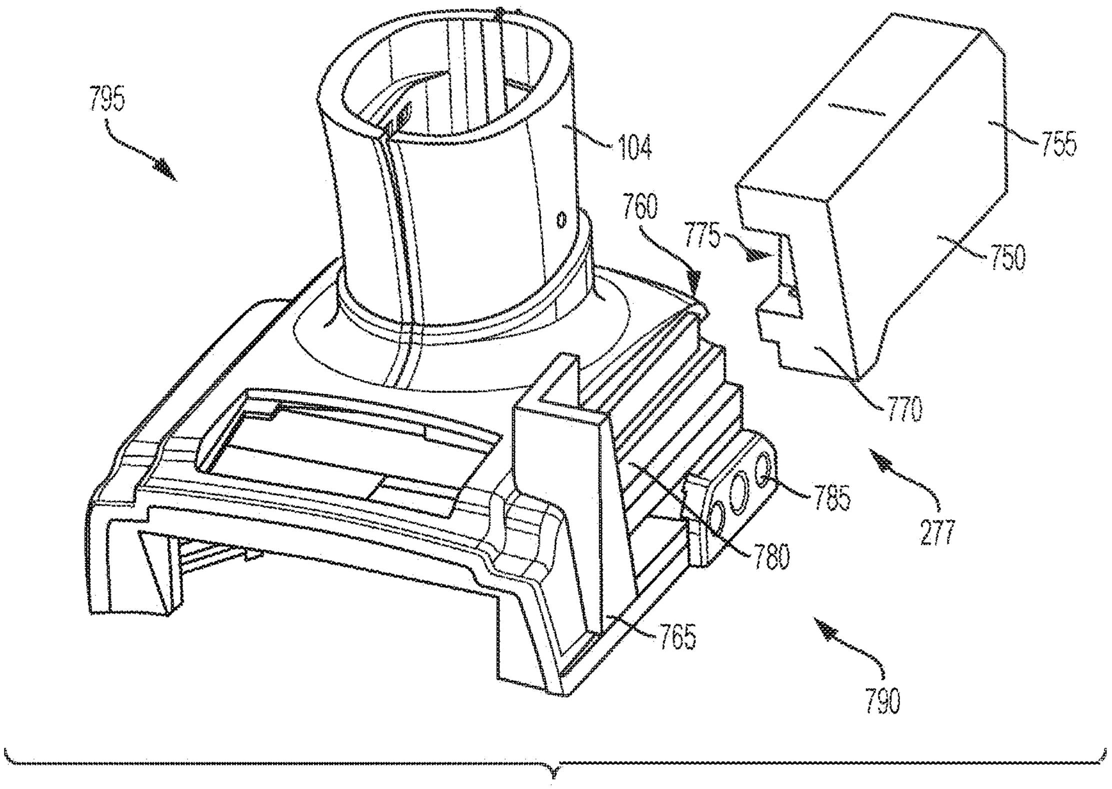
FIGS. 22A-B illustrate a sixth embodiment of the compartment and a secondary device.
Figure 22B:
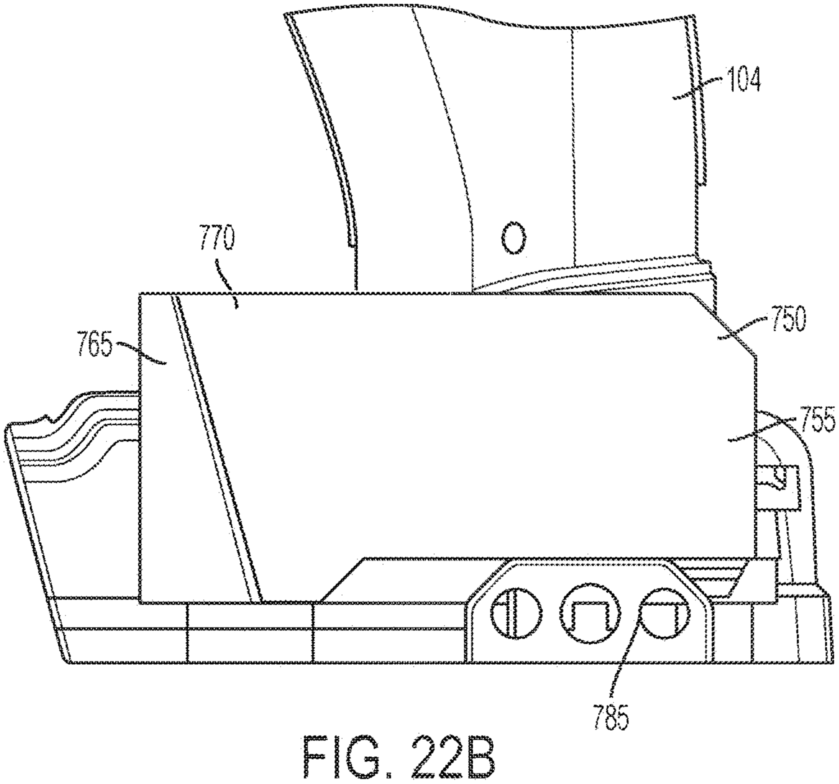

FIGS. 22A-B illustrate a sixth embodiment of the compartment 277. Similar to the compartment shown in FIG. 21, the compartment 277 shown in FIGS. 22A-B is external to the body of the power tool 104 and engages a secondary device 750. The secondary device 750 includes a housing 755 forming an engagement structure 760. In the illustrated embodiment, the secondary device 750 has a generally rectangular shape and is aligned horizontally with respect to the power tool 104. As shown in FIG. 22A, the foot of the power tool 104 includes a stopping member 765 to receive an end 770 of the secondary device 750. Similar to the secondary device 700 of FIG. 21, the rectangular shape of the secondary device 750 may provide more simplicity and durability to the secondary device 750. However, in some embodiments, one or both of the secondary devices 700 and 750 have different shapes than those illustrated.

In the illustrated embodiment, the engagement structure 760 includes a set of horizontal (e.g., perpendicular to the handle of the power tool 140) guide rails 775 and an irreversible locking mechanism (not shown). The set of horizontal guide rails 775 engage with a compatible structure 780 on the exterior of the power tool 104. Because the guide rails 775 extend for approximately the length of the secondary device 750, the engagement structure 760 of the secondary device 750 of FIGS. 22A-B may be more secure and permanent than, for example, the engagement structure of the secondary device 700 of FIGS. 21A-B. In the illustrated embodiment, the secondary device 750 is positioned on one side of the foot of the power tool 104, and extends in a generally horizontal manner (e.g., perpendicular to the handle of the power tool 104). As shown in FIG. 22B, the perimeter of the secondary device 750 accommodates coupling mechanisms (e.g., coupling mechanism 785) already positioned on the power tool 104 to attach accessories to the power tool 104.

Because the secondary device 750 is coupled to the exterior of the housing of the power tool 104, the size and specific design of the secondary device 750 may be less restricted and may allow for other features or devices to be incorporated into the secondary device 750. When the secondary device 750 includes the wireless communication device 300, the external position of the secondary device 750 may increase the power and range of the wireless communication device 300 as compared to when the secondary device is enclosed within the housing of the power tool 104. For example, the secondary device 700 may include a larger back-up power source 252 and be less susceptible to electromagnetic interface from the power tool 104 with the additional spacing provided from battery terminals and electronics of the tool. Additionally, the secondary device 750 may serve as a theft deterrent due to its visibility on the power tool 104. While the secondary device 750 is illustrated in FIGS. 22A-B as being coupled to a first side 790 of the power tool 104, in some embodiments, the secondary device 750 may be coupled to a second side 795 of the power tool 104. In yet other embodiments, the power tool 104 may be coupled to more than one secondary device 750. Each secondary device 750 may include, for example, the wireless communication device 300, the back-up power source 252, a different device, or a combination thereof. The compartment receiving each secondary device may have a similar or different structure than that described for coupling with the secondary device 750. As discussed above with respect to the secondary device 650, 700, 750 including the wireless communication controller 250, the secondary device 650, 700, 750 may also include indicators on an exposed side of the secondary device 650, 700, 750 to communicate, for example, an operational status of the secondary device to the user.

Figure 23A:
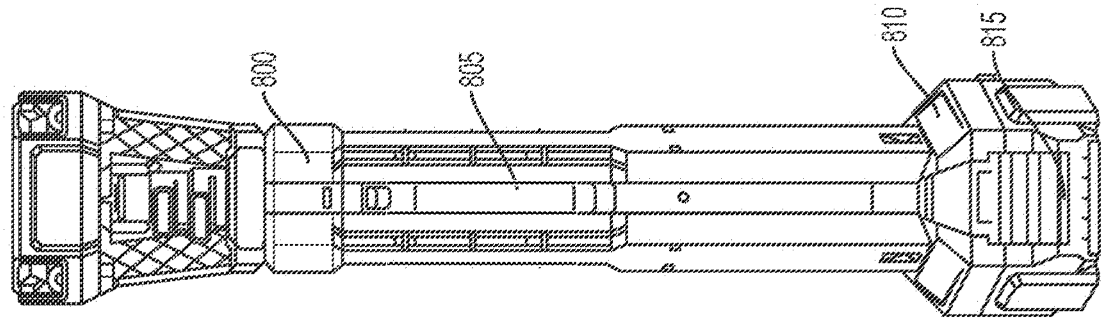
FIG. 23A illustrates a portable light.
Figure 23B:
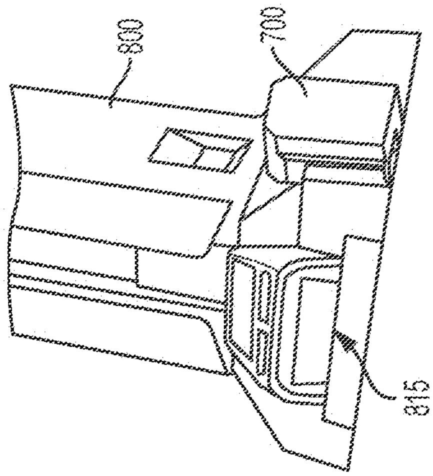
FIG. 23B illustrates the portable light of FIG. 23A including the fifth embodiment of the compartment and a secondary device.

Although the power tool 104 has been illustrated and described as an impact wrench, the compartments 277 and secondary devices 650, 700, 750 may be included in other power tools or power tool devices. FIGS. 23A-27B illustrate a variety of different power tools and power tool devices incorporating various embodiments of the compartment 277 and the secondary devices 650, 700, 750 described above. FIG. 23A illustrates a portable light 800. As illustrated, the portable light 800 includes a lighting element 805 to provide light to the surrounding area. The portable light 800 also includes a base 810 for supporting the portable light 800 in an upright manner. The base 810 includes a battery receiving portion 815. FIG. 23B illustrates the portable light 800 including the secondary device 700 as described above with respect to FIGS. 21A-B. As shown in FIG. 23B, the secondary device 700 is positioned on the base 810 of the portable light 800 adjacent the battery receiving portion 815, and is oriented in a generally vertical position (e.g., parallel to the lighting device 805 of the portable light 800).

Figure 23C:
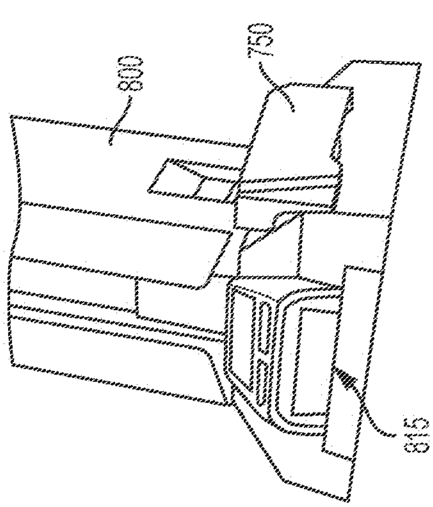
FIG. 23C illustrates the portable light of FIG. 23A including the sixth embodiment of the compartment.
Figure 23D:
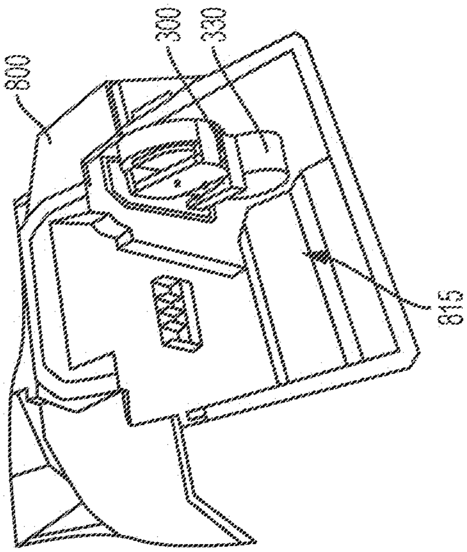
FIG. 23D illustrates a portable light including the first embodiment of the compartment and a secondary device.

On the other hand, FIG. 23C illustrates the portable light 800 including the secondary device 750 described above with respect to FIGS. 22A-B. As shown in FIG. 23C, the secondary device 750 is positioned on the base 810 of the portable light 800 and is oriented generally horizontally (e.g., perpendicular to the lighting element 805 of the portable light). As discussed above with respect to FIGS. 21-22C, when the secondary device 700, 750 is external to the portable light 800 (or another power tool device), the specific dimensions and constructions of the secondary device 700, 750 are more flexible (e.g., than attempting to fit the secondary device 700, 750 within the housing of the portable light 800), which may allow further features or devices to be incorporated into the secondary device 700, 750. FIG. 23D illustrates the portable light 800 including the compartment 277 and the secondary device as described above with respect to FIGS. 5-8. As described above, the compartment 277 is configured to receive and enclose the PCB 300 of the secondary device. As shown in FIG. 23D, the compartment 277 is positioned in the battery receiving portion 815 of the base 810.

Figure 23E:
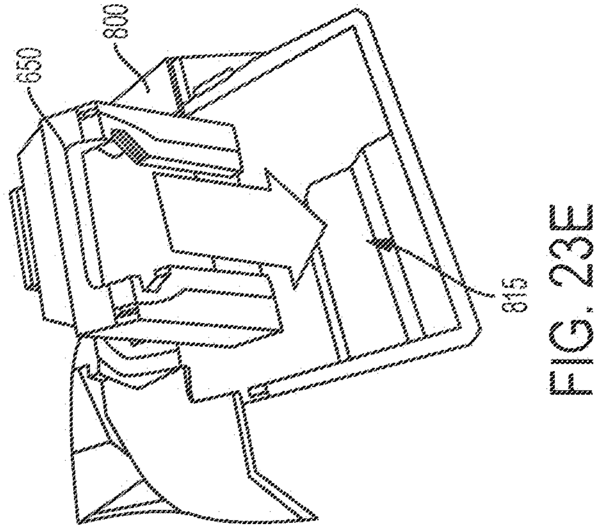
FIG. 23E illustrates the portable light of FIG. 23 including the fourth embodiment of the compartment and a secondary device.

Finally, FIG. 23E illustrates the portable light 800 including the secondary device 650 as described above with respect to FIG. 20. Due to the additional height of the secondary device 650, in some embodiments, a specialized battery pack with a shorter height than a typical battery pack is used when the secondary device 650 is coupled to the battery receiving portion 815. In some embodiments, the battery receiving portion 815 is sized such that it can accommodate both the secondary device and a typical battery pack. For example, the battery receiving portion 815 may be sized such that when only the battery pack is coupled to the portable light 800, some vertical space remains available in the battery receiving portion 815.

Figure 24A:
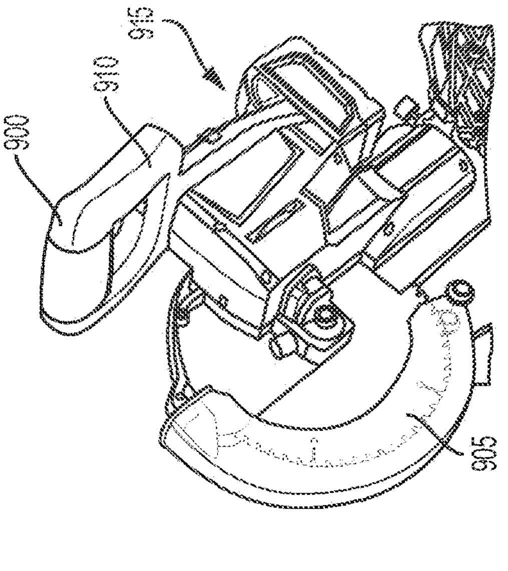
FIG. 24A illustrates a miter saw.
Figure 24B:
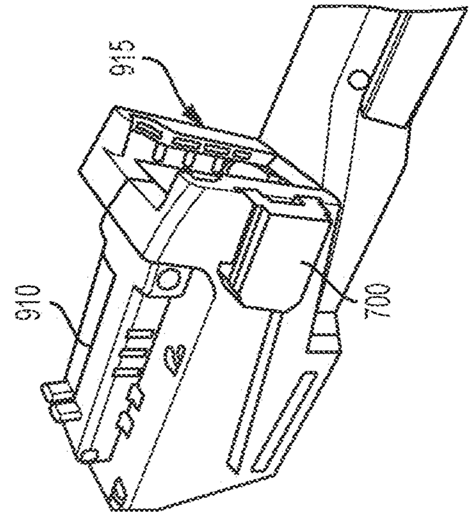
FIG. 24B illustrates the miter saw of FIG. 24 including the fifth embodiment of the compartment and a secondary device.
Figure 24C:
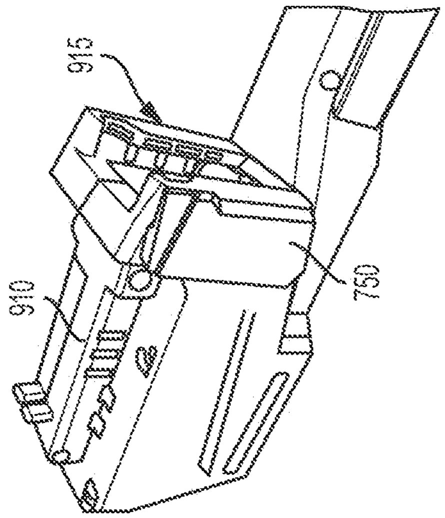
FIG. 24C illustrates the miter saw of FIG. 24A including the sixth embodiment of the compartment and a secondary device.

FIG. 24A illustrates a miter saw 900. The miter saw 900 includes a saw 905, a handle portion 910, and a battery pack receiving portion 915 positioned on a first end of the handle portion 910. FIG. 24B illustrates the miter saw 900 including the secondary device 700 as described above with respect to FIG. 21A-B. The secondary device 700 is positioned adjacent the battery receiving portion 815 on an exterior of the handle portion 910, and is oriented generally vertically (e.g., parallel to a length of the handle portion 910). FIG. 24C illustrates the miter saw 900 including the secondary device 750 as described above with respect to FIGS. 22A-B. As shown in FIG. 24C, the secondary device 750 is positioned on an exterior of the handle portion 910 and is oriented generally horizontally (e.g., perpendicular to length of the handle portion 910). The external secondary devices 700, 750 coupled to the miter saw 900 may serve as theft deterrent due to their visibility. Additionally, as discussed above, because the secondary devices 700, 750 are external, the constructions of the devices may be more flexible and may allow for more features or devices to be incorporated into the secondary devices 700, 750.

Figure 24D:
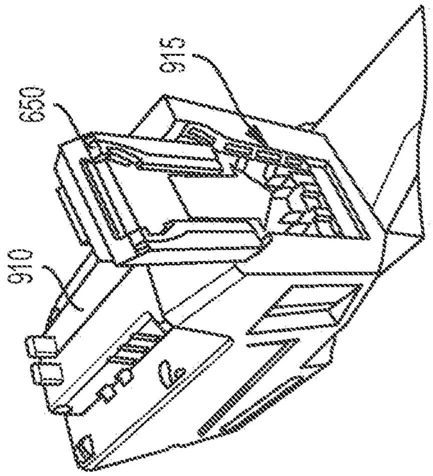
FIG. 24D illustrates the miter saw of FIG. 24A including the fourth embodiment of the compartment and a secondary device.
Figure 24E:
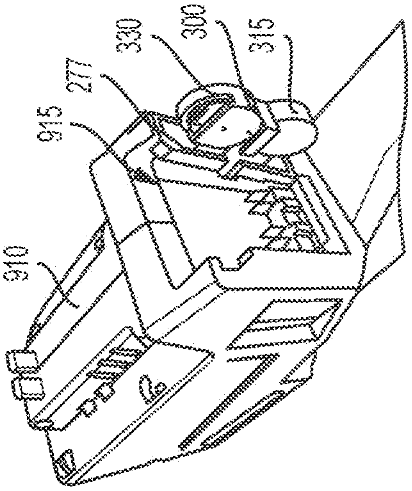
FIG. 24E illustrates the miter saw of FIG. 24A including the first embodiment of the compartment and a secondary device.

FIG. 24D illustrates the miter saw 900 including the secondary device 650 as described above with respect to FIG. 20. As shown in FIG. 24D, the secondary device 650 attaches directly to the battery receiving portion 915 of the miter saw 900. Finally, FIG. 24E illustrates the miter saw 900 including the compartment 277 and the secondary device as described above with respect to FIGS. 5-8. As described above, the compartment 277 is configured to receive and enclose the PCB 300 of the secondary device. As shown in FIG. 24E, the compartment 277 is positioned in the battery receiving portion 915 of the miter saw 900.

Figure 25A:
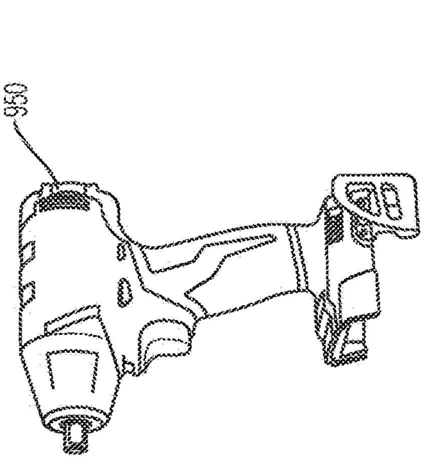
FIGS. 25A-B illustrate an impact driver including the fourth embodiment of the compartment and a secondary device.
Figure 25B:
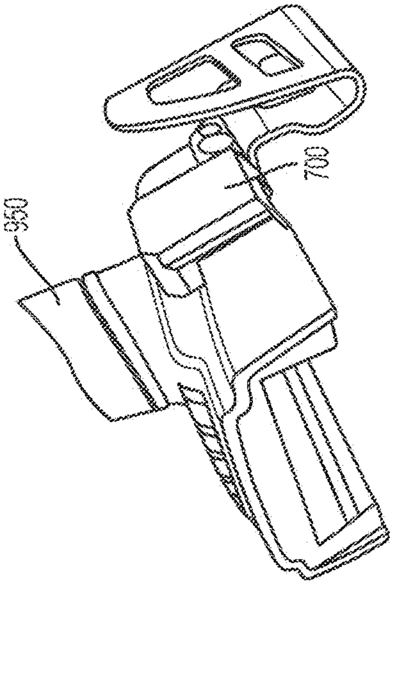
Figure 26A:
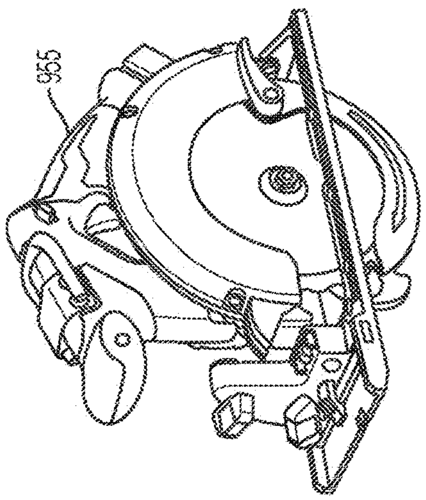
FIGS. 26A-B illustrate a circular saw including the first embodiment of the compartment and a secondary device.
Figure 26B:
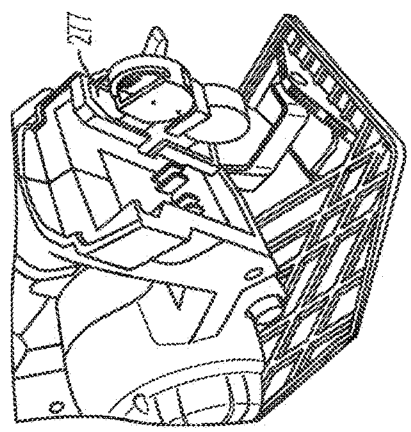
Figure 27A:
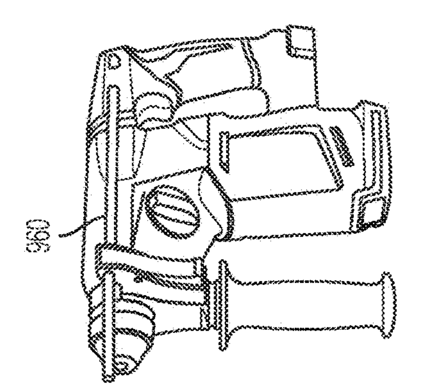
FIGS. 27A-B illustrate a rotary hammer including the sixth embodiment of the compartment and a secondary device.
Figure 27B:
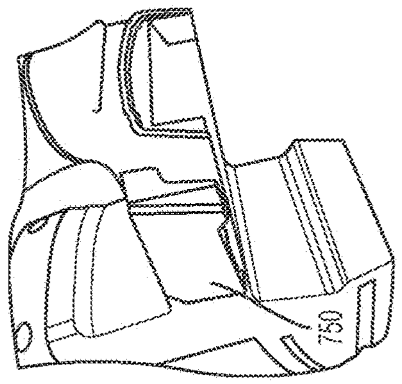

FIGS. 25A-27B illustrate other exemplary power tools incorporating different secondary devices and compartments. In particular, FIGS. 25A-27B illustrate the versatility and compatibility of the various secondary devices and compartments among different power tools. For example, FIGS. 25A-B illustrate an impact driver 950 including the secondary device 700 as described above with respect to FIGS. 21A-B. FIGS. 26A-B illustrate a circular saw 955 including a compartment 277 as described above with respect to FIGS. 5-8. FIGS. 27A-B illustrate a rotary hammer 960 including the secondary device 750 as described above with respect to FIGS. 22A-B. These figures help illustrate that different types of power tools are compatible with the various embodiments described above with respect to the compartment 277 or the secondary devices 650, 700, 750. Accordingly, a user can obtain a secondary device of a first construction and have the option to attach the secondary device to a plurality of different power tools.

In some embodiments, the power tool 104 includes a set of conductive data terminals in communication with the data connection 262 of the controller 226 (FIG. 14) that engage conductive data terminals of the secondary devices 650, 700, 750 to enable data communication between the wireless communication device 300 of secondary devices 650, 700, 750 and the power tool 104. In some embodiments, the power tool 104 includes a set of conductive power terminals in communication with the power input 224 that engage conductive power terminals of the secondary devices 700, 750 to enable the wireless communication device 300 of the secondary devices 700, 750 to receive power from a battery pack coupled to the power tool 104. In some embodiments, the wireless communication device 300 of the secondary devices 650 receives power from a battery pack coupled to the lower portion 665. The secondary devices 650, 700, 750 may receive power from a battery pack when it is coupled to the power tool 104 (directly or via the secondary device 650), and may use power from the backup battery source 252 when a battery pack is not coupled to the power tool 104.

The controller 226 also includes a data connection (e.g., a communication channel) 262 to optionally couple to the insertable wireless communication device 300. In some embodiments, the data connection 262 includes a ribbon cable that is connected from the controller 226 to a set of leads in the compartment 277. When the wireless communication device 300 is inserted into the compartment 277, a set of leads on the wireless communication device 300 connect with the leads inside the compartment 277 and communication between the controller 226 and the wireless communication device 300 is thereby enabled (for example, see FIGS. 21C and 21D).

The descriptions above of the compartment 277 and the secondary devices 650, 700 750 indicate that the secondary devices 650, 700, 750 are permanently locked into the compartments 277 once they have been coupled to the power tool 104. In some embodiments, the locking mechanism is a combination of mechanical structures that allow an initial coupling of the secondary device 650, 700, 750, but inhibits the removal of the same. In some embodiments, an electronic locking mechanism may be used. In such embodiments, the secondary devices 650, 700, 750 may be physically removed from the power tool 104, but doing so may render both the secondary device 600, 650, 700 and the power tool 104 inoperable.

Figure 28:
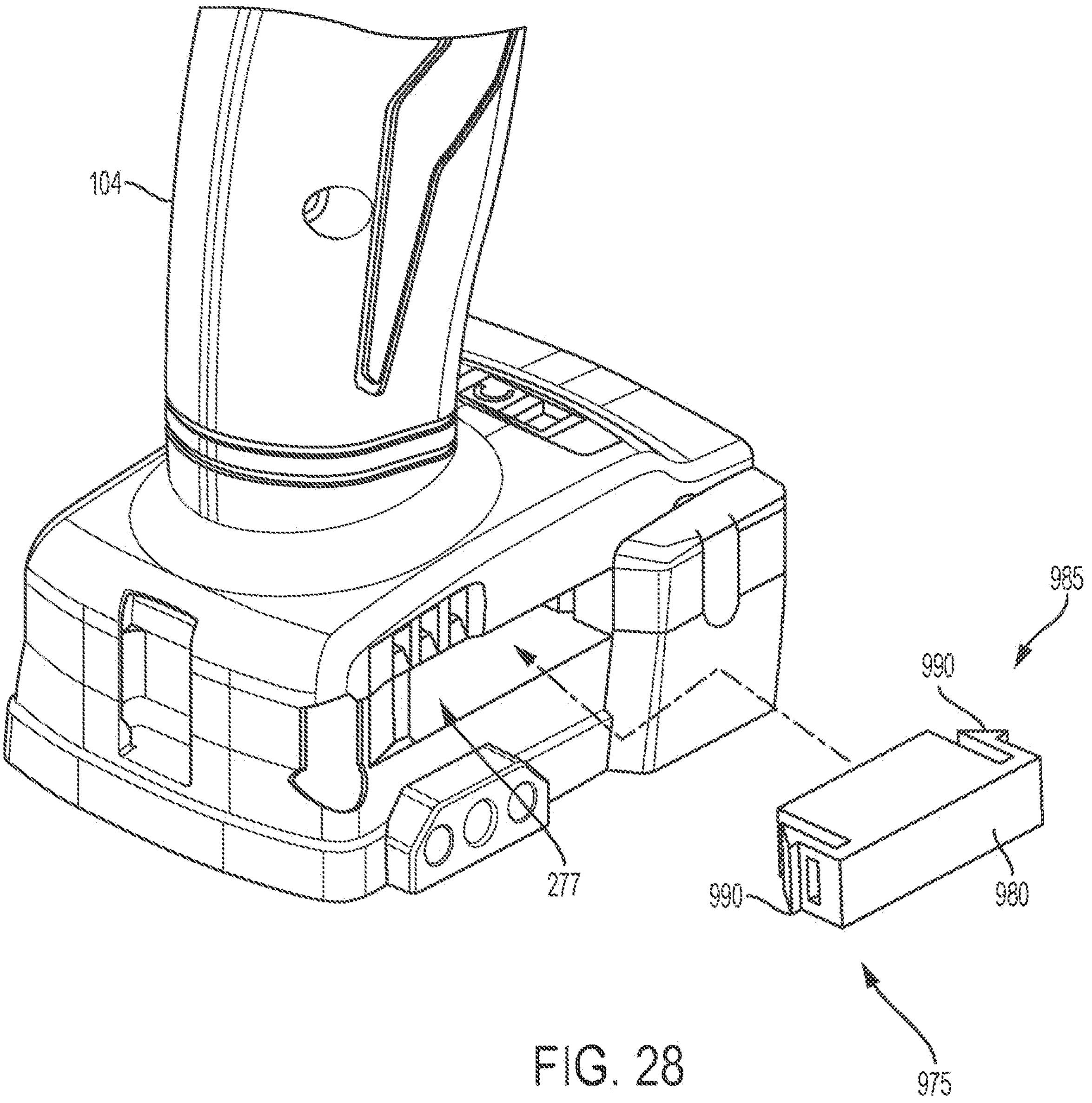
FIG. 28 illustrates an impact driver including the seventh embodiment of the compartment and a secondary device.

FIG. 28 illustrates an impact driver including a seventh embodiment of the compartment and a secondary device. In contrast to the compartment shown in FIG. 21, the compartment 277 shown in FIG. 28 is internal to the body of the power tool 104 and engages a secondary device 975. The secondary device 975 includes a housing 980 forming an engagement structure. In the illustrated embodiment, the secondary device 975 has a generally rectangular shape. As shown in FIG. 28, the compartment is located on the foot of the power tool 104 and defines a recess shaped to receive the secondary device 975.

In the illustrated embodiment, the engagement structure includes an irreversible locking mechanism 985 including a lock mating tooth 990 engaging a mating tab of the power tool (see, e.g., the mating tab 330 in FIG. 6). When the secondary device 975 is inserted into the compartment 277, the lock mating tooth 990 engages the mating tab to irreversibly lock the secondary device 975 within the compartment. In the illustrated embodiment, the secondary device 975 is positioned on one side of the foot of the power tool 104, and extends in a generally horizontal manner (e.g., perpendicular to the handle of the power tool 104). In some embodiments, the compartment 277 is positioned on the other side of the foot of the power tool 104. As discussed above with respect to the secondary device 650, 700, 750 including the wireless communication controller 250, the secondary device 975 may also include the wireless communication controller 250 and include indicators on an exposed side of the secondary device 975 to communicate, for example, an operational status of the secondary device to the user.

Figure 29:
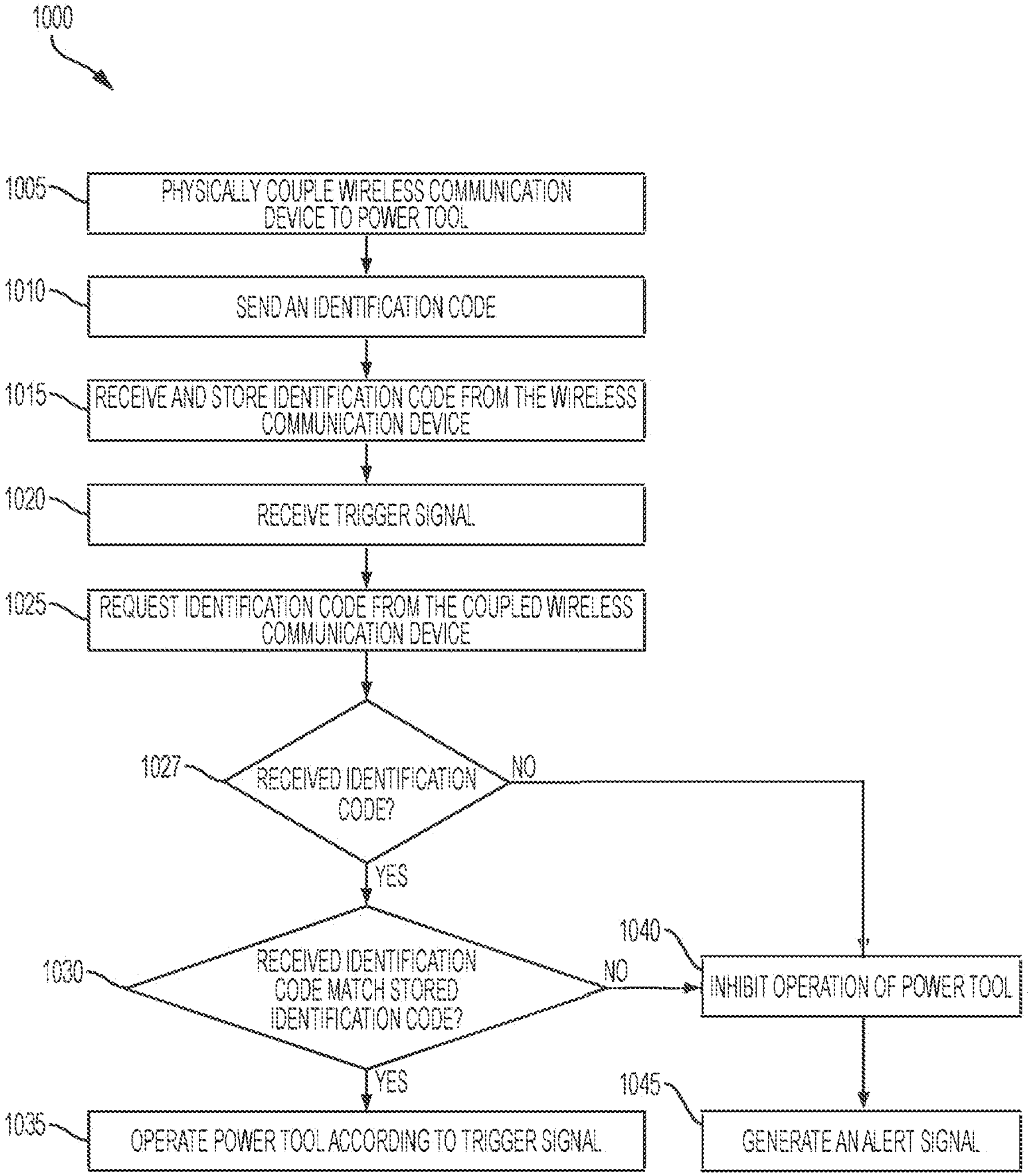
FIG. 29 is a flowchart illustrating a method of implementing an electronic lock mechanism to inhibit removal of the secondary device from the power tool.

FIG. 29 is a flowchart illustrating a method 1000 of implementing an electronic lock mechanism to inhibit removal of the secondary device 650, 700, 750, 975 from the power tool 104. In the example of FIG. 29, the secondary device 650, 700, 750 includes the wireless communication device 300. Accordingly, the secondary device 650, 700, 750 can communicate with the controller 226 of the power tool 104. In step 1005, the secondary device 650, 700, 750 is physically coupled to the power tool 104. As discussed above, each secondary device 650, 700, 750 may include different engagement structures to couple to the power tool 104. The wireless communication device 330 then sends an identification code to the controller 26 of the power tool 104 (step 1010). In particular, the wireless communication device 330 transmits an identification code unique to the particular wireless communication device 330. In some embodiments, the identification code for the wireless communication device 330 includes a MAC (media access control) address. The controller 226 receives and stores the identification code from the wireless communication device 330 (step 1015). In particular, the controller 226 stores the identification code for the wireless communication device 330 in the memory 232.

During operation of the power tool 104, the controller 226 then receives a trigger signal (step 1020), for example in response to the trigger 212 being actuated. The trigger signal indicates a desired operation of the power tool 104. In response to receiving the trigger signal, the controller 226 requests the identification code from the coupled wireless communication device 330 (step 1025). The wireless communication device 330 responds to the request by providing the identification code of the wireless communication device 330 to the controller 226. The controller 226 then determines whether an identification code was received from a wireless communication device 330 (step 1027). When the controller 226 does not receive an identification code from a wireless communication device 330 (e.g., within a predetermined time-out time period), the controller 226 proceeds to step 1040 and inhibits operation of the power tool 104. For example, the controller 226 may not receive an identification code from the wireless communication device 330 because the wireless communication device has been forcibly disconnected from the power tool 104 or damaged by a thief.

Otherwise, when the controller 226 receives the identification code, the controller 226 then determines whether the received identification code matches the stored identification code for the wireless communication device 330 (step 1030). When the received identification code matches the stored identification code, the controller 226 operates the power tool 104 according to the received trigger signal (step 1035). On the other hand, when the received identification code does not match the stored identification code (for example, when the wrong wireless communication device 330 is coupled to the power tool 104), the controller 226 inhibits operation of the power tool (step 1040). In one embodiment, the controller 226 disconnects the motor from the power source such that the motor cannot be activated. In other embodiments, the controller 226 destroys a portion of the controller 226 or other electrical components of the power tool 104. For example, the controller 226 may transmit an excessive amount of power through some of the electrical components of the power tool 104 to prevent the power tool 104 from operating again. In the illustrated embodiment, the power tool 104 also generates an alert signal (step 1045). The alert signal indicates to the user that the original wireless communication device 330 is no longer coupled to the power tool 104 and the power tool 104 is therefore inoperable. In some embodiments, the power tool 104 may transmit the alert signal to the external device 108 via the attached wireless communication device 330.

By matching the received identification code with the stored identification code, the controller 226 detects when the original wireless communication device 330 is removed, even if a replacement wireless communication device 330 was coupled to the power tool 104. Additionally, as described above with respect to step 1027, when the original wireless communication device 330 is removed from the power tool 104, the controller 226 does not receive an identification code, and the power tool 104 also becomes inoperable. In some embodiments, for example, when the original wireless communication device 330 is malfunctioning or is accidentally removed, a service center may provide a universal passcode that will clear the stored identification code from the memory 232 of the power tool 104. After the stored identification code is cleared, the power tool 104 may operate without the wireless communication device 330 or may be paired with a different wireless communication device 330.

In some embodiments, in steps 1010 and 1015, the power tool 104 provides an identification code to the wireless communication device 330 (step 1010) and the wireless communication device 330 stores the identification code of the power tool 104 in 256 (step 1015). In particular, the wireless communication controller 250 of the wireless communication device 330 performs these steps and the actions explained below as being performed by the wireless communication device 330. In some embodiments, the identification code for the power tool 104 includes, for example, a unique identifier stored in the memory 232 of the power tool 104. In some embodiments, the identification code for the power tool 104 may include, for example, a global unique identification (GUID) that includes the power tool's specific make, model, and serial number. Then, in step 1025, the wireless communication device 330 request the identification code from the power tool 104. The wireless communication device 330 then determines whether an identification code was received (step 1027) and, if not, the wireless communication device 330 inhibits further communication with the power tool 104 (step 1040). If an identification code is received, the wireless communication device 330 determines, in step 1030, whether the power tool 104 coupled to the wireless communication device 330 corresponds to the power tool 104 of the stored identification code. When the wireless communication device 330 determines that the attached power tool 104 does not correspond to the power tool 104 of the stored identification code, the wireless communication device 330 inhibits further communication between the wireless communication device 330 and the power tool 104 (step 1040). For example, to inhibit further communication, the processor 258 enters a disabled mode in which communications are not sent to the power tool 104. In some embodiments, after inhibiting communication in step 1040, the wireless communication device 330 transmits an alert message to the external device 108 to alert the user that the wireless communication device 330 is inoperable with the power tool 104 (step 1045). When the wireless communication device 330 determines that the attached power tool 104 corresponds to the power tool 104 of the stored identification code by comparing the received identification code and identification the stored code and determining a match, the wireless communication device 330 enables further communications with the power tool 104 (step 1040).

While described with respect to the secondary devices 650, 700, 750, 975, the flow chart 1000 similarly applies to the wireless communication devices 300 of other embodiments described herein, such as shown and discussed with respect to FIGS. 4-13. In some embodiments, the power tool 104 may utilize both a mechanical locking mechanism as described above as well as an electronic locking mechanism as described above with respect to FIG. 29.

Figure 31:
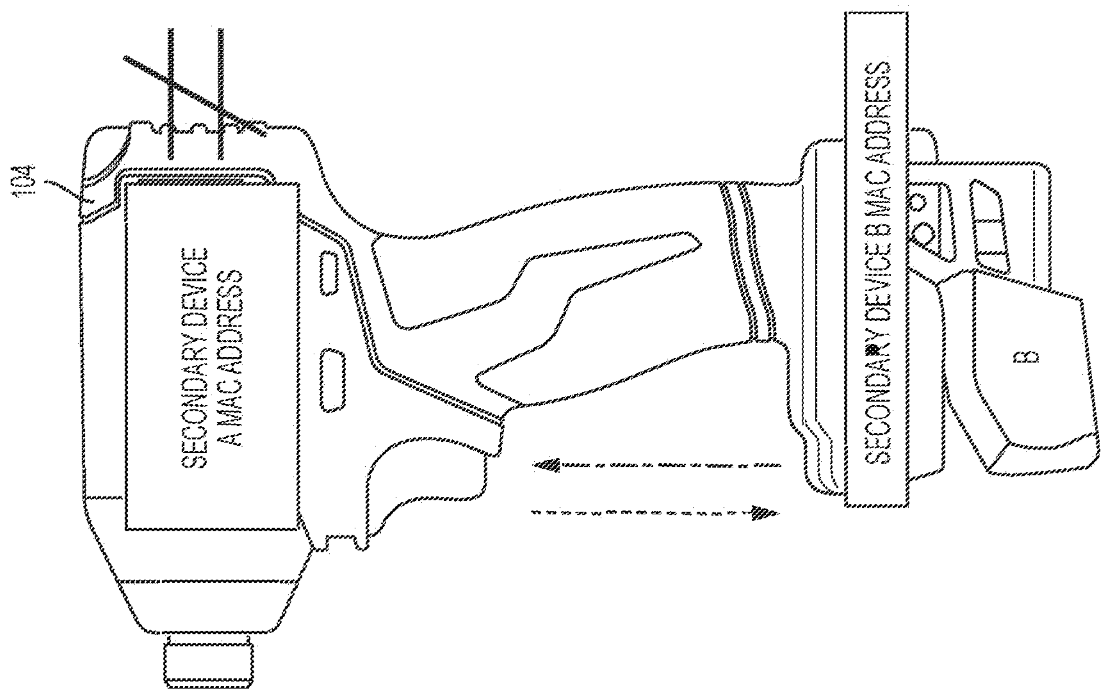
FIGS. 30 and 31 illustrate schematic diagrams illustrating the method of FIG. 29 implemented on an example power tool.
Figure 30:
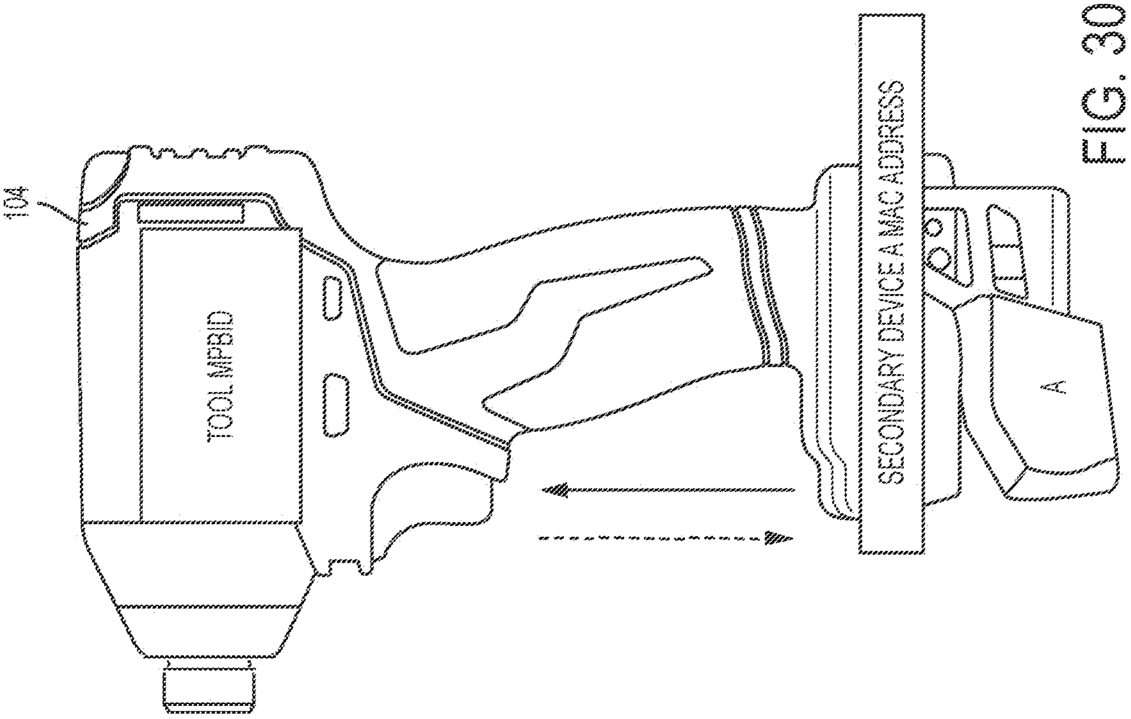

FIGS. 30 and 31 illustrate schematic diagrams illustrating the method of FIG. 29 implemented on an example power tool 104. In FIG. 30, secondary device A is inserted into a compartment of the power tool 104 (for example, the compartment 277). As explained above, because the power tool 104 implements an electronic lock mechanism, in some embodiments, the secondary device A may be physically removable from the power tool 104. In some embodiments, in response to the secondary device A being inserted into the compartment of the power tool 104, the power tool 104 and the secondary device A are paired via an electronic handshake. For example, as indicated in FIG. 30, the secondary device A receives and stores a unique identification code of the power tool 104 (e.g., a tool MPBID). In a corresponding manner, the power tool 104 receives and stores a media access control (MAC) address of the secondary device A. In some embodiments, a controller of the power tool 104 (e.g., controller 226 of FIG. 14) communicates with a wireless communication controller of the secondary device A (e.g., wireless communication controller 250 of FIG. 15), for example, via a data connection, to enable pairing of the power tool 104 and the secondary device A via the electronic handshake as described above. Once the power tool 104 and the secondary device A are paired, one or both of the controller 226 of the power tool 104 and the wireless communication controller 250 of the secondary device A may implement the remaining steps of the method 1000 to ensure that the secondary device A is still coupled to the power tool 104 and properly functioning before allowing operation of the power tool 104 and/or further communication between the controller 226 and the wireless communication controller 250 as explained above with respect to FIG. 29. In some embodiments, each power tool and each secondary device may only be configured to pair with a single corresponding other of the secondary device and the power tool. In some embodiments, once pairing of the power tool 104 and the secondary device A occurs, the pairing may only be removed by a service center.

In FIG. 31, the secondary device A of FIG. 30 has been removed from the power tool 104 and a secondary device B with a different MAC address has been inserted into the compartment of the power tool 104. However, the power tool 104 has already paired with the secondary device A and stored the MAC address of secondary device A in the memory 232 of the power tool 104. Accordingly, when performing the method 1000 of FIG. 29, one or both of the controller 226 of the power tool 104 and the wireless communication controller 250 of the secondary device B determines that the unique ID of the power tool 104 does not match with the MAC address of the secondary device B (i.e., that the power tool 104 and the secondary device B are not paired because the power tool 104 has already paired with the secondary device B). As indicated in FIG. 29, in such situations, in response to this determination, one or both of the controller 226 of the power tool 104 and the wireless communication controller 250 of the secondary device B inhibit operation of the power tool 104 and/or further communication between the controller 226 and the wireless communication controller 250 (at step 1040). In some embodiments, inhibiting further communication between the controller 226 and the wireless communication controller 250 blocks access to functionality provided on an external device (e.g., the external device 108) configured to communicate with the controller 226 via the wireless communication controller 250. As indicated by step 1045 of FIG. 29, in some embodiments, the wireless communication controller 250 transmits an alert signal to the external device 108 that indicates that the secondary device B and the power tool 104 do not include matching IDs and that they are not paired. In some embodiments, in response to receiving the alert, the external device prompts the user with a suggested action (e.g., re-insert the secondary device A that is paired with the power tool 104, visit a service center to unpair the power tool 104 from the secondary device A, and the like).

Thus, the invention provides, among other things, a power tool including a compartment with an irreversible lock for receiving and retaining a wireless communication device.

We claim:

1. A communication system comprising:
- a power tool including:
  - a housing including a compartment and including a power tool battery pack interface configured to receive a power tool battery pack,
  - an insertable wireless communication device including a wireless communication controller with a first transceiver, the insertable wireless communication device configured to be received in the compartment and configured to periodically transmit an identification code,
  - a motor located within the housing and configured to be selectively coupled to power provided by the power tool battery pack to drive an output drive device, and
  - a first controller within the housing and having a first electronic processor and a first memory, wherein the first controller is configured to control the motor; and
- a first external device including:
  - a user interface configured to provide outputs and configured to receive user inputs,
  - a second transceiver, and
  - a second controller including a second electronic processor and a second memory, wherein the second controller is coupled to the user interface and to the second transceiver, and wherein the second controller is configured to:
    - receive, via a first user input at the user interface, a selection of the power tool that indicates that the power tool is lost,
    - transmit, in response to receiving the selection, a request to a server for a last known location of the power tool, wherein the request causes the server to flag the power tool as lost,
    - receive, from the server and in response to the request, the last known location of the power tool,
    - receive, from the server and in response to the server receiving the identification code and geographical coordinates from a second external device that received the identification code from the insertable wireless communication device, an updated last known location of the power tool that corresponds to the geographical coordinates of the second external device, and
    - generate, via the user interface, a notification that the updated last known location of the power tool has been received.

2. The communication system of claim 1, wherein the compartment includes an irreversible lock, and wherein the insertable wireless communication device is configured to engage with the irreversible lock in response to being received in the compartment.

3. The communication system of claim 1, wherein the power tool includes a data connection configured to couple the first electronic processor to the insertable wireless communication device when the insertable wireless communication device is inserted into the compartment; and
- wherein the first controller is configured to communicate with the first external device via the data connection and the wireless communication controller to at least one of a group consisting of:
  - transmit power tool data to the first external device,
  - receive power tool configuration data from the first external device via the wireless communication controller, and
  - combinations thereof.

4. The communication system of claim 1, wherein the power tool includes a backup power source separate from the insertable wireless communication device and configured to provide power to the wireless communication controller.

5. The communication system of claim 4, wherein the housing of the power tool includes a second compartment configured to receive the backup power source, and wherein the second compartment is configured to allow for the backup power source to be removed and replaced.

6. The communication system of claim 1, wherein the housing of the power tool comprises:
- a main body configured to house the motor; and
- a handle extending between the power tool battery pack interface and the main body;
- wherein the compartment is located on a side of the power tool battery pack interface;
- wherein the insertable wireless communication device is inserted horizontally into the compartment from the side of the power tool battery pack interface.

7. A communication system comprising:
- a power tool device including:
  - a housing including a compartment and including a power tool battery pack interface configured to receive a power tool battery pack,
  - an insertable wireless communication device including a wireless communication controller with a first transceiver, the insertable wireless communication device configured to be received in the compartment and configured to periodically transmit an identification code,
  - a powered element configured to be selectively coupled to power provided by the power tool battery pack, and
  - a first controller within the housing and having a first electronic processor and a first memory, wherein the first controller is configured to control the powered element; and
- a first external device including:
  - a user interface configured to provide outputs and configured to receive user inputs,
  - a second transceiver, and
  - a second controller including a second electronic processor and a second memory, wherein the second controller is coupled to the user interface and to the second transceiver, and wherein the second controller is configured to:
    - receive, via a first user input at the user interface, a selection of the power tool device that indicates that the power tool device is lost,
    - transmit, in response to receiving the selection, a request to a server for a last known location of the power tool device, wherein the request causes the server to flag the power tool device as lost, receive, from the server and in response to the request, the last known location of the power tool device, receive, from the server and in response to the server receiving the identification code and geographical coordinates from a second external device that received the identification code from the insertable wireless communication device, an updated last known location of the power tool device that corresponds to the geographical coordinates of the second external device, and generate, via the user interface, a notification that the updated last known location of the power tool device has been received.

8. The communication system of claim 7, wherein the powered element is at least one selected from a group consisting of a lighting element and a motor.

9. The communication system of claim 7, wherein the compartment includes an irreversible lock, and wherein the insertable wireless communication device is configured to engage with the irreversible lock in response to being received in the compartment.

10. The communication system of claim 7, wherein the power tool device includes a data connection configured to couple the first electronic processor to the insertable wireless communication device when the insertable wireless communication device is inserted into the compartment; and wherein the first controller is configured to communicate with the first external device via the data connection and the wireless communication controller to at least one of a group consisting of:

transmit power tool data to the first external device, receive power tool configuration data from the first external device via the wireless communication controller, and combinations thereof.

11. The communication system of claim 7, wherein the power tool device includes a backup power source separate from the insertable wireless communication device and configured to provide power to the wireless communication controller.

12. The communication system of claim 11, wherein the housing of the power tool device includes a second compartment configured to receive the backup power source, and wherein the second compartment is configured to allow for the backup power source to be removed and replaced.

13. The communication system of claim 7, wherein the housing of the power tool device comprises:

a main body configured to house the powered element; and a handle extending between the power tool battery pack interface and the main body;

wherein the compartment is located on a side of the power tool battery pack interface;

wherein the insertable wireless communication device is inserted horizontally into the compartment from the side of the power tool battery pack interface.

14. A method of tracking a power tool device, the method comprising:

receiving, by a compartment of a housing of a power tool device, an insertable wireless communication device, the insertable wireless communication device including a wireless communication controller with a first transceiver, the housing including a power tool battery pack interface configured to receive a power tool battery pack;

periodically transmitting an identification code with the insertable wireless communication device;

controlling, with a first controller within the housing, selective coupling of a powered element of the power tool device to power provided by the power tool battery pack, wherein the first controller includes a first electronic processor and a first memory;

receiving, with a second controller of a first external device and via a first user input at a user interface of the first external device, a selection of the power tool device that indicates that the power tool device is lost, the second controller including a second electronic processor and a second memory;

transmitting, in response to receiving the selection and with the second controller and via a second transceiver of the first external device, a request to a server for a last known location of the power tool device, wherein the request causes the server to flag the power tool device as lost;

receiving, with the second controller and from the server and in response to the request, the last known location of the power tool device;

receiving, with the second controller and from the server and in response to the server receiving the identification code and geographical coordinates from a second external device that received the identification code from the insertable wireless communication device, an updated last known location of the power tool device that corresponds to the geographical coordinates of the second external device; and generating, with the second controller and via the user interface, a notification that the updated last known location of the power tool device has been received.

15. The method of claim 14, wherein the powered element is at least one selected from a group consisting of a lighting element and a motor.

16. The method of claim 14, further comprising:

engaging, by an irreversible lock of the compartment, the insertable wireless communication device upon the compartment receiving the insertable wireless communication device.

17. The method of claim 14, further comprising:

coupling, via a data connection of the power tool device, the first electronic processor to the insertable wireless communication device when the insertable wireless communication device is inserted into the compartment; and communicating, with the first controller, with the first external device via the data connection and the wireless communication controller to at least one of a group consisting of:

transmit power tool data to the first external device, receive power tool configuration data from the first external device via the wireless communication controller, and combinations thereof.

18. The method of claim 14, wherein the power tool device includes a backup power source separate from the insertable wireless communication device and configured to provide power to the wireless communication controller.

19. The method of claim 18, wherein the housing of the power tool device includes a second compartment configured to receive the backup power source, and wherein the second compartment is configured to allow for the backup power source to be removed and replaced.

20. The method of claim 14, wherein the housing of the power tool device comprises:

a main body configured to house the powered element; and a handle extending between the power tool battery pack interface and the main body;

wherein the compartment is located on a side of the power tool battery pack interface;

wherein receiving the insertable wireless communication device in the compartment includes the insertable wireless communication device being inserted horizontally into the compartment from the side of the power tool battery pack interface.

* * * * *